(12) United States Patent
Yoshikawa

(10) Patent No.: US 8,547,499 B2
(45) Date of Patent: Oct. 1, 2013

(54) LIGHTING DEVICE, DISPLAY DEVICE AND TELEVISION RECEIVER

(75) Inventor: Takahiro Yoshikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 111 days.

(21) Appl. No.: 13/375,547

(22) PCT Filed: Apr. 6, 2010

(86) PCT No.: PCT/JP2010/056216
§ 371 (c)(1),
(2), (4) Date: Dec. 1, 2011

(87) PCT Pub. No.: WO2010/146918
PCT Pub. Date: Dec. 23, 2010

(65) Prior Publication Data
US 2012/0086884 A1   Apr. 12, 2012

(30) Foreign Application Priority Data
Jun. 15, 2009  (JP) .................. 2009-142251

(51) Int. Cl.
*G02F 1/1335*   (2006.01)

(52) U.S. Cl.
USPC ............ 349/61; 349/58; 349/62; 349/64; 362/97.1; 362/97.4; 362/612; 362/631

(58) Field of Classification Search
USPC ........... 349/58, 61, 62, 64, 65, 612; 362/612, 362/97.1, 97.2, 97.3, 382, 249.01, 296.01, 362/308, 297, 632, 633, 634
See application file for complete search history.

(56) References Cited

U.S. PATENT DOCUMENTS

| | | | |
|---|---|---|---|
| 7,246,931 B2 * | 7/2007 | Hsieh et al. | .......... 362/612 |
| 2007/0009820 A1 | 1/2007 | Ueda | |
| 2009/0122224 A1 | 5/2009 | Ueda | |
| 2010/0328966 A1 | 12/2010 | Shin | |

FOREIGN PATENT DOCUMENTS

| | | |
|---|---|---|
| JP | 2007-018903 A | 1/2007 |
| JP | 2007-317423 A | 12/2007 |
| JP | 2008-166304 A | 7/2008 |
| WO | 2009/002081 A2 | 12/2008 |

OTHER PUBLICATIONS

Official Communication issued in International Patent Application No. PCT/JP2010/056216, mailed on May 11, 2010.

(Continued)

*Primary Examiner* — Thoi Duong
(74) *Attorney, Agent, or Firm* — Keating & Bennett, LLP

(57) ABSTRACT

The present invention provides an art of properly fixing a light source board without using any screw. A backlight unit 12 according to the present invention includes an LED board 18 with an LED 17 as a light source, a chassis 14, an optical member 15, and a supporting member 20. The chassis 14 stores the LED board 18 therein and has an opening 14b through which light from the LED 17 exits. The optical member 15 is arranged so as to face the LED board 18 and to cover the opening 14b. The supporting member 20 supports the optical member 15 from the side of the LED board 18. The supporting member 20 is fixed to the chassis 14 such that the LED board 18 is sandwiched between the supporting member 20 and the chassis 14.

36 Claims, 36 Drawing Sheets

(56) References Cited

OTHER PUBLICATIONS

Kuromizu, "Lighting Device, Display Device and Television Receiver", U.S. Appl. No. 13/375,552, filed Dec. 1, 2011.
Kuromizu, "Lighting Device, Display Device and Television Receiver", U.S. Appl. No. 13/375,549, filed Dec. 1, 2011.
Yokota, "Lighting Device, Display Device and Television Reciever,", U.S. Appl. No. 13/375,817, filed Dec. 2, 2011.

* cited by examiner

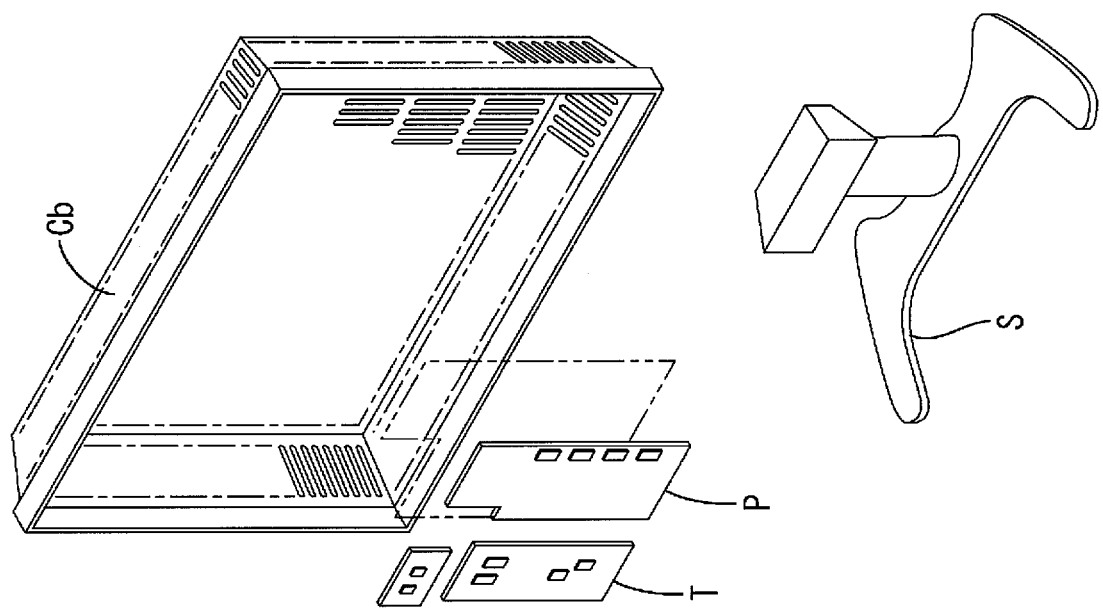
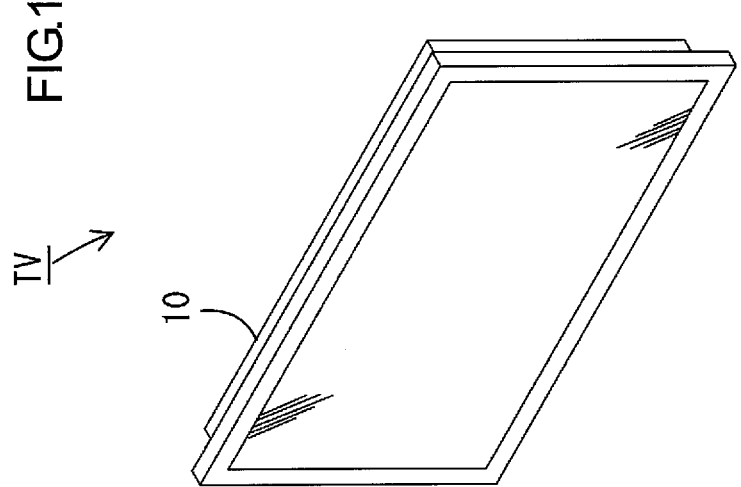
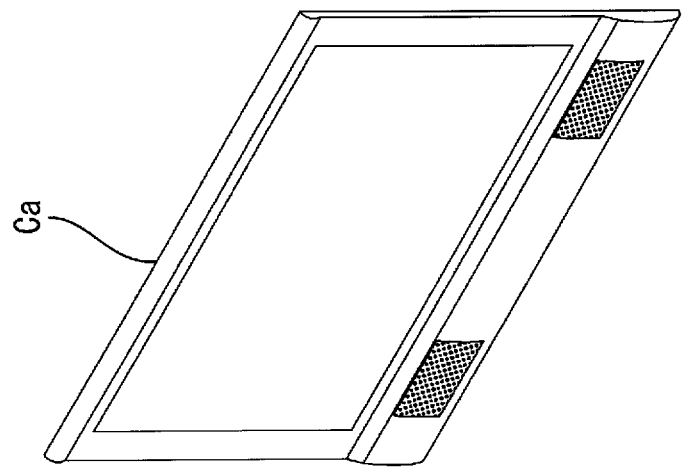
FIG.1

FIG.2
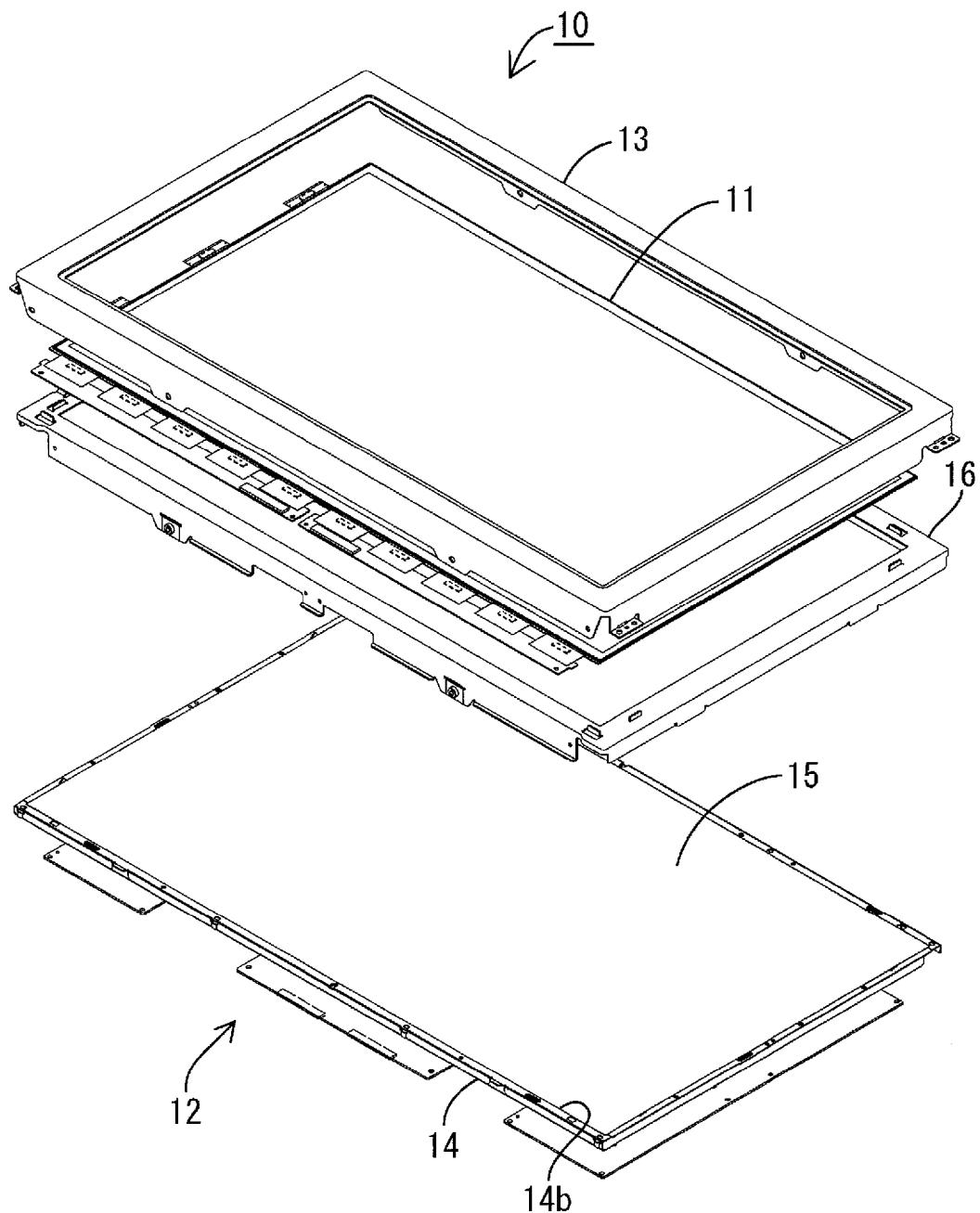
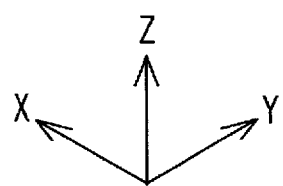

FIG.12
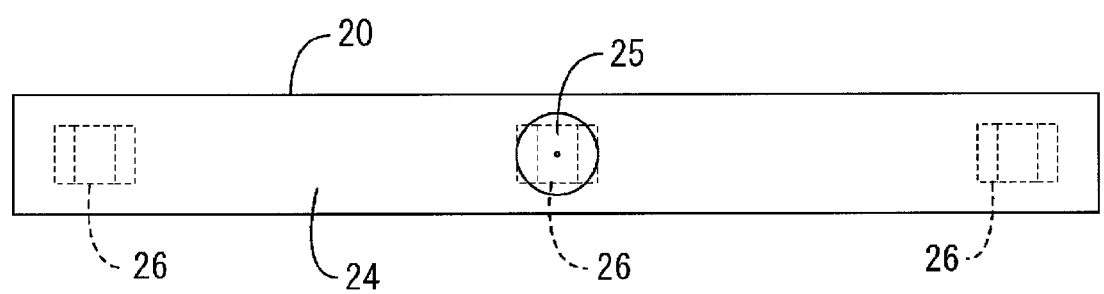
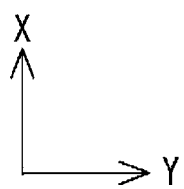

FIG.13
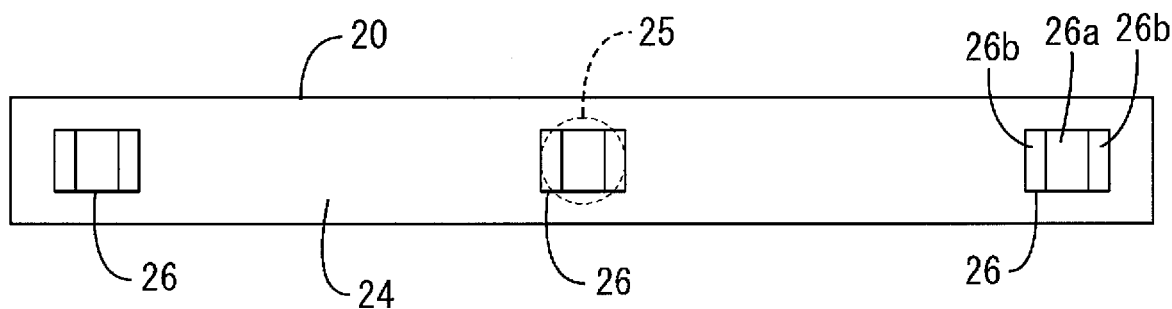
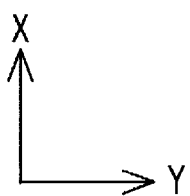

FIG.21
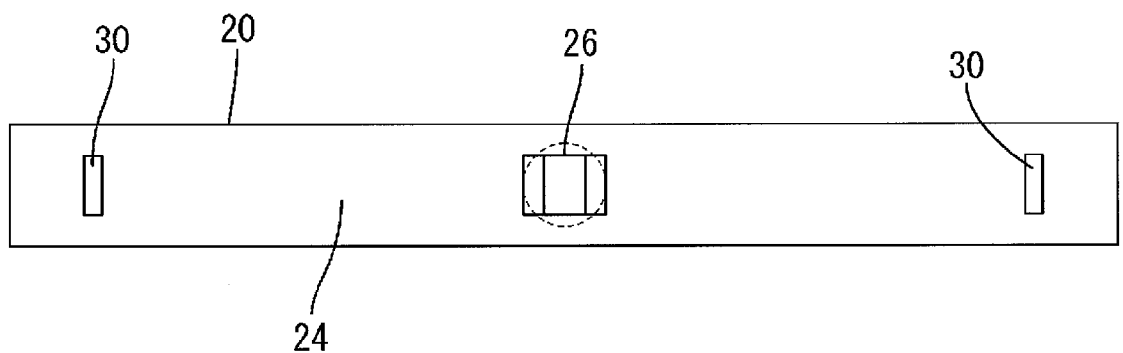
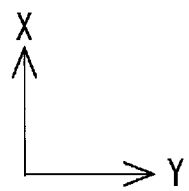

LIGHTING DEVICE, DISPLAY DEVICE AND TELEVISION RECEIVER

TECHNICAL FIELD

The present invention relates to a lighting device, a display device and a television receiver.

BACKGROUND ART

For example, a liquid crystal panel used for a liquid crystal display device such as a liquid crystal television set does not emit light by itself, and therefore, requires a separate backlight unit as a lighting device. The backlight unit is installed on a back side of the liquid crystal panel (side opposite to a display surface) and includes a chassis, a surface of which is opened on the side of the liquid crystal panel, a light source stored in the chassis, and an optical member (diffuser sheet, etc.) that is arranged on the opening of the chassis and efficiently discharges light emitted from the light source to the liquid crystal panel. Among the above-mentioned components of the backlight unit, the light source adopts, for example, an LED, and in such case, an LED board that mounts the LED thereon is stored in the chassis.

An example of the backlight unit using the LED as the light source is described in Patent Document 1.

RELATED ART DOCUMENT

Patent Document

Patent Document 1: Japanese Unexamined Patent Publication No. 2007-317423

PROBLEM TO BE SOLVED BY THE INVENTION

When the LED board is fixedly attached to the chassis, screws are generally used. However, according to a screwed fixing method, a lot of screws are required to fix the LED board, resulting in that the number of components increases and the number of times of attaching works also increases. This disadvantageously increases costs and lowers working efficiency. Especially, as the number of the LED boards increases with an increase in screen size of a liquid crystal display device, the number of screws used and the number of times of screw attaching works increase and accordingly, the above-mentioned problem becomes more prominent.

DISCLOSURE OF THE PRESENT INVENTION

The present invention is made in consideration of such circumstances and its object is to properly fix a light source board without using any screw.

A lighting device according to the present invention includes a light source board including a light source, a chassis storing the light source board therein, an optical member facing the light source board and a supporting member supporting the optical member from the side of the light source board. The supporting member is fixed to the chassis such that the light source board is sandwiched between the supporting member and the chassis.

With this configuration, when the supporting member is fixed to the chassis, the light source board is held between the supporting member and the chassis. Since the light source board is fixed by the supporting member supporting the optical member from the side of the light source board, the screws used in a known device for fixing the light source board are not required. This can reduce the number of components and man hours as well as cut costs and improve working efficiency.

BRIEF DESCRIPTION OF THE DRAWINGS

FIG. 1 is an exploded perspective view showing a schematic configuration of a television receiver according to a first embodiment of the present invention;

FIG. 2 is an exploded perspective view showing a schematic configuration of a liquid crystal display device provided in the television receiver;

FIG. 12 is a plan view of the supporting member;

FIG. 13 is a bottom view of the supporting member;

FIG. 21 is a bottom view of the supporting member;

BEST MODE FOR CARRYING OUT THE INVENTION

First Embodiment

Figure 3:
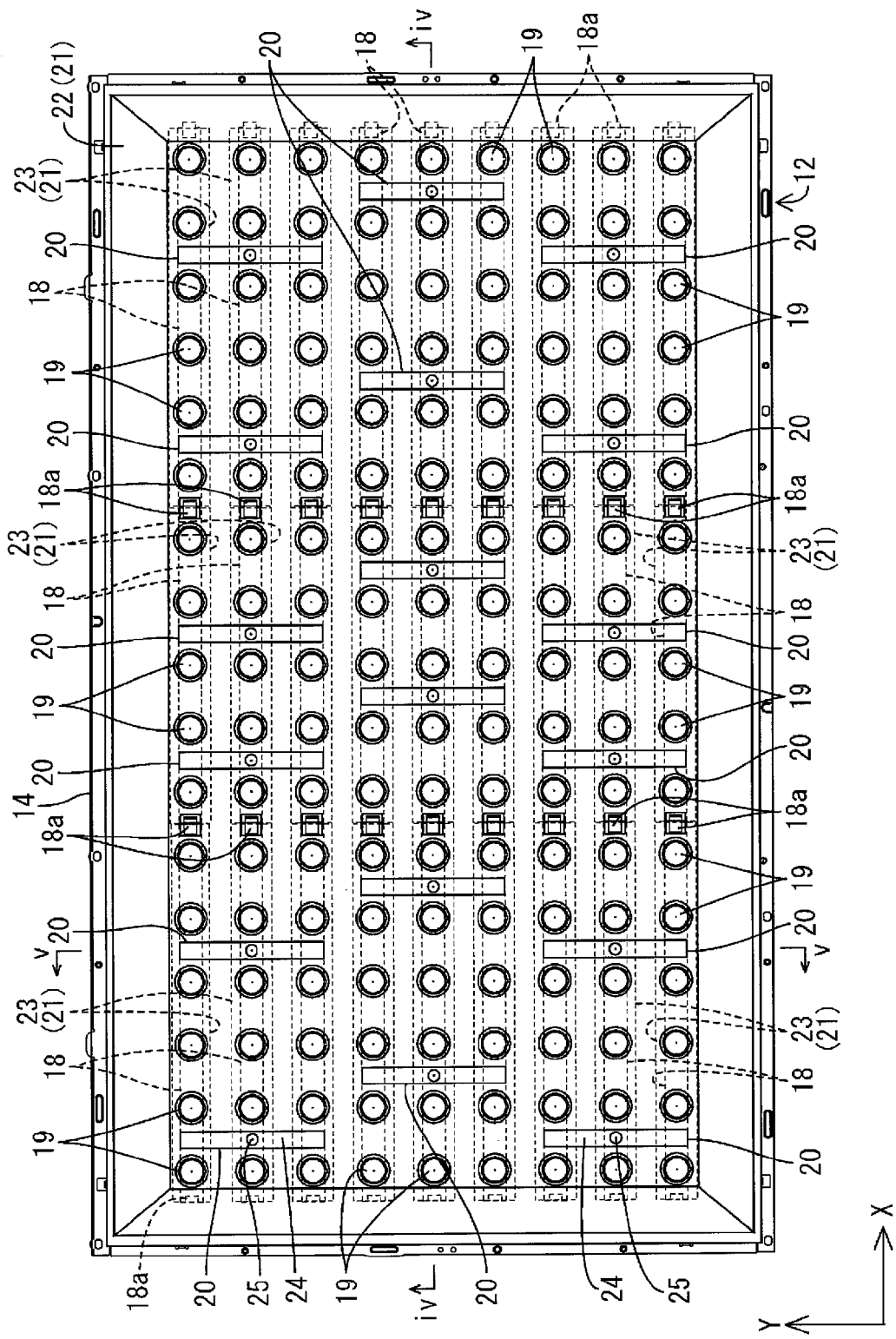
FIG. 3 is a plan view showing an arrangement configuration of LED boards and holding members in a chassis provided in the liquid crystal display device.
Figure 4:
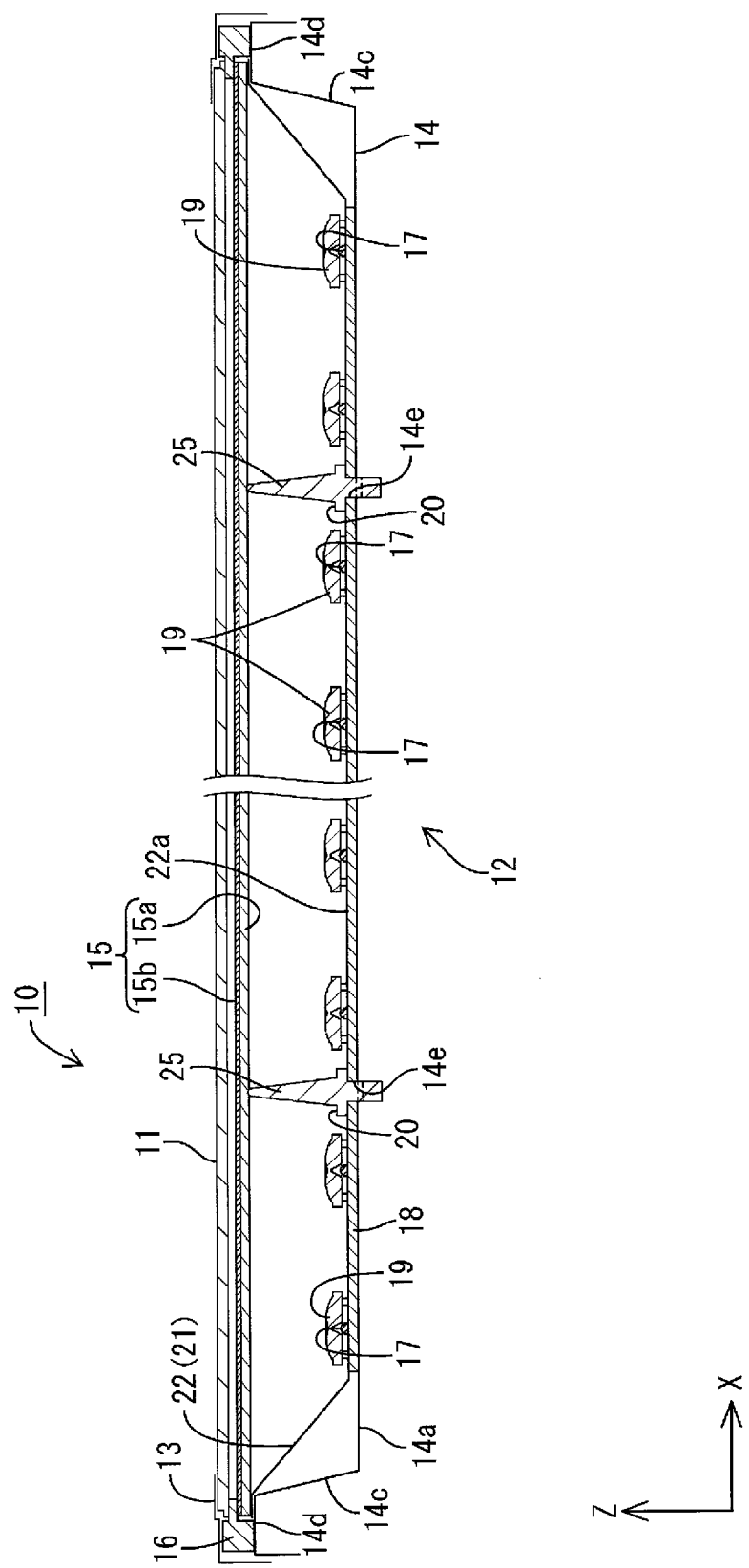
FIG. 4 is a sectional view taken along line iv-iv in FIG. 3 of the liquid crystal display device.
Figure 5:
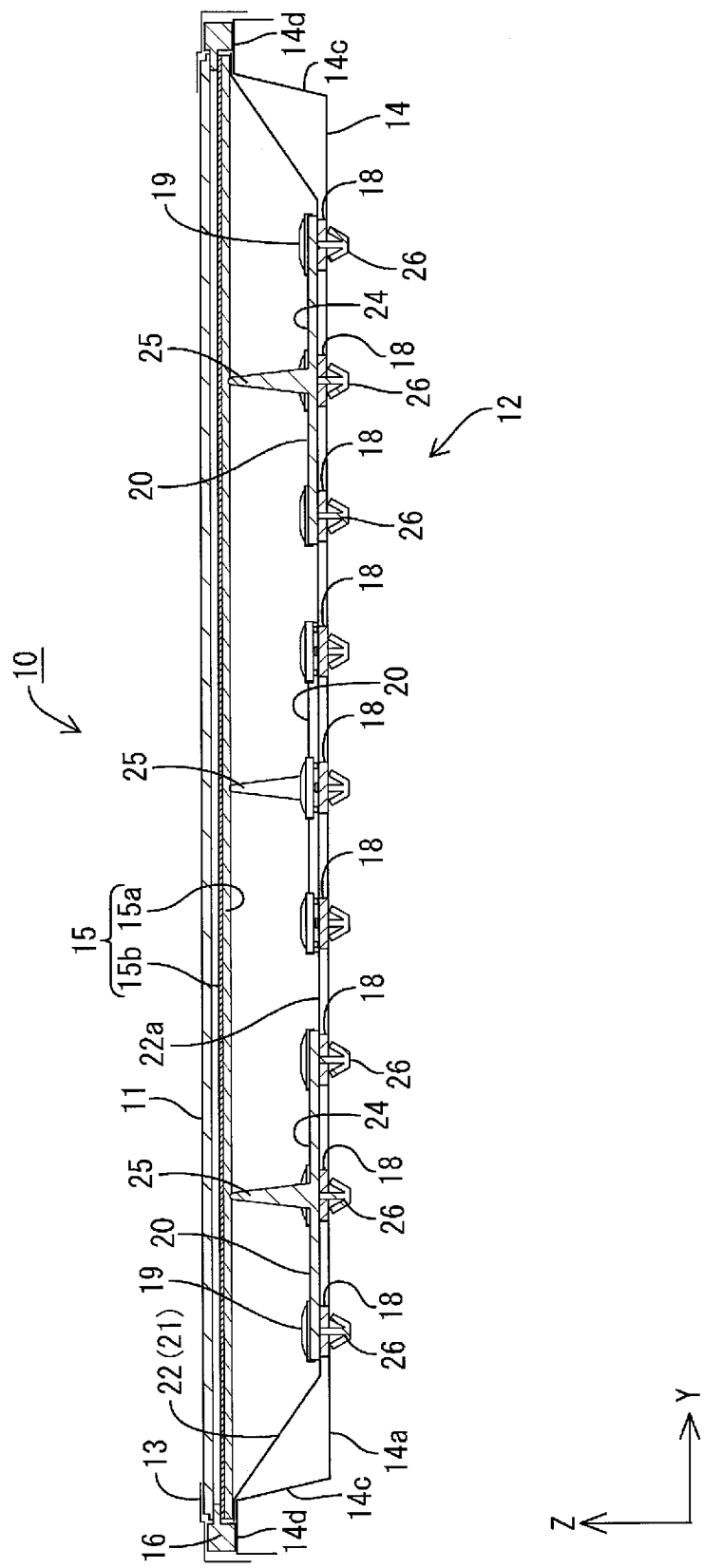
FIG. 5 is a sectional view taken along line v-v in FIG. 3 of the liquid crystal display device.

A first embodiment of the present invention will be described with reference to FIGS. 1 to 14. In this embodiment, a liquid crystal display device 10 is used as an example. A part of each figure shows an X-axis, a Y-axis and a Z-axis, and a direction of each axis is represented in each figure. It is given that an upper side in FIGS. 4 and 5 is a front side and a lower side in these figures is a backside.

A television receiver TV according to this embodiment includes, as shown in FIG. 1, the liquid crystal display device 10, front and back cabinets Ca, Cb that store the liquid crystal display device 10 therebetween, a power source P, a tuner T and a stand S. The liquid crystal display device (display device) 10 is shaped like an oblong quadrangle as a whole (rectangular) and is stored in a longitudinally mounted state. The liquid crystal display device 10 includes, as shown in FIG. 2, a liquid crystal panel 11 as a display panel and a backlight unit (lighting device) 12 as an external light source, and these components are integrally held by a frame-like bezel 13 or the like. In this embodiment, it is assumed that a screen size is 42 inches and an aspect ratio is 16:9.

Next, the liquid crystal panel 11 and the backlight unit 12 that constitute the liquid crystal display device 10 will be successively described. The liquid crystal panel (display panel) 11 among them is rectangular in a plan view, and is formed by sticking a pair of glass substrates to each other with a predetermined gap therebetween and filling a liquid crystal between the both glass substrates. One glass substrate has a switching component (for example, TFT) connected to a source wiring and a gate wiring that are orthogonal to each other, a pixel electrode connected to the switching component and an alignment film, and the other glass substrate has a color filter in which color sections of R (red), G (green), B (blue) are arranged in a predetermined pattern, a counter electrode and an alignment film and the like. Polarizing plates are provided outer of the both substrates.

Subsequently, the backlight unit 12 will be described in detail. The backlight unit 12 includes, as shown in FIG. 2, a substantially box-like chassis 14 having openings 14b on the side of a light emitting surface (the side of the liquid crystal panel 11), an optical member group 15 (a diffuser (light diffusing member) 15a, and a plurality of optical sheets 15b arranged between the diffuser 15a and the liquid crystal panel 11) arranged so as to cover the openings 14b of the chassis 14, and a frame 16 that is arranged along an outer edge of the chassis 14 and holds an outer edge of the optical member group 15 between the frame 16 and the chassis 14. In the chassis 14, as shown in FIGS. 3 to 5, LEDs 17 (Light Emitting Diode) as light sources, LED boards 18 that mount the LEDs 17 thereon and diffuser lenses 19 attached at positions corresponding to the LEDs 17 on the LED boards 18 are provided. The chassis 14A has a supporting member 20 supporting the optical member 15 from the back side (the side of the LED 17) and a reflection sheet 21 reflecting light in the chassis 14 toward the optical member 15. In the backlight unit 12, the side of the optical member 15, not the LEDs 17, is set as a light emitting side. Hereinafter, each component of the backlight unit 12 will be described in detail.

The chassis 14 is made of metal, and as shown in FIGS. 3 to 5, consists of a rectangular bottom plate 14a like the liquid crystal panel 11, side plates 14c rising from outer ends of sides of the bottom plate 14a and receiving plates 14d extending outward from rising ends of the respective side plates 14c, and is shaped like a shallow box (shallow dish) opened toward the front side as a whole. In the chassis 14, its long-side direction corresponds to the X-axis direction (horizontal direction) and its short-side direction corresponds to the Y-axis direction (vertical direction). The frame 16 and the below-mentioned optical member 15 can be mounted on each of the receiving plates 14d of the chassis 14 from the front side. The frame 16 is secured to each of the receiving plates 14d with a screw. The bottom plate 14a of the chassis 14 includes opened attachment holes 14e for attaching the supporting member 20. The plurality of attachment holes 14e are distributed in the bottom plate 14a corresponding to attachment positions of the supporting member 20.

Figure 7:
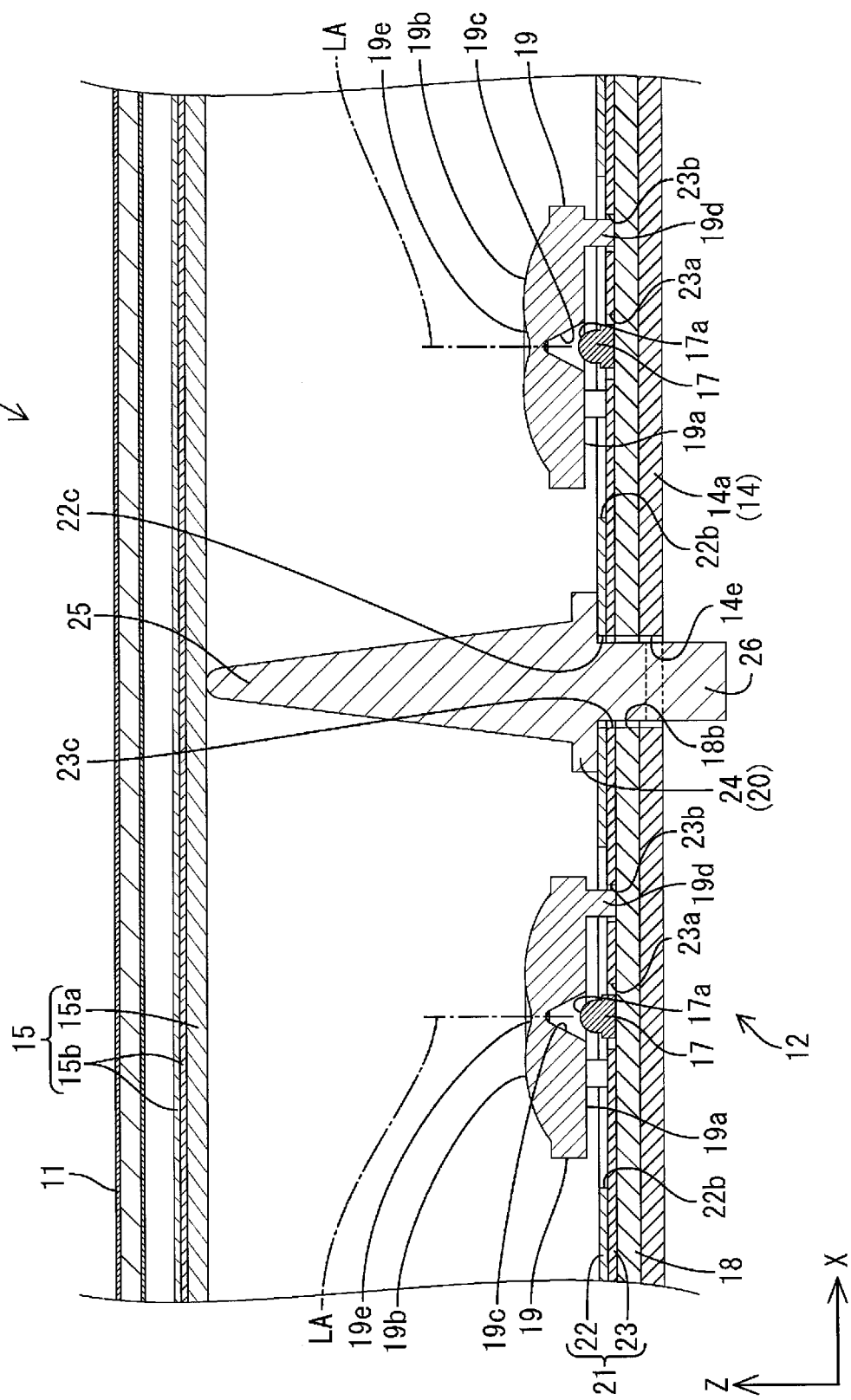
FIG. 7 is a sectional view taken along line vii-vii in FIG. 6.
Figure 8:
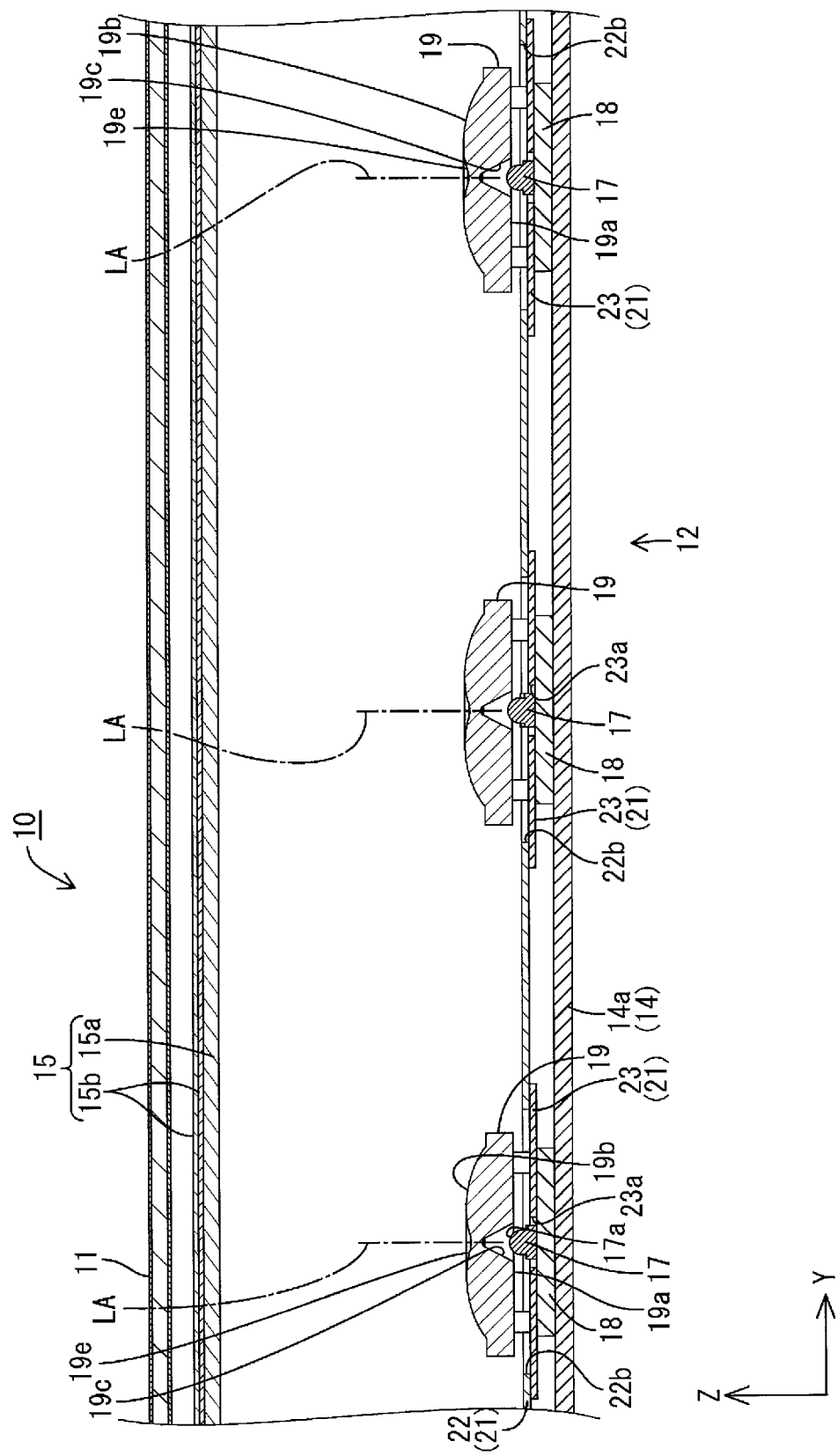
FIG. 8 is a sectional view taken along line viii-viii in FIG. 6.
Figure 9:
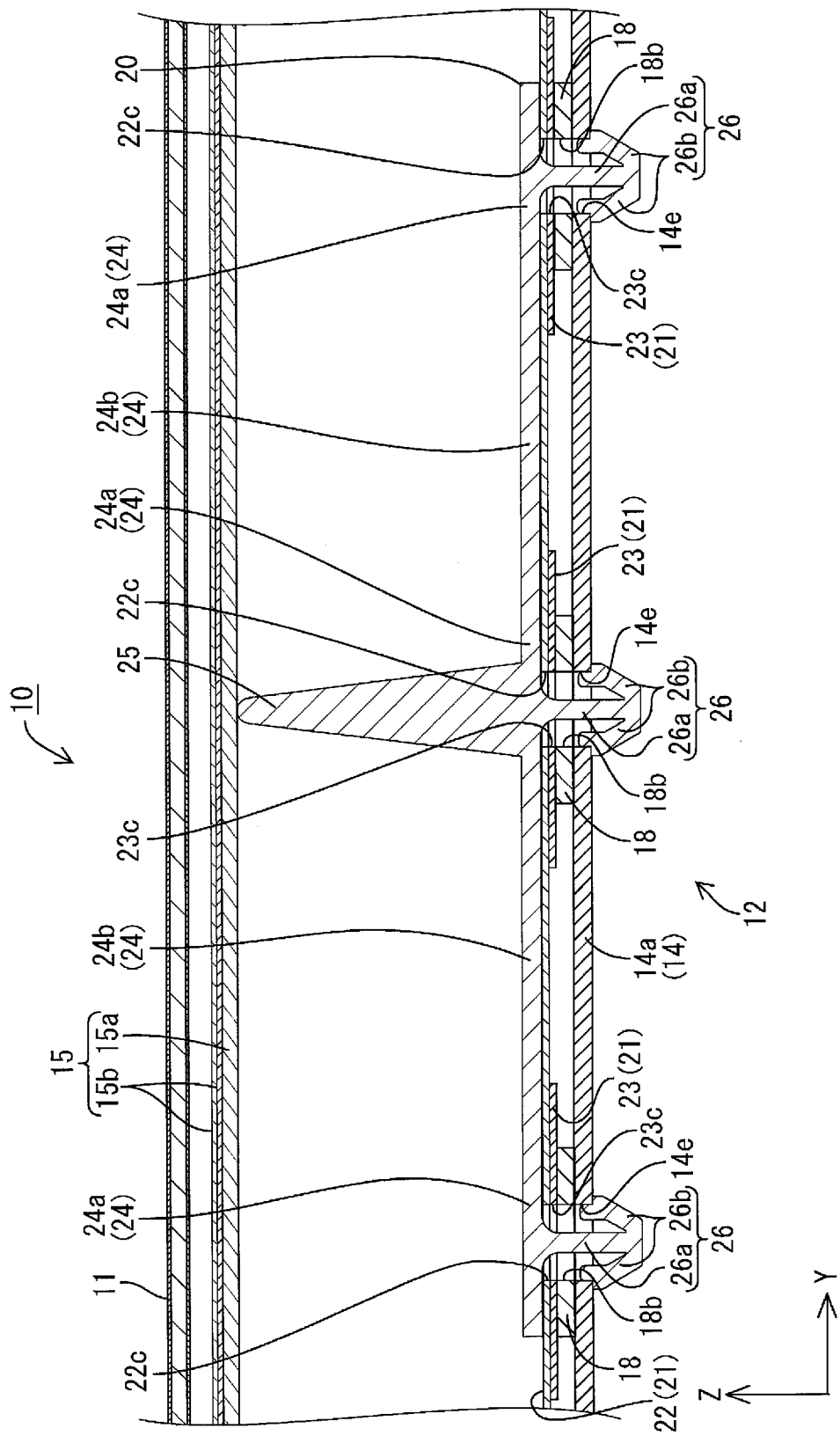
FIG. 9 is a sectional view taken along line ix-ix in FIG. 6.

As shown in FIG. 2, like the liquid crystal panel 11 and the chassis 14, the optical member 15 is shaped like an oblong quadrangle (rectangular) in a plan view. As shown in FIGS. 4 and 5, the optical member 15 covers the openings 14b of the chassis 14 by placing its outer edge on the receiving plates 14d, and is interposed between the liquid crystal panel 11 and the LEDs 17. The optical member 15 consists of the diffuser 15a arranged on the back side (the side of the LEDs 17, the side opposite to the light-emitting side) and the optical sheets 15b arranged on the front side (the side of the liquid crystal panel 11, the light-emitting side). The diffuser 15a is formed by dispersing multiple diffusing particles in a substantially transparent resin base member having a predetermined thickness and has a function of diffusing transmitted light. The optical sheet 15b is shaped like a thinner sheet than the diffuser 15a and two sheets are laminated (FIGS. 7 to 9). Specific examples of the optical sheets 15b include diffuser sheets, lens sheets, reflection type polarizing sheets, and it is possible to select and use any of these sheets as appropriate.

As shown in FIG. 2, the frame 16 is shaped like a frame along outer circumferences of the liquid crystal panel 11 and the optical member 15. An outer edge of the optical member 15 can be pinched between the frame 16 and each of the receiving plates 14d (FIGS. 4 and 5). The frame 16 can receive the outer edge of the liquid crystal panel 11 from the backside and pinch the outer edge of the liquid crystal panel 11 between the frame 16 and the bezel 13 arranged on the front side (FIGS. 4 and 5).

Figure 10:
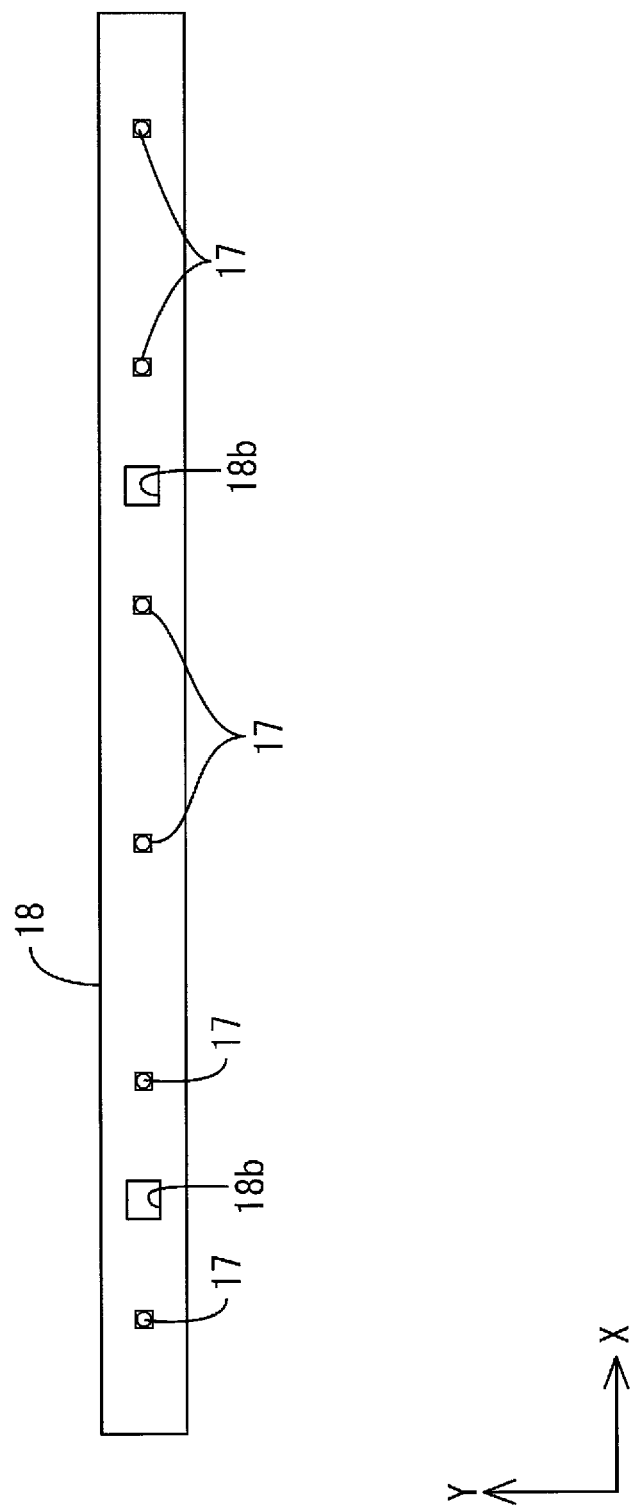
FIG. 10 is a plan view of the LED board.

Next, the LEDs 17 and the LED boards 18 that mount the LEDs 17 thereon will be described in detail. As shown in FIG. 7, FIG. 8 and FIG. 10, each of the LED 17 is formed by sealing an LED chip on a board portion fixedly attached to the LED board 18 with a resin material. The LED chip mounted on the board portion has one type of main light-emitting wavelength, and specifically, emits only blue light. Meanwhile, phosphors converting blue light emitted by the LED chip into white light are dispersedly mixed in the resin material sealing the LED chip. Thereby, the LED 17 can emit white light. This LED 17 is a so-called top type in which a surface on the side opposite to the mounting surface of the LED board 18 acts as a light-emitting surface 17a. An optical axis LA in the LED 17 substantially corresponds to the Z-axis direction (the direction orthogonal to the liquid crystal panel 11 and a main plate surface of the optical member 15). Light emitted from the LEDs 17 extends radially to some extent about the optical axis LA within a predetermined angular range in a three-dimensional way, and has a higher directivity than light from a cold cathode tube. That is, the light emission intensity of the LED 17 becomes remarkably high in a direction along the optical axis LA and rapidly lowers as inclination angle relative to the optical axis LA is larger.

As shown in FIG. 10, the LED board 18 has a base member shaped like a rectangle in a plan view, and is stored in the chassis 14 so that its long-side direction matches the X-axis direction and its short-side direction matches the Y-axis direction (FIG. 3). The base member of the LED board 18 is made of metal such as aluminum material that is the same as the material for the chassis 14, and has a surface on which a wiring pattern formed of a metal film such as a copper foil is formed via an insulating layer. Insulating materials such as ceramic can be used as the material for the base member of the LED board 18. As shown in FIG. 7, FIG. 8 and FIG. 10, the LEDs 17 having the above-mentioned configuration are mounted on a surface facing the front side (surface facing the optical member 15 side) among surfaces of the base member of the LED board 18. The plurality of LEDs 17 are linearly arranged along the long-side direction of the LED boards 18 (X-axis direction) in parallel, and are serially connected according to the wiring pattern formed on the LED boards 18. The alignment pitch of the LEDs 17 is almost constant, that is, the LEDs 17 are arranged at regular intervals. Each of the LED boards 18 has a connector portion 18a at both ends thereof in the long-side direction.

As shown in FIG. 3, the LED boards 18 having the above-mentioned configuration is arranged in the chassis 14 in each of the X-axis direction and the Y-axis direction so that the LED boards 18 are aligned in the long-side direction and the short-side direction in parallel. That is, the LED boards 18 and the LEDs 17 mounted thereon are arranged in the chassis 14 in a matrix having the X-axis direction (the long-side direction of the chassis 14 and the LED board 18) as a row direction and the Y-axis direction (the short-side direction of the chassis 14 and the LED board 18) as the column direction. Specifically, the three LED boards 18 in the X-axis direction x the nine LED boards 18 in the Y-axis direction, that is, 27 LED boards 18 in total are arranged in the chassis 14 in parallel. In this embodiment, two types of LED boards 18 having different long-side dimensions and the number of mounted LEDs 17 are used. Specifically, a six-mounted type of the LED board 18 that mounts the six LEDs 17 thereon and has a relatively long long-side dimension and a five-mounted type of the LED board 18 that mounts the six LEDs 17 thereon and has a relatively short long-side dimension are used as the LED boards 18, and the six-mounted type of the LED board 18 is arranged at each end of the chassis 14 in the X-axis direction and the five-mounted type of the LED board 18 is arranged at the center in the same direction. As described above, the LED boards 18 aligned in one row in the X-axis direction are electrically connected to each other by fitting the adjacent connector portions 18a with each other, and the connector portions 18a located at both ends of the chassis 14 in the X-axis direction are each electrically connected to an external control circuit not shown. Thereby, the LEDs 17 arranged on the LED board 18 forming one row are serially connected to one another, so that lighting-on and off of the lot of LEDs 17 contained in the one row can be controlled together by one control circuit, which enables reduction in costs. Even the different types of LED boards 18 having different long-side dimensions and the number of mounted LEDs 17 have the substantially identical short-side dimension and alignment pitch of the LEDs 17.

By preparing plural types of LED boards 18 having different long-side dimensions and the number of mounted LEDs 17 and appropriately using the different types of LED boards 18 in combination, following effects can be obtained. That is, plural types of liquid crystal display device 10 having different screen sizes can be manufactured by appropriately changing the appropriateness of use of each type of LED board 18 and the number of LED boards 18 of each type according to each screen size, and as compared to the case where an LED board having the same long-side dimension as the long-side dimension of the chassis 14 is prepared for each screen size, the number of types of necessary LED boards 18 can be greatly reduced, which enables reduction in costs. Specifically, by adding an eight-mounted type LED board that mounts eight LEDs 17 thereon to the above-mentioned two types of LED boards 18 (the five-mounted type and the six-mounted type) and appropriately using the three types of LED boards 18 in combination, each of the liquid crystal display devices 10 having the screen size of 26 inches, 32 inches, 37 inches, 40 inches, 42 inches, 46 inches, 52 inches and 65 inches can easily be manufactured.

Figure 11:
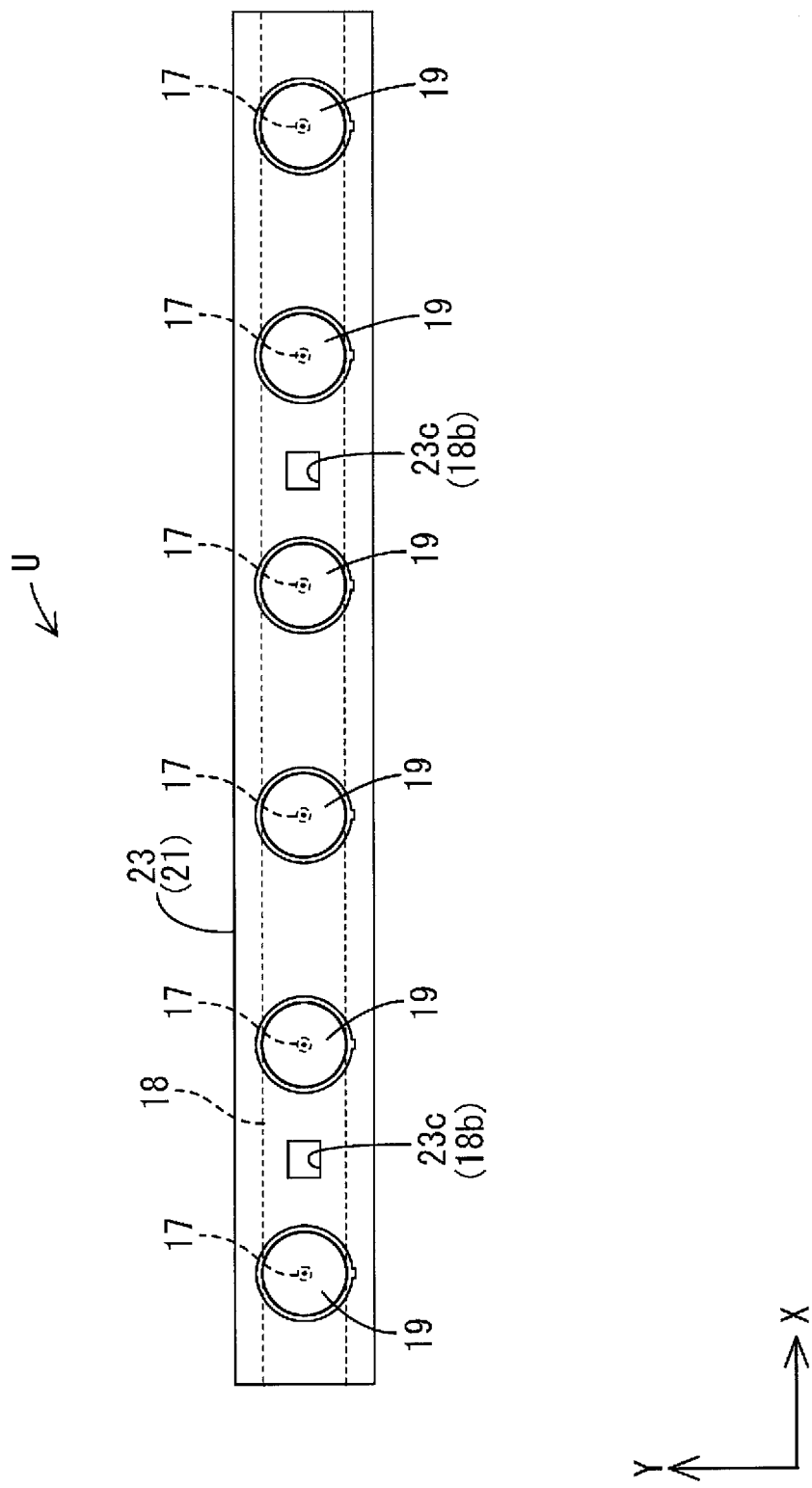
FIG. 11 is a plan view showing the state where a second reflection sheet and diffuser lenses are attached to the LED board (light source unit)

The diffuser lenses 19 are made of a synthetic resin material (e.g. polycarbonate and acrylic) that is substantially transparent (highly light transmissive) and has a higher refractive index than air. As shown in FIG. 7, FIG. 8 and FIG. 11, the diffuser lenses 19 each have a predetermined thickness, are formed to be substantially circular in a plan view, and are attached so as to cover the respective LEDs 17 from the front side of the LED board 18, that is, to overlap with the respective LEDs 17 in a plan view. The diffuser lenses 19 can emit highly directive light from the LEDs 17 while diffusing the light. That is, since directivity of the light emitted from the LEDs 17 is reduced through the diffuser lenses 19, even when the interval of the adjacent LEDs 17 is set large, a region between the LEDs 17 is hard to be visually recognized as a dark place. Thereby, the number of installed LEDs 17 can be reduced. Each diffuser lens 19 is located to be substantially concentric with each LED 17 in a plan view. Each diffuser lens 19 has sufficiently larger dimensions in the X-axis direction and in the Y-axis direction than each LED 17. Although the diffuser lens 19 has a smaller dimension in the X-axis direction than the LED board 18, the diffuser lens 19 has a larger dimension Y-axis direction than the LED board 18. Accordingly, both ends of the diffuser lens in the Y-axis direction each protrude outward by a predetermined dimension from the LED board 18 in the Y-axis direction.

In each of the diffuser lenses 19, a surface that faces the back side and is opposite to the LED board 18 is a light incidence surface 19a on which light from the LED 17 is incident, while a surface that faces the front side and is opposite to the optical member 15 is a light emitting surface 19b. As shown in FIGS. 7 and 8, the light incidence surface 19a extends in parallel to a plate surface of the LED board 18 (the X-axis direction and the Y-axis direction) as a whole, but has an inclined surface obtained by forming a light incidence-side concave portion 19c in a region where the light incidence surface 19a and the LED overlap with each other in a plan view. The light incidence-side concave portion 19c is substantially conical, is located to be almost concentric with the diffuser lens 19 and is opened toward the backside, that is, the LED 17. The light incidence-side concave portion 19c has the largest diameter at its opened end facing the LED 17, which is larger than the diameter of the LED 17, and becomes smaller toward the front side in diameter continually and gradually, and finally becomes the smallest at its end of the front side. The light incidence-side concave portion 19c has a substantially inverted V-shaped cross section and a circumferential surface thereof is inclined relative to the Z-axis direction. The inclined surface is inclined so that the end of the front side crosses the optical axis LA of the LED 17. Accordingly, light emitted from the LED 17 and entering into the light incidence-side concave portion 19c is incident into the diffuser lens 19 through the inclined surface. At this time, the incident light is refracted away from the center, that is, with a wide angle, by an inclined angle of the inclined surface relative to the optical axis LA and is incident into the diffuser lens 19.

The light incidence surface 19a of the diffuser lens 19 has attachment shaft portions 19d at positions outer of the light incidence-side concave portion 19c in the radial direction. The attachment shaft portions 19d protrude toward the LED board 18 and serve as attachment structure of the diffuser lens 19 to the LED board 18. The attachment shaft portions 19d are located closer to an outer edge than the light incidence-side concave portion 19c in the diffuser lens 19, and a line connecting the attachment portions is substantially equilateral-triangular in a plan view. By fixing each of front ends of the attachment shaft portions 19d to the LED board 18 with an adhesive or the like, the diffuser lens 19 can be fixedly attached to the LED board 18. The diffuser lens 19 is fixed to the LED board 18 through the attachment shaft portions 19d so as to have a predetermined gap between the light incidence surface 19a and the LED board 18. This gap allows incidence of light from space outer of the diffuser lens 19 in a plan view. In the above-mentioned attachment state, a front end of the LED 17 protruding from the LED board 18 enters into the light incidence-side concave portion 19c.

The light emitting surface 19b in the diffuser lens 19 is shaped like a substantially flat spherical surface. Thereby, the diffuser lens 19 can emit light while refracting the light on an interface with an external air layer in a direction away from the center, that is, with a wide angle. The light emitting surface 19b has a light-emitting side concave portion 19e. The light-emitting side concave portion 19e is formed in a region where the light emitting surface 19b overlaps with the LED 17 in a plan view. The light-emitting side concave portion 19e is substantially bowl-like and is shaped like a substantially flat sphere having a circumferential surface inclined downward toward the center. An angle that a tangent line to the circumferential surface of the light-emitting side concave portion 19e forms with the optical axis LA of the LED 17 is set to be larger than an angle that the inclined surface of the light incidence-side concave portion 19c forms with the optical axis LA. The region where the light emitting surface 19b overlaps with the LED 17 in a plan view receives extremely larger light amount from the LED 17 than the other region and therefore, its brightness tends to locally become high. However, by forming the light-emitting side concave portion 19e in the region, it becomes possible to emit most of the light from the LED 17 while refracting the light with a wide angle, or reflect a part of the light from the LED 17 toward the LED board 18. Thereby, it is possible to prevent the brightness of the region where the light emitting surface 19b overlaps with the LED 17 from locally becoming high, which is suitable for prevention of uneven brightness.

Next, the reflection sheet 21 will be described. The reflection sheet 21 consists of a first reflection sheet 22 that covers the substantially entire range of the inner surface of the chassis 14 and a second reflection sheet 23 that covers each of the LED boards 18. Both the reflection sheets 22 and 23 are made of synthetic resin and have a white surface with excellent light reflectance.

Figure 6:
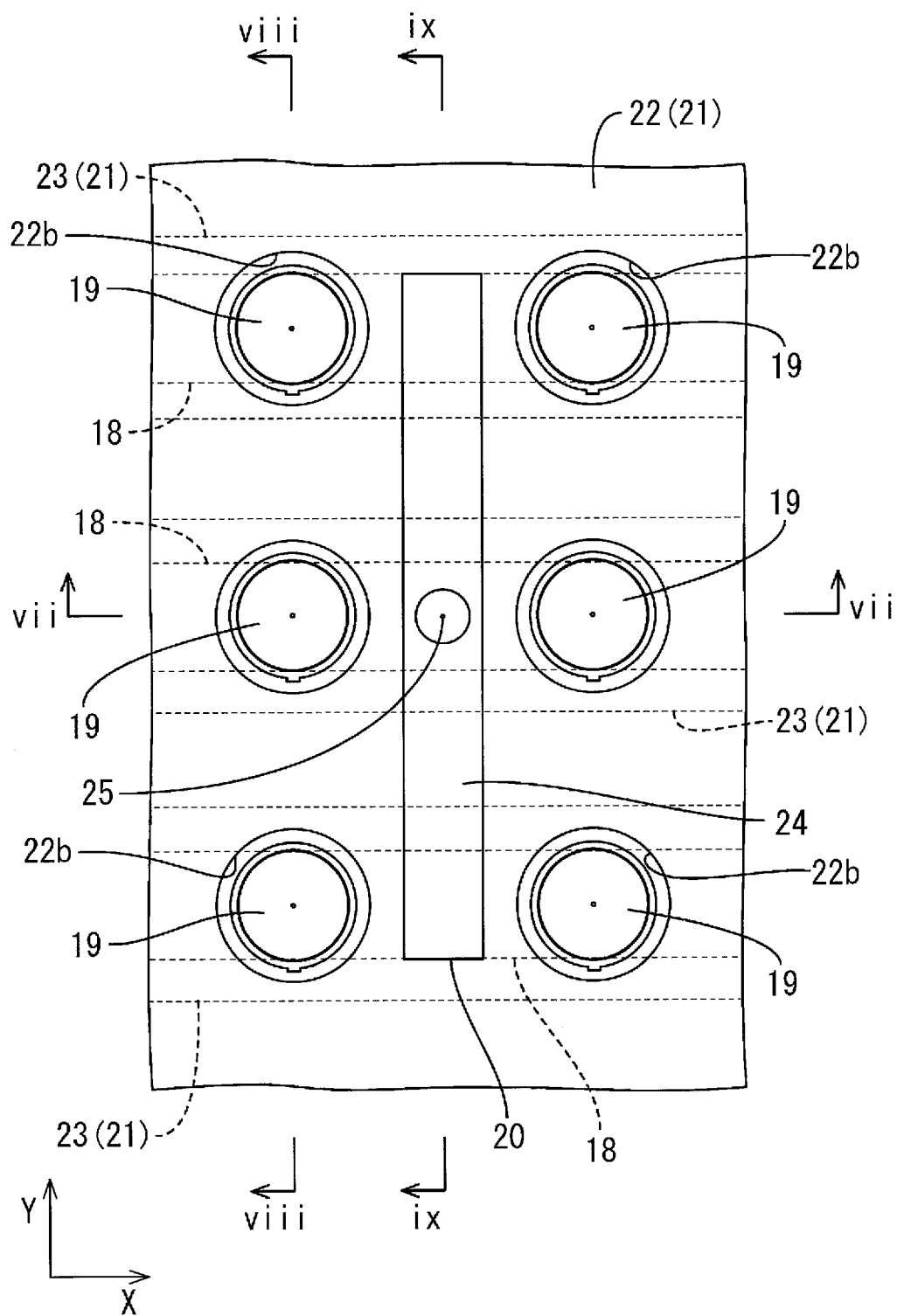
FIG. 6 is a plan view showing a detailed arrangement of the LED boards and the supporting members.

First, the first reflection sheet 22 will be described. As shown in FIG. 3, most part of the first reflection sheet 22 on the center side, which extends along the bottom plate 14a of the chassis 14, is a body portion 22a. The body portion 22a includes a lens insertion hole 22b. The lens insertion hole 22b is configured to pass through the body portion 22a and pass each LED 17 arranged in the chassis 14 as well as each diffuser lens 19 covering the LED 17 thereinto. The plurality of lens insertion holes 22b is arranged in parallel at positions where the holes 22b overlap with the LEDs 17 and diffuser lenses 19 on the body portion 22a in a plan view in a matrix. As shown in FIG. 6, each lens insertion hole 22b is circular in a plan view and has a larger diameter than the diffuser lens 19. Thereby, when the first reflection sheet 22 is installed in the chassis 14, the diffuser lenses 19 can surely be inserted into the respective lens insertion holes 22b irrespective of presence or absence of dimension error. Since the first reflection sheet 22 covers regions between adjacent diffuser lenses 19 and regions on the outer circumferential side in the chassis 14 as shown in FIG. 3, light toward each of the regions can be reflected toward the optical member 15. Further, as shown in FIGS. 4 and 5, outer circumferential portions of the first reflection sheet 22 rise so as to cover the side plates 14c and the receiving plates 14d of the chassis 14, and portions placed on the receiving plates 14d are sandwiched between the chassis 14 and the optical member 15. The first reflection sheet 22 has an inclined portion that connects the body portion 22a with each of the portions placed on the receiving plates 14d.

Meanwhile, the second reflection sheet 23 has, as shown in FIG. 11, the almost same appearance as the LED board 18, that is, is rectangular in a plan view. As shown in FIGS. 7 and 8, the second reflection sheet 23 is arranged so as to overlap with the front side surface of the LED board 18, and is opposite to the diffuser lens 19. That is, the second reflection sheet 23 is interposed between the diffuser lens 19 and the LED board 18. Accordingly, light returned from the diffuser lens 19 to the LED board 18 and light entering from space outer of the diffuser lens 19 in a plan view into space between the diffuser lens 19 and the LED board 18 can be reflected toward the diffuser lens 19 by the second reflection sheet 23 again. As a result, light utilization efficiency can be enhanced, thereby increasing brightness. In other words, even when the number of installed LEDs 17 is reduced to cut costs, sufficient brightness can be obtained.

As shown in FIG. 11, the second reflection sheet 23 has the almost same long-side dimension as the LED board 18 and has a larger short-side dimension than the LED board 18. Further, as shown in FIGS. 6 and 8, the short-side dimension of the second reflection sheet 23 is set to be larger than the diameter of the diffuser lens 19 and the lens insertion hole 22b of the first reflection sheet 22. Accordingly, the first reflection sheet 22 can be arranged on the second reflection sheet 23 so that an edge of the lens insertion hole 22b in the first reflection sheet 22 is oriented to the front side. Thereby, the first reflection sheet 22 and the second reflection sheet 23 are continuously arranged in the chassis 14 without any gap in a plan view, and the chassis 14 or the LED board 18 is hardly exposed from the lens insertion hole 22b toward the front side. Therefore, light in the chassis 14 can be efficiently reflected toward the optical member 15, which is extremely preferable for improvement of brightness. The second reflection sheet 23 includes LED insertion holes 23a that pass the respective LEDs 17 therethrough and shaft portion insertion holes 23b that pass the respective attachment shaft portions 19d of the diffuser lens 19 therethrough at overlapping positions in a plan view.

Subsequently, the supporting member 20 will be described. The supporting member 20 according to this embodiment has both of a function of supporting the optical member 15 and a function of fixing the LED board 18 to the chassis 14. Specific configuration and the functions of the supporting member 20 will be described below in detail.

The supporting member 20 is made of synthetic resin such as polycarbonate and has a surface of white color having a high light reflectance. First, arrangement of the supporting member 20 at the chassis 14 will be described. As shown in FIG. 3, the supporting member 20 is rectangular as a whole in a plan view, and is attached to the chassis 14 in the state where its long-side direction matches the Y-axis direction (short-side direction of the chassis 14 and LED board 18) and its short-side direction matches the X-axis direction (long-side direction of the chassis 14 and the LED board 18). The plurality of supporting members 20 is distributed in the plane of the bottom plate 14a of the chassis 14 in a zigzag manner. Describing in detail, the supporting members 20 are arranged at predetermined intervals in parallel in the X-axis direction to form one row, and a plurality of pairs of rows are arranged in the Y-axis direction to achieve planar arrangement. The adjacent rows in the Y-axis direction are located so that the supporting members 20 in one row and the supporting members 20 in the other row are staggered in the X-axis direction. Specifically, the six supporting members 20 are aligned in the X-axis direction to form one row and the three rows are aligned in the Y-axis direction. The supporting members 20 each are arranged in the chassis 14 so as to overlap with the LED board 18 in a plan view and are fixed to the chassis 14, thereby sandwiching the overlapping LED board 18 between the supporting member 20 and the chassis 14.

Next, configuration of each supporting member 20 will be described. As shown in FIGS. 7 and 9, the supporting member 20 includes a body portion 24 extending along the bottom plate 14a of the chassis 14 and the plate surface of the LED board 18, a supporting portion 25 that protrudes from the body portion 24 toward the front side, that is, the optical member 15 and is configured to contact with the optical member 15 and a fixed portion 26 that protrudes from the body portion 24 toward the back side, that is, the chassis 14 and is fixed to the chassis 14.

As shown in FIGS. 12 and 13, the body portion 24 is rectangular in a plan view, and is shaped like a plate extending in the X-axis direction and the Y-axis direction. As shown in FIG. 6, long-side dimension of the body portion 24 is set to be larger than short-side dimension of the LED board 18, and an interval (arrangement pitch) between the LED boards 18 arranged in parallel in the Y-axis direction in the chassis 14. Therefore, when the body portion 24 is arranged in the chassis 14 in the state where the long-side direction matches the Y-axis direction, at least a part of the body portion 24 overlaps with the LED board 18 in a plan view. Since the body portion 24 is attached, with the LED board 18 and each of reflection sheets 22 and 23 being previously arranged in the chassis 14, the LED board 18 and each of reflection sheets 22,23 can be held together between the above-mentioned overlapping part in the body portion 24 and the bottom plate 14a of the chassis 14 (FIGS. 7 and 9). Hereinafter, a part of the body portion 24, which overlaps with the LED board 18 in a plan view and sandwiches LED board 18 between the part and the bottom plate 14a, is referred to as a sandwiching portion 24a.

Describing in detail, as shown in FIGS. 6 and 9, the body portion 24 has a dimension so that the long-side dimension covers the plurality of LED boards 18 arranged in parallel in the Y-axis direction in the chassis 14. Accordingly, the body portion 24 can cross over (traverse) the plurality of LED boards 18 arranged in parallel in the Y-axis direction along the Y-axis direction (short-side direction of the LED board 18), thereby sandwiching each of the plurality of LED boards 18 over the entire length in the short-side direction. In other words, it can be said that the body portion 24 includes the plurality of sandwiching portions 24a, and each of the sandwiching portions 24a are separated from each other in the Y-axis direction as the parallel arrangement direction of the LED boards 18. In other words, the body portion 24 consists of the plurality of sandwiching portions 24a separated from each other in the Y-axis direction and coupling portions 24b coupling the sandwiching portions 24a to each other. Specifically, the long-side dimension of the body portion 24 is set to be equal to about a sum of three times of the short-side dimension of the LED board 18 and twice of the interval between the LED boards 18 aligned in the Y-axis direction in the chassis 14, so that the body portion 24 can cross over the three LED boards 18 in the short-side direction and sandwich these LED boards 18 together between the body portion 24 and the bottom plate 14a.

As shown in FIGS. 6 and 7, the short-side dimension of the body portion 24 is set to be smaller than the interval (arrangement pitch) between the adjacent diffuser lenses 19 (LEDs 17). As a result, the body portion 24 is arranged passing the region between the adjacent diffuser lenses 19 (LEDs 17) on the LED board 18, that is, a non-light emitting part of the LED board 18 and thus, does not overlap with the LED 17 in a plan view. That is, it is prevented that the body portion 24 blocks light emission from the LED 17. In this embodiment, since the interval between the LEDs 17 is sufficiently large by using the diffuser lenses 19 as described above, the supporting member 20 is arranged by use of the space and the supporting member 20 fixes the LED board 18.

The supporting members 20 having the body portion 24 with the above-mentioned configuration, as shown in FIG. 3, are arranged in the vicinity of both ends of the LED board 18 in the long-side direction, that is, at two positions separated from each other in the long-side direction (X-axis direction). Thereby, the LED board 18 is stably fixed in the vicinity of the both ends in the long-side direction by the pair of supporting members 20 in a balanced manner. Specifically, an interval between the pair of supporting members 20 fixing one LED board 18 is set so that two or three diffuser lenses 19 (LEDs 17) can be interposed between the pair of supporting members 20. The supporting members 20 in adjacent rows in the Y-axis direction are staggered each other in the X-axis direction so that one diffuser lens 19 (LED 17) can be interposed between the supporting members 20.

As shown in FIGS. 7 and 9, the supporting portion 25 protrudes from the front side surface (surface opposite to the optical member 15) of the body portion 24 toward the front side, and is conically shaped as a whole. Describing in detail, the supporting portion 25 is tapered so that its cross section taken along the plate surface of the body portion 24 is circular and becomes gradually smaller from a protruding bottom end toward a protruding front end. The supporting portion 25 can be in contact with the diffuser plate 15a arranged closest to the backside (side of the LED 17) in the optical member 15, thereby supporting the diffuser plate 15a at a predetermined position. That is, the supporting portion 25 can restrict positional relationship between the optical member 15 and the LED 17 in the Z-axis direction (direction orthogonal to the surface of the optical member 15) to be constant. Since the plurality of supporting members 20 each having the supporting portion 25 are distributed in the chassis 14, the optical member 15 can be properly supported in the surface without lack of balance (FIG. 3).

Specifically, as shown in FIGS. 6 and 12, the supporting portion 25 according to this embodiment is located substantially at the center of the body portion 24. The outer diameter of the protruding bottom end of the supporting portion 25 is set to be smaller than both the short-side dimension of the body portion 24 and the short-side dimension of the LED board 18. That is, the supporting portion 25 is point in a plan view, while the body portion 24 is planar covering a wider range than the supporting portion 25 in a plan view. As shown in FIGS. 7 and 9, the protrusion dimension of the supporting portion 25 is almost equal to a distance between the front side surface of the body portion 24 to the back side surface of the diffuser plate 15a extending in the X-axis direction and the Y-axis direction substantially straightforward. Accordingly, the supporting portion 25 is in contact with the substantially straight diffuser plate 15a. The protruding front end of the supporting portion 25 as a contact part with the diffuser plate 15a is rounded. Since only the supporting portion 25 in the supporting member 20 protrudes from the body portion 24 toward the front side, when the supporting member 20 is attached to the chassis 14, the operator can use the supporting portion 25 as an operating portion. Thereby, workability in attaching or detaching the supporting member 20 can be improved.

As shown in FIG. 9, the fixed portion 26 includes a bottom portion 26a protruding from the back side surface (surface opposite to the chassis 14) of the body portion 24 toward the back side, and a pair of elastic engaging pieces 26b folded from a front end of the bottom portion 26a to the body portion 24 side. The bottom portion 26a is substantially block-like and as shown in FIG. 13, is shaped like an oblong rectangle extending in the short-side direction (X-axis direction) of the body portion 24 in a plan view. Both the elastic engaging pieces 26b are cantilevered to be coupled to both side surfaces on the long side at a front end of the bottom portion 26a, and can be elastically deformed using the coupling sites as fulcrums in the direction of attaching or detaching to/from the bottom portion 26a (Y-axis direction). As shown in FIG. 9, the fixed portion 26 can be engaged with the bottom plate 14a through the attachment hole 14e corresponding to the attachment position of the supporting member 20 to the bottom plate 14a of the chassis 14. Describing in detail, when the fixed portion 26 is inserted into the attachment hole 14e formed so as to penetrate the bottom plate 14a, the both elastic engaging pieces 26b pass through the attachment hole 14e and then, are elastically engaged with an edge of the back side of the attachment hole 14e. As a result, the supporting member 20 can be fixedly attached to the chassis 14. In the bottom plate 14a of the chassis 14, the three attachment holes 14e are arranged in parallel in the Y-axis direction at the attachment positions of the supporting members 20, and an interval between the attachment holes 14e is almost equal to an interval between the fixed portions 26.

The fixed portions 26 are linearly arranged in parallel in the long-side direction of the body portion 24. Each fixed portion 26 is provided corresponding to each sandwiching portion 24a of the body portion 24, which sandwiches each LED board 18 between the sandwiching portion 24a and the chassis 14. That is, each fixed portion 26 is located so as to overlap with the LED board 18 in the body portion 24 in a plan view. Specifically, since the three fixed portions 26 are arranged at the center and in vicinity of both ends of the body portion 24 in the long-side direction, a predetermined interval is held between the fixed portions 26 in the Y-axis direction. The LED board 18 has a through hole 18b configured to pass the fixed portion 26 therethrough at an overlapping position with the fixed portion 26 in a plan view. As shown in FIG. 10, a pair of through holes 18b is located in the vicinity of both ends of the LED board 18 in the long-side direction and between the adjacent LEDs 17 (diffuser lenses 19), that is, so as not to overlap with the LEDs 17 (diffuser lenses 19) in a plan view. The through holes 18b each are shaped so as to substantially match the planar shape of the fixed portion 26 and as shown in FIGS. 7 and 9, pass through the LED board 18 in the Z-axis direction, thereby enabling the fixed portion 26 to pass through the LED board 18. Accordingly, the LED board 18 can be positioned in the X-axis direction and the Y-axis direction by the fixed portions 26 passing through the through holes 18b. As shown in FIG. 7, FIG. 9 and FIG. 11, communicating holes 22c and 23c that communicate with the through holes 18b and pass the fixed portion 26 therethrough are formed in the reflection sheets 22 and 23 between the body portion 24 and the LED board 18 so as to overlap with the through holes 18b in a plan view. The interval between the fixed portions 26 is almost equal to the interval between the LED boards 18 aligned in the Y-axis direction (interval between the sandwiching portions 24a) (FIG. 6).

As shown in FIGS. 12 and 13, of the fixed portions 26, the fixed portion 26 arranged at the center of the body portion 24 is arranged so as to overlap with the supporting portion 25 arranged on the front side in a plan view. Describing in more detail, the central fixed portion 26 and the supporting portion 25 are arranged so as to be substantially concentric with each other in a plan view. With this configuration, in attaching the supporting member 20 to the chassis 14, when the operator uses the supporting portion 25 as the operating portion, by viewing the supporting portion 25 exposed on the front side, the position of the fixed portion 26 hidden on the back side can easily be recognized. Therefore, workability in inserting the fixed portion 26 into the communicating holes 22c and 23c, the through hole 18b and the attachment hole 14e can be improved.

This embodiment has the above-mentioned configuration, and its action will be described. The liquid crystal display device 10 shown in FIGS. 4 and 5 is manufactured by separately manufacturing the liquid crystal panel 11 and the backlight unit and assembling them by use of the bezel 13 or the like. Especially, the assembling operation in manufacturing the backlight unit 12 will be described in detail.

In this embodiment, prior to assembling of each component to the chassis 14, LEDs 17, the second reflection sheet 23 and the diffuser lenses 19 are attached to the LED board 18. Describing in detail, first, as shown in FIG. 10, after the LEDs 17 are mounted at predetermined positions on the LED board 18, the second reflection sheet 23 is attached to cover the front side. At this time, the LEDs 17 on the second reflection sheet 23 are inserted into the respective LED insertion holes 23a in the LED board 18. After that, as shown in FIG. 11, the diffuser lenses 19 are attached to the LED board 18 so as to cover the respective LEDs 17. At this time, the attachment shaft portions 19d of the diffuser lenses 19 are fixedly adhered to the LED board 18 with an adhesive through the respective shaft portion insertion holes 23b in the second reflection sheet 23. In this manner, a so-called light source unit U formed by uniting the LEDs 17, the second reflection sheet 23 and the diffuser lenses 19 is manufactured on the LED board 18.

Figure 14:
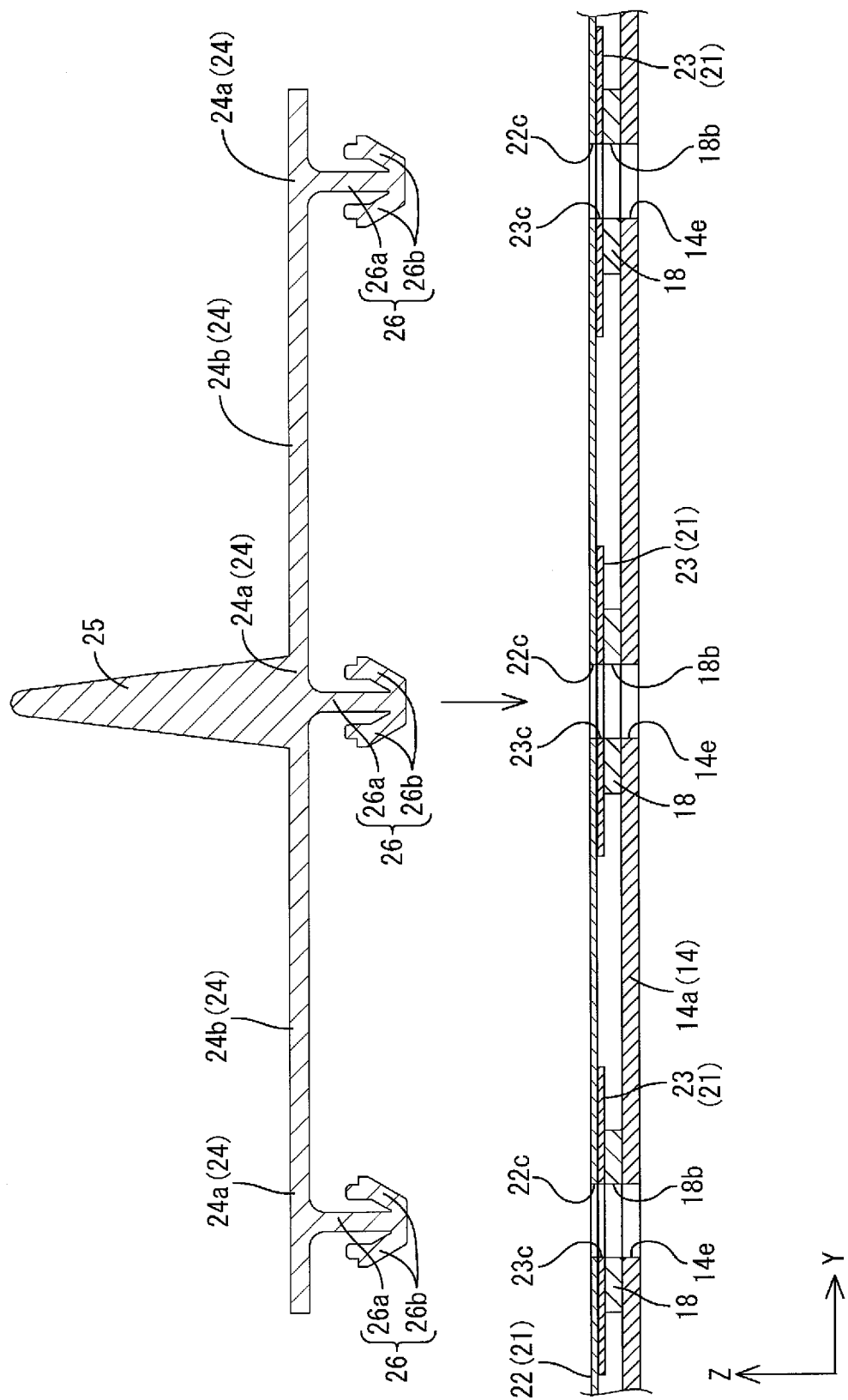
FIG. 14 is a sectional view taken along line ix-ix in FIG. 6 which shows the state before the supporting member is attached to the chassis.

Subsequently, an assembling operation of each component to the chassis 14 will be described. First, the light source units U are stored from the front side of the chassis 14 through the openings 14b and are arranged at predetermined attachment positions on the bottom plate 14a. At this time, each through hole 18b of the LED board 18 in the light source unit U is communicated with each attachment hole 14e of the chassis 14. Here, the adjacent LED boards 18 in the X-axis direction are electrically connected to each other by fitting the adjacent connector portions 18a with each other. The operation of connecting the LED boards 18 aligned in the X-axis direction to each other is not necessarily performed within the chassis 14, and may be performed outside of the chassis 14. When arrangement of all of the light source units U is completed, an operation of arranging the first reflection sheet 22 in the chassis 14 is performed. At this time, each diffuser lens 19 is inserted into each lens insertion hole 22b while positioning each lens insertion hole 22b of the first reflection sheet 22 with respect to each diffuser lens 19 in the light source unit U (FIG. 3). When the first reflection sheet 22 is attached, the first reflection sheet 22 is placed from the front side onto almost all portions of the second reflection sheet 23 other than the overlapping portion with the diffuser lens 19 in a plan view (FIGS. 7 and 8). Especially, the edge of the lens insertion hole 22b of the first reflection sheet 22 is entirely placed on the front side of the second reflection sheet 23. As shown in FIG. 14, the communicating hole 22c of the first reflection sheet 22 matches the communicating hole 23c of the second reflection sheet 23, the through hole 18b of the LED board 18 and the attachment hole 14e of the chassis 14 to be communicated with one another. After that, an operation of assembling the supporting member 20 is performed.

In assembling the supporting member 20 to the chassis 14, the operator can use the supporting portion 25 protruding toward the front side in the supporting member 20 as the operating portion. In other words, the operator can operate the supporting member 20 while gripping the supporting portion 25 in the state shown in FIG. 14, store the supporting member 20 from the front side of the chassis 14 through the opening 14b, and insert each fixed portion 26 hidden on the back side into the corresponding communicating holes 22c and 23c, through hole 18b and attachment hole 14e through the body portion 24 while keeping the state where the long-side direction of the body portion 24 matches the Y-axis direction and the short-side direction of the body portion 24 matches X-axis direction. At this time, since the supporting portion 25 and the central fixed portion 26 of the body portion 24 are arranged so as to overlap with each other in a plan view and are concentric with each other, the operator can easily recognize the position of at least the central fixed portion 26. Accordingly, each fixed portion 26 can be smoothly inserted into each of the holes 14e, 18b, 22c and 23c.

During the course of inserting the fixed portion 26 into each of the holes 14e, 18b, 22c and 23c, the both elastic engaging pieces 26b are elastically deformed once so as to get close to the bottom portion 26a (become hollowed). After that, when the fixed portion 26 is inserted so that the both elastic engaging pieces 26b reach the back side of the chassis 14, as shown in FIGS. 7 and 9, the both elastic engaging pieces 26b elastically return and their front ends are engaged with the edge of the attachment hole 14e from the back side. Thereby, the supporting member 20 is prevented from being detached from the chassis 14 and is fixed to the attached state. In this state, the LED board 18 and each of the reflection sheets 22 and 23 are sandwiched between the body portion 24 (sandwiching portion 24a) of the supporting member 20 and the bottom plate 14a of the chassis 14. Since the body portion 24 has a predetermined width in the X-axis direction, extends in the Y-axis direction and presses the LED board 18 in the short-side direction over entire length from the front side, the pressed area of the LED board 18 can be sufficiently ensured, thereby stably fixing the LED board 18. Moreover, since in the LED board 18 includes the through hole 18b and the fixed portion 26 passes through the through hole 18b, the LED board 18 is prevented from carelessly moving the X-axis direction and the Y-axis direction and thus, is positioned in these directions. Further, the engaging force of the fixed portion 26 engaged with the chassis 14 directly acts on the position immediately under the LED board 18 and can firmly fix the LED board 18 with a large holding force. Furthermore, since fixation is achieved by passing the fixed portion 26 through the attachment hole 14e formed in the chassis 14 and engaging the fixed portion 26 with the chassis 14, as compared to the case of using fixing means such as adhesive, fixation can be performed at lower costs and more easily, and the supporting member 20 can easily be detached at maintenance and disposal. Since each of the reflection sheets 22 and 23 are sandwiched between the body portion 24 and the LED board 18, positioning and fixation of the reflection sheets 22 and 23 can be achieved at the same time.

As shown in FIG. 3, a pair of supporting members 20 is provided correspondingly in the vicinity of each end of each LED board 18 in the long-side direction. Accordingly, each LED board 18 is stably fixed at two positions near the both ends in the long-side direction. Moreover, as shown in FIGS. 6 and 9, since the body portion 24 of each supporting member 20 crosses three LED boards 18 and fixes the three LED boards 18 together, as compared to the case where the LED boards 18 are separately fixed by the supporting members, the number of the supporting members 20 and the number of times of assembling works can be reduced, thereby cutting costs and improving working efficiency. As shown in FIG. 7, since the body portion 24 of the supporting member 20 is arranged so as to pass between the adjacent LEDs 17 (diffuser lenses 19) on the LED board 18, light emitted from the LEDs 17 is not blocked.

After that, the optical member 15 is attached to the chassis 14 so as to cover the openings 14b. According to the specific attaching order of the optical member 15, the diffuser 15a, and then, the optical sheets 15b are attached. As shown in FIGS. 4 and 5, an outer edge of the optical member 15 is received by the receiving plate 14d of the chassis 14 and its middle part is supported by the supporting portion 25 of each supporting member 20. Then, when the frame 16 is attached to the chassis 14, the outer circumference of the optical member 15 is pinched between the frame 16 and the receiving plates 14d. Thereby, manufacturing of the backlight unit 12 is completed. In assembling the manufactured backlight unit 12 and the liquid crystal panel 11, the liquid crystal panel 11 is placed on the frame 16 and then, the bezel 13 is covered on the front side, and they are screwed together. Thereby, the liquid crystal panel 11 is pinched between the frame 16 and the bezel 13 and becomes integral with the backlight unit 12, resulting in that manufacturing of the liquid crystal display device 10 is completed.

In using the liquid crystal display device 10 manufactured as described above, each of the LEDs 17 provided in the backlight unit 12 is lit and an image signal is supplied to the liquid crystal panel 11, thereby displacing a predetermined image on a display screen of the liquid crystal panel 11. As shown in FIGS. 7 and 8, light emitted to light each of the LEDs 17 is first incident on the light incidence surface 19a of the diffuser lens 19. At this time, most of the light is incident on an inclined surface of the light incidence-side concave portion 19c of the light incidence surface 19a and thus, into the diffuser lens 19 while being refracted with a wide angle according to the inclined angle. Then, the incident light propagates in the diffuser lens 19 and is emitted from the light emitting surface 19b. However, since the light emitting surface 19b is a substantially flat spherical surface, light is emitted while being further refracted at a boundary with the external air layer with a wider angle. Moreover, since the substantially bowl-like light-emitting side concave portion 19e is formed in a region where the amount of light from the LED 17 is the largest in the light emitting surface 19b, and its circumferential surface is a substantially flat spherical surface, light can be emitted while being refracted at the circumferential surface of the light-emitting side concave portion 19e with a wide angle, or can be reflected toward the LED board 18. Since light returned to the LED board 18 is reflected toward the diffuser lens 19 by the second reflection sheet 23 and is incident on the diffuser lens 19 once, high brightness can be obtained.

Since the highly directive light emitted from the LED 17 can be diffused with a wide angle by the diffuser lens 19, in-plane distribution of the light reaching the optical member 15 can be made uniform. In other words, since the region between the adjacent LEDs 17 becomes hard to be visually recognized as the dark place by using the diffuser lens 19, the interval between the LEDs 17 can be increased, thereby reducing the number of installed LEDs 17 while suppressing uneven brightness. Since the interval between the adjacent LEDs 17 can be widened by reducing the number of LEDs 17, the supporting member 20 can be arranged in the widened region and the supporting member 20 can fix the LED board 18.

Each LED 17 generates heat with lighting. Most of the heat generated from each LED 17 propagates to the chassis 14 through the LED board 18 that mounts the LED 17 thereon and is dissipated to air outside of the liquid crystal display device 10. Considering heat radiation efficiency at this time, as closeness between the LED board 18 and the chassis 14 is higher, heat transfer performances of the LED board 18 and the chassis improve and heat radiation efficiency becomes higher. Conversely, closeness between the LED board 18 and the chassis 14 is lower, heat transfer performances of the LED board 18 and the chassis 14 lower and heat radiation efficiency becomes lower. In this embodiment, heat radiation efficiency is improved by fixing the LED board 18 to the chassis 14 by means of the supporting member 20 and adopting following configuration. In other words, since the LED board 18 is planarly pressed over the entire length in the short-side direction by the sandwiching portion 24a of the body portion 24 to ensure a sufficiently large pressed area, the LED board 18 is stably held by the chassis 14 in intimate contact with the chassis 14. Moreover, since the fixed portion 26 fixed to the chassis 14 passes through the LED board 18, the engaging force directly acts and thus, the above-mentioned intimate contact is preferably maintained. Further, since the LED board 18 is fixed in the vicinity of the both ends in the long-side direction by the pair of supporting members 20, the LED board 18 is stably held in a well-balanced intimate contact state. As described above, since the LED board 18 is fixed to the chassis 14 in intimate contact with the chassis 14 by the supporting members 20, heat transfer performance to the chassis is extremely high, achieving efficient heat radiation. Therefore, since temperature inside the backlight unit 12 is hard to become high, it is possible to prevent lowering of light emission efficiency of each LED 17 and to stably obtain high brightness.

In using the liquid crystal display device 10 as described above, since each of the LEDs 17 in the backlight unit 12 is lit on or off, internal temperature environment changes and thus, each component of the liquid crystal display device 10 may be thermally expanded or thermally contracted. Since among the components of the liquid crystal display device 10, the optical member 15 is a large synthetic resin part having a high thermal expansion coefficient, the amount of expansion or contraction of the optical member 15 due to thermal expansion or thermal contraction tends to become especially large. For this reason, the thermally expanded or contracted optical member 15 is easy to be subjected to deformation such as warpage or flexure. However, since the supporting portion 25 of each of the supporting members 20 distributed in the chassis 14 is in contact with the diffuser plate 15a of the optical member 15, the optical member 15 is restricted from being displaced toward the LED 17. That is, since the supporting portion 25 restricts positional relationship between the optical member 15 and the LED 17 in the Z-axis direction to be constant, optical characteristics of light, which is emitted from the LED 17, enters into and is emitted from the optical member 15, can be kept constant. Thus, uneven brightness of light emitted from the backlight unit 12 and the liquid crystal display device 10 can be prevented.

As described above, the backlight unit 12 according to this embodiment includes the LED board 18 having the LED 17 as the light source, the chassis 14 storing the LED board 18 therein, the optical member 15 opposite to the LED board 18 and the supporting member 20 supporting the optical member 15 from the LED board 18 side, and the supporting member 20 is fixed to the chassis 14 so as to sandwich the LED board 18 between the supporting member 20 and the chassis 14.

With this configuration, when the supporting member 20 is fixed to the chassis 14, the LED board 18 is sandwiched between the supporting member 20 and the chassis 14, and is held in this state. Since the LED board 18 is fixed by means of the supporting member 20 supporting the optical member 15 from the LED board 18 side, the conventional screw for fixing the LED board 18 is not required. This can reduce the number of components and man hours, cut costs and improve working efficiency.

The supporting member 20 consists of the body portion 24 sandwiching the LED board 18 between the body portion 24 and the chassis 14, the supporting portion 25 that protrudes from the body portion 24 toward the optical member 15 and is configured to contact with the optical member 15, and the fixed portion 26 that protrudes from the body portion 24 toward the chassis 14 and is fixed to the chassis 14. With this configuration, by fixing the fixed portion 26 to the chassis 14, the LED board 18 sandwiched between the body portion 24 and the chassis 14 can be preferably fixed. Since the supporting portion 25 protruding from the body portion 24 can be in contact with the optical member 15, the optical member 15 can be preferably supported.

The fixed portion 26 is fixed to the chassis 14 through the LED board 18. With this configuration, since the fixed portion 26 fixed to the chassis 14 passes through the LED board 18, the LED board 18 can be fixed directly and firmly. Moreover, the fixed portion 26 passing through the LED board 18 can position the LED board 18 in the direction along the plate surface.

The fixed portion 26 passes through both the LED board 18 and the chassis 14, and is engaged with the chassis 14 from the opposite side to the LED board 18. With this configuration, since the supporting member 20 and LED board 18 can be fixed by engaging the fixed portion 26 passing through both the LED board 18 and the chassis 14 with the chassis 14, fixation can easily be achieved at low costs without using other fixing means such as adhesive.

The body portion 24 is formed so as to be larger than the supporting portion 25 in a plan view. With this configuration, since the area where the supporting member 20 presses the LED board 18 can be sufficiently ensured, the LED board 18 can be stably fixed. Thus, it is possible to stabilize optical characteristics of light, which is emitted from the LEDs 17 provided on the LED board 18 and passes through the optical member 15, as well as heat radiation performance from the LED board 18 to the chassis 14.

The body portion 24 extends in the Y-axis direction (at least one direction) along the plate surface of the LED board 18. With this configuration, the supporting member 20 can fix the LED board 18 more stably.

The LED board 18 is rectangular in a plan view, and the body portion 24 extends in the short-side direction of the LED board 18. With this configuration, as compared to the case the body portion extends in the long-side direction of the LED board, the supporting member 20 can be reduced in size.

The body portion 24 crosses over the LED board 18. With this configuration, LED the board 18 can be fixed more stably.

The plurality of LED boards 18 are arranged in parallel with the chassis 14, and the body portion 24 extends over the plurality of LED boards 18. With this configuration, since one supporting member 20 can fix the plurality of LED boards 18, the number of components can be preferably reduced.

The body portion 24 crosses over the plurality of LED boards 18. With this configuration, since the body portion 24 crosses over and sandwiches the plurality of LED boards 18 between the body portion 24 and the chassis 14, the plurality of LED boards 18 can be fixed more stably.

The body portion 24 had a plurality of fixed portions 26, and the plurality of fixed portion 26 are fixed to the chassis through respective different LED boards 18. With this configuration, each of the plurality of LED boards 18 can be firmly fixed and position in the plate surface of each LED board 18.

The plurality of LEDs 17 are arranged on the LED board 18 along the long-side direction. With this configuration, the plurality of LEDs 17 can be efficiently arranged on the LED board 18, which is preferable for higher brightness.

The body portion 24 is arranged so as to pass between the adjacent LEDs 17. With this configuration, space held between the adjacent LEDs 17 can be effectively used. Further, it can be prevented that body portion 24 blocks light generated from the LEDs 17.

The supporting members 20 are arranged at two positions separated from each other on the LED board 18 in the long-side direction. With this configuration, even the downsized supporting member 20 in which the body portion 24 extends in the short-side direction of the LED board 18 for downsizing can stably fix the LED board 18.

The chassis 14 is rectangular in a plan view, and the plurality of LED boards 18 are arranged in parallel so that its long-side direction matches the long-side direction of the chassis 14. With this configuration, as compared to the case where the plurality of LED boards 18 are arranged in parallel so that its long-side direction matches the short-side direction of the chassis 14, the number of the LED boards 18 arranged in the chassis 14 can be reduced. Accordingly, the number of components such as control circuits necessary for controlling lighting of the LEDs 17 arranged on each LED board 18 can be reduced, which is preferable for cost reduction.

The fixed portion 26 and the supporting portion 25 are located so as to overlap with each other in a plan view. With this configuration, when the operator attaches the supporting member 20 while gripping the supporting portion 25, the position of the fixed portion 26 can easily be recognized, which is excellent in workability. Further, the fixed portion 26 and the supporting portion 25 are located so as to be concentric with each other. With this configuration, workability is more excellent.

The reflection sheet 21 reflecting light toward the optical member 15 is arranged in the chassis 14, and the reflection sheet 21 is arranged closer to the optical member 15 than the LED board 18, and has the lens insertion hole 22b and the LED insertion hole 23a, which pass the LED 17 therethrough and overlap with the LED 17 in a plan view. With this configuration, light can be effectively used by reflecting light toward the optical member 15 by the reflection sheet 21, which is preferable for improvement of brightness. Since the reflection sheet 21 has the lens insertion hole 22b and the LED insertion hole 23a, light emission from the LED 17 is not blocked.

The diffuser lens 19 diffusing light from the LED 17 is arranged at the position overlapping with the LED 17 in a plan view on the LED board 18 on the optical member 15 side. With this configuration, light emitted from the LED 17 can be diffused by the diffuser lens 19 and then, guided to the optical member 15. As a result, unevenness of light emitted from the optical member 15 is hard to occur.

The reflection sheet 21 consists of the first reflection sheet 22 including the lens insertion hole 22b that is configured to pass the diffuser lens 19 therethrough, and the second reflection sheet 23 that is interposed between the LED board 18 and the diffuser lens 19, is located so as to overlap with the lens insertion hole 22b provided in the first reflection sheet 22 in a plan view (arranged in the lens insertion hole 22b in a plan view) and reflects light toward the diffuser lens 19. With this configuration, even when the first reflection sheet 22 includes the lens insertion hole 22b that is configured to pass the diffuser lens 19 therethrough, light can be reflected toward the diffuser lens 19 by the second reflection sheet 23 located so as to overlap with the lens insertion hole 22b (arranged in the lens insertion hole 22b in a plan view). As a result, light can be efficiently utilized, which is preferable for improvement of brightness.

The edge of the lens insertion hole 22b of the first reflection sheet 22 and the second reflection sheet 23 are formed so as to overlap with each other in a plan view. With this configuration, the edge of the lens insertion hole 22b of the first reflection sheet 22 and the second reflection sheet 23 are connected to each other in a plan view without any gap. Thus, light can be used more efficiently.

The reflection sheet 21 is sandwiched between the body portion 24 and the LED board 18. With this configuration, the supporting member 20 can fix both the LED board 18 and the reflection sheet 21.

The light source is the LED 17. With this configuration, higher brightness and lower power consumption can be achieved.

Although the first embodiment of the present invention has been described, the present invention is not limited to this embodiment and for example, may include the following modification examples. In each of the following modification examples, the same members as those in the above-mentioned embodiment are given the same reference numerals and illustration and description thereof may be omitted.

First Modification Example of First Embodiment

A first modification example of the first embodiment will be described with reference to FIG. 15 or FIG. 16. Here, configuration of the supporting member 20 is modified.

Figure 15:
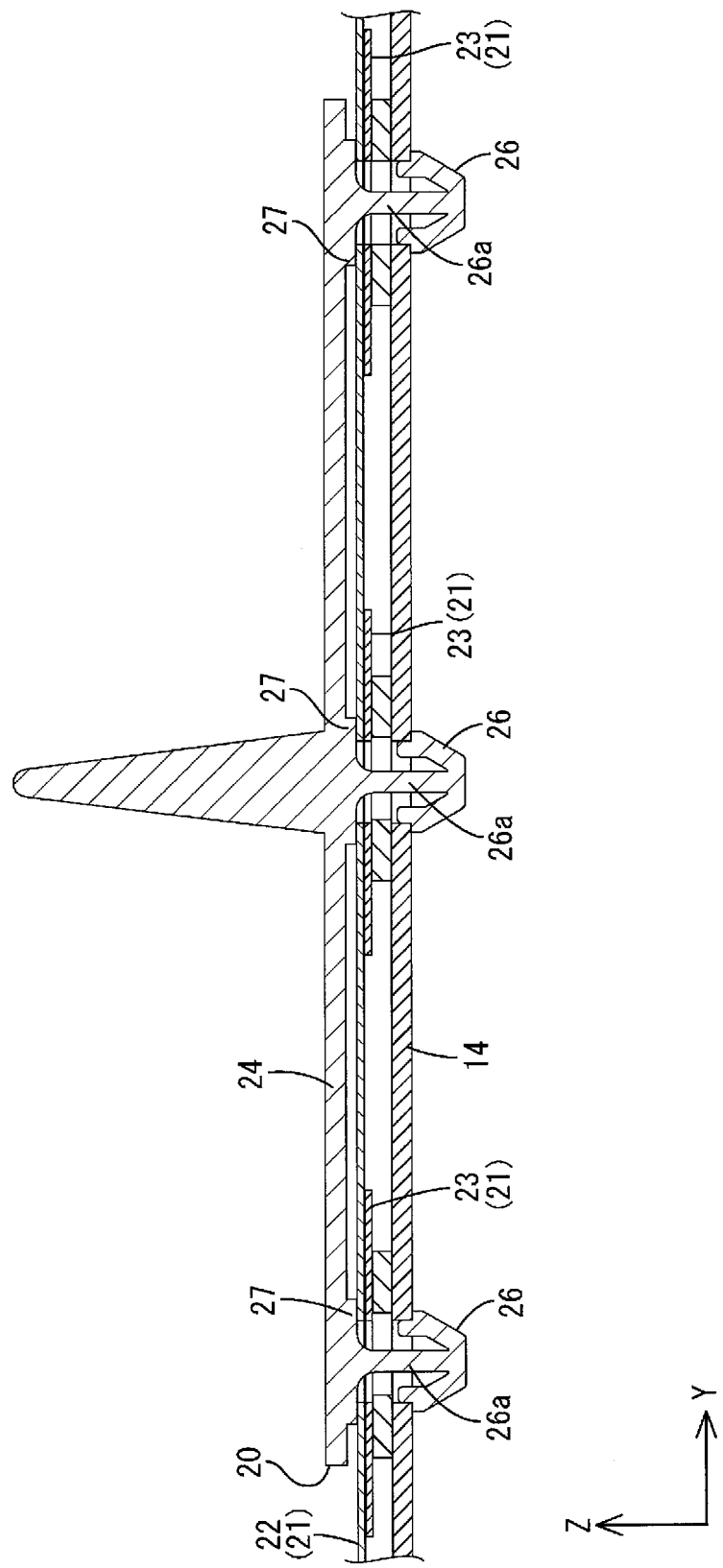
FIG. 15 is a sectional view showing the state where the supporting member is attached to the chassis in a first modification example of the first embodiment.
Figure 16:
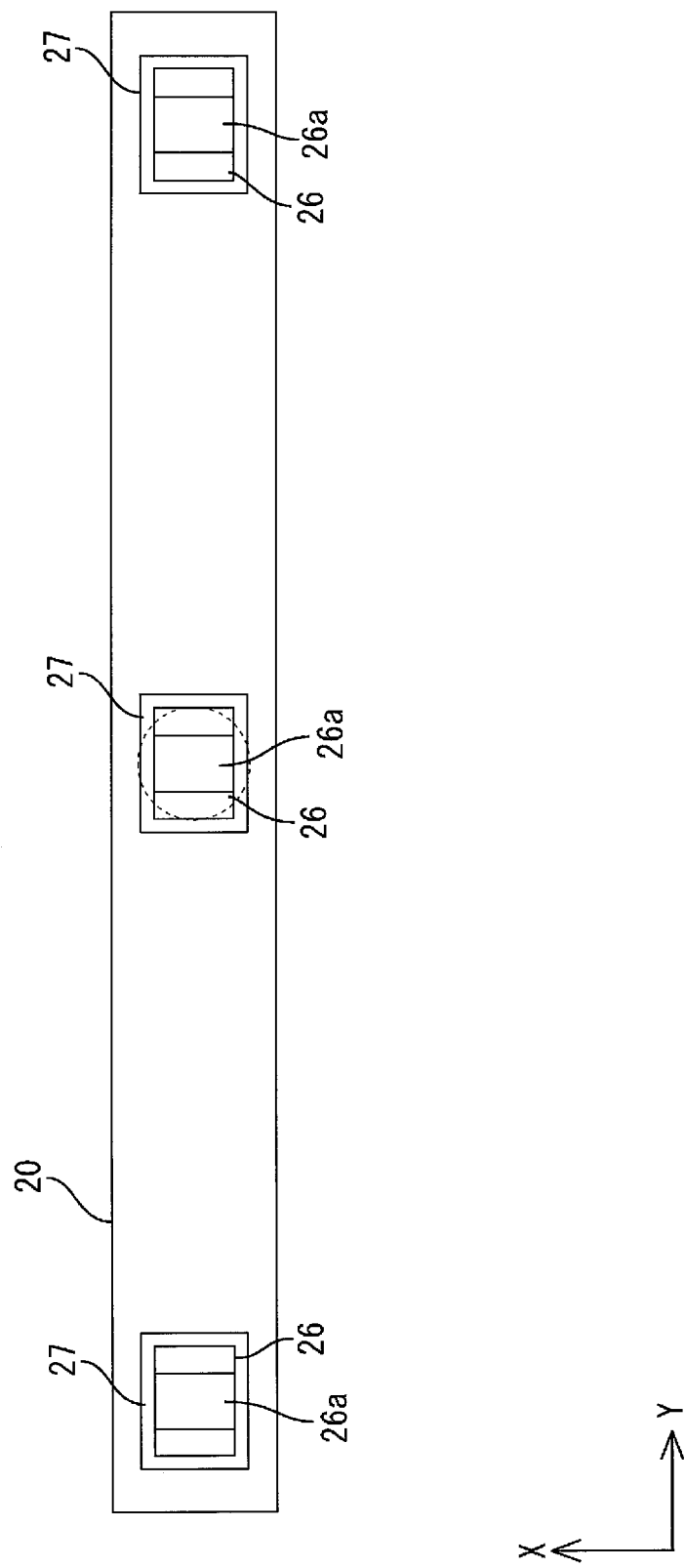
FIG. 16 is a bottom view of the supporting member.

As shown in FIGS. 15 and 16, the body portion 24 of the supporting member 20 includes a reflection sheet contact portion 27 that protrudes toward the back side and is configured to contact with the first reflection sheet 22. The reflection sheet contact portion 27 is arranged adjacent to the bottom portion 26a of each fixed portion 26 of the body portion 24. The reflection sheet contact portion 27 surrounds the entire circumference of the bottom portion 26a and is coupled to the bottom portion 26a. That is, a coupling bottom end of the bottom portion 26a of each fixed portion 26 to the body portion 24 is partially extended by the reflection sheet contact portion 27. This reinforces the fixed portion 26.

When the supporting member 20 is fixed to the chassis 14, as shown in FIG. 15, a protruding front end surface of the reflection sheet contact portion 27 from the body portion 24 is contacted with the first reflection sheet 22 from the front side. The back side surface of the body portion 24 floats from the first reflection sheet 22 by the protrusion dimension of the reflection sheet contact portion 27 and thus, is kept to be in non-contact with the first reflection sheet 22. In other words, the contact region of the supporting member 20 with the first reflection sheet 22 is only each reflection sheet contact portion 27. Thus, as compared to the case where the entire body portion 24 is in contact as in the first embodiment, the contact area is smaller. Accordingly, the first reflection sheet 22 is easy to expand or contract due to thermal expansion or thermal contraction, and wrinkle or flexure of the first reflection sheet 22 is hard to occur. As a result, unevenness in light reflected by the first reflection sheet 22 is also hard to occur. The second reflection sheet 23 can obtain the same effect as that of the first reflection sheet 22.

As described above, in this modification example, the body portion 24 has the reflection sheet contact portion 27 that protrudes toward the reflection sheet 21 and is in contact with the reflection sheet 21. With this configuration, as compared to the case where the entire body portion is brought into contact with the first reflection sheet 22, the contact area of the supporting member 20 with the reflection sheet 21 can be reduced. Accordingly, expansion or contraction of the reflection sheet 21 due to thermal expansion or thermal contraction can easily be allowed and wrinkle or flexure of the reflection sheet 21 is hard to occur. As a result, unevenness in light reflected by the reflection sheet 21 is hard to occur.

The reflection sheet contact portion 27 is connected to the fixed portion 26. With this configuration, as compared to the case where the reflection sheet contact portion is independent from the fixed portion 26, the strength of the reflection sheet contact portion 27 and the fixed portion 26 can be increased.

The reflection sheet contact portion 27 surrounds the fixed portion 26. With this configuration, the strength of the reflection sheet contact portion 27 and the fixed portion 26 can be further increased.

Second Modification Example of First Embodiment

A second modification example of the first embodiment will be described with reference to FIG. 17. Here, configuration of the supporting member 20 is modified.

Figure 17:
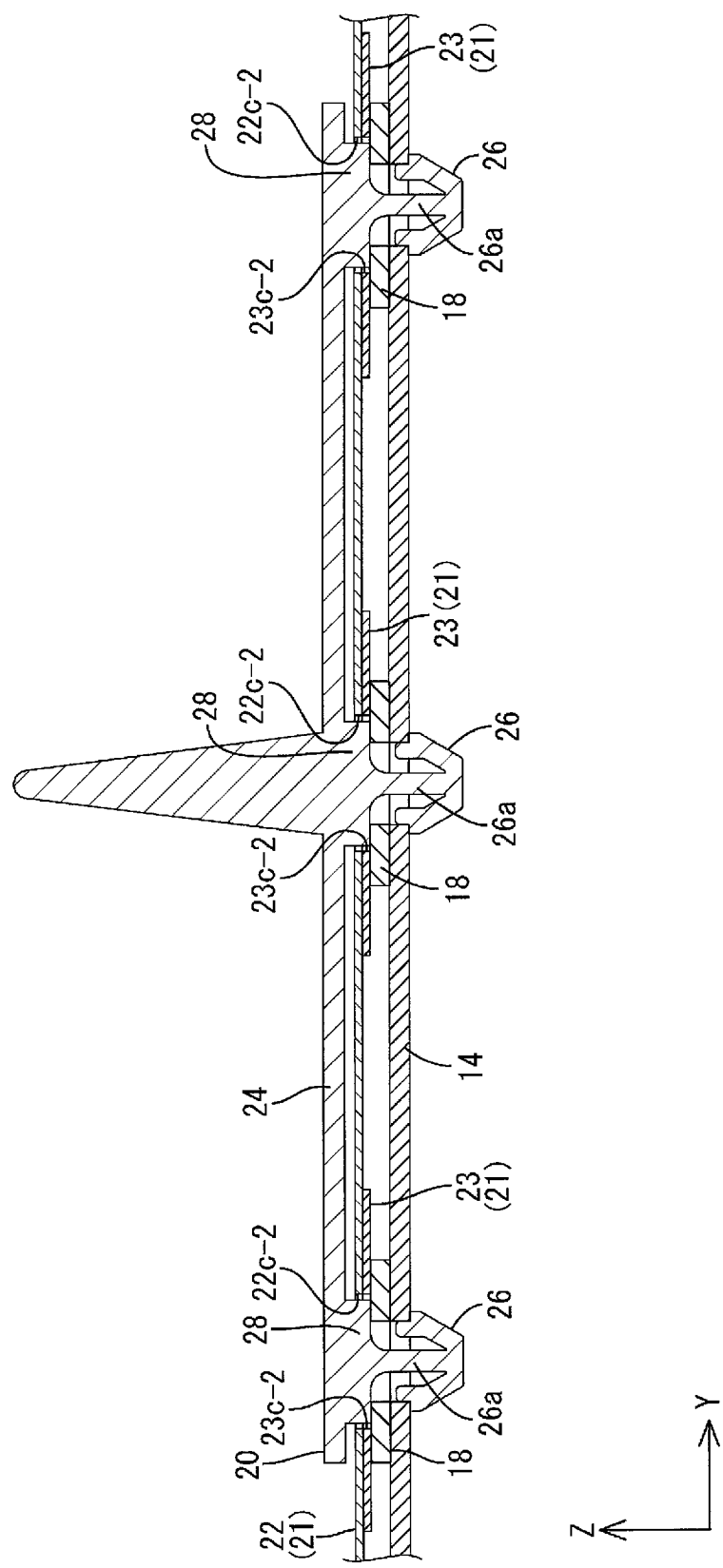
FIG. 17 is a sectional view showing the state where the supporting member is attached to the chassis in a second modification example of the first embodiment.

As shown in FIG. 17, the body portion 24 of the supporting member 20 has aboard contact portion 28 that protrudes from the back side and is configured to contact with the LED board 18. The board contact portion 28 is arranged adjacent to the bottom portion 26a of each fixed portion 26 of the body portion 24. The board contact portion 28 surrounds the entire circumference of the bottom portion 26a and is coupled to the bottom portion 26a. That is, a coupling bottom end of the bottom portion 26a of each fixed portion 26 to the body portion 24 is partially extended in diameter by the board contact portion 28. This reinforces the fixed portion 26. The protrusion dimension of the board contact portion 28 from the body portion 24 is set to be larger than a sum of thicknesses of the first reflection sheet 22 and the second reflection sheet 23. Communicating holes 22c-2, 23c-2 formed in the first reflection sheet 22 and the second reflection sheet 23 are extended so as to correspond to the board contact portion 28, thereby allowing insertion of both the fixed portion 26 and the board contact portion 28. That is, in the first reflection sheet 22 and the second reflection sheet 23, the communicating holes 22c-2, 23c-2 are arranged so as to overlap with the fixed portion 26 and board contact portion 28 in a plan view, and also serve as board contact portion insertion holes.

When the supporting member 20 is attached to the chassis 14, as shown in FIG. 17, the board contact portion 28, together with the bottom portion 26a of the fixed portion 26, is inserted into the expanded communicating holes 22c-2, 23c-2 in the first reflection sheet 22 and the second reflection sheet 23, and the protruding front end surface from the body portion 24 is in contact with the LED board 18 from the front side. Accordingly, the board contact portion 28 is substantially in non-contact with the both reflection sheets 22 and 23 and does not press the both reflection sheets 22 and 23 from the front side. The back side surface of the body portion 24 floats from the first reflection sheet 22 on the front side, and is kept to be in non-contact with the first reflection sheet 22. As described above, since the supporting member 20 is substantially in non-contact with the first reflection sheet 22 and the second reflection sheet 23, the supporting member 20 hardly applies stress to the both reflection sheets 22 and 23. Therefore, the both reflection sheets 22 and 23 are easy to expand or contract due to thermal expansion or thermal contraction, and wrinkle or flexure of the both reflection sheets 22 and 23 is hard to occur. As a result, unevenness in light reflected by the both reflection sheets 22 and 23 is hard to occur.

As described above, in this modification example, the body portion 24 has the board contact portion 28 protruding toward the LED board 18, while the reflection sheet 21 includes the communicating holes 22c-2, 23c-2 that allows the board contact portion 28 to be in contact with the LED board 18. With this configuration, the board contact portion 28 is brought into contact with the LED board 18, thereby mitigating stress that can be applied from the body portion 24 to the reflection sheet 21. Accordingly, since expansion or contraction of the reflection sheet 21 due to thermal expansion or thermal contraction is easily allowed, wrinkle or flexure of the reflection sheet 21 is hard to occur and thus, unevenness in light reflected by the reflection sheet 21 is also hard to occur.

The protrusion dimension of the board contact portion 28 from the body portion 24 is set to be larger than the thickness of the reflection sheet 21. With this configuration, since the body portion 24 is not in contact with the reflection sheet 21, expansion or contraction of the reflection sheet 21 can be allowed more preferably.

The board contact portion 28 is connected to the fixed portion 26. With this configuration, as compared to the case where the board contact portion is independent from the fixed portion 26, the strength of the board contact portion 28 and the fixed portion 26 can be increased.

The board contact portion 28 surrounds the fixed portion 26. With this configuration, the strength of the board contact portion 28 and fixed portion 26 can be further increased.

Third Modification Example of First Embodiment

A third modification example of the first embodiment will be described with reference to FIG. 18 or FIG. 19. Here, configuration of the supporting member 20 is modified.

Figure 18:
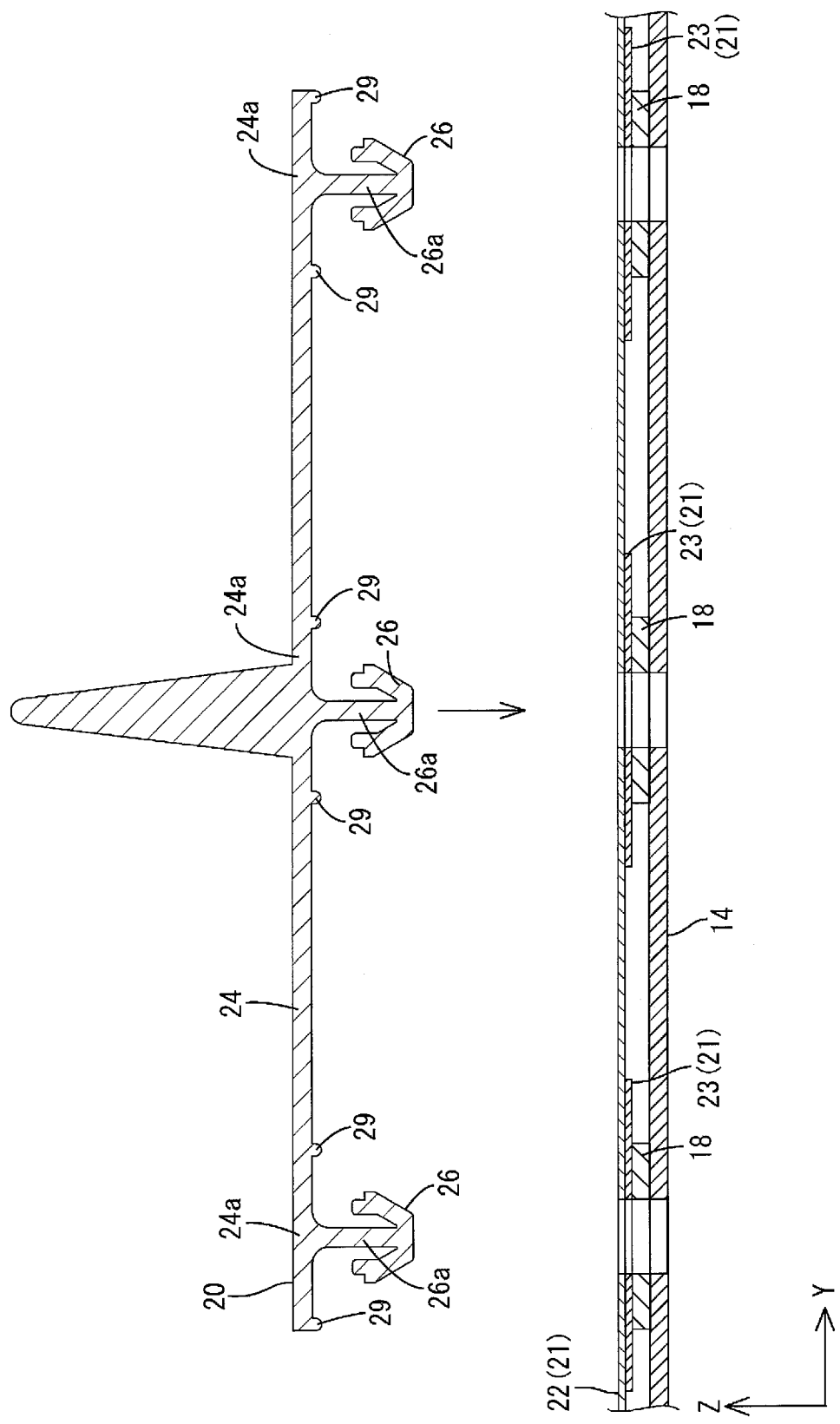
FIG. 18 is a sectional view showing the state before the supporting member is attached to the chassis in a third modification example of the first embodiment.

As shown in FIG. 18, the body portion 24 of the supporting member 20 has a contact portion 29 that protrudes toward the back side and is configured to directly contact with the LED board 18. Two pairs of contact portions 29 are arranged so as to sandwich the bottom portion 26a of each fixed portion 26 in the body portion 24 therebetween in the Y-axis direction. Each contact portion 29 is separated from the bottom portion 26a of each fixed portion 26 in the body portion 24 in the Y-axis direction. The pair of contact portions 29 sandwiching each bottom portion 26a therebetween are arranged at both ends of the sandwiching portion 24a of the body portion 24 in the Y-axis direction, and an interval between the both contact portions 29 is set to be slightly smaller than the short-side dimension of the LED board 18.

Figure 19:
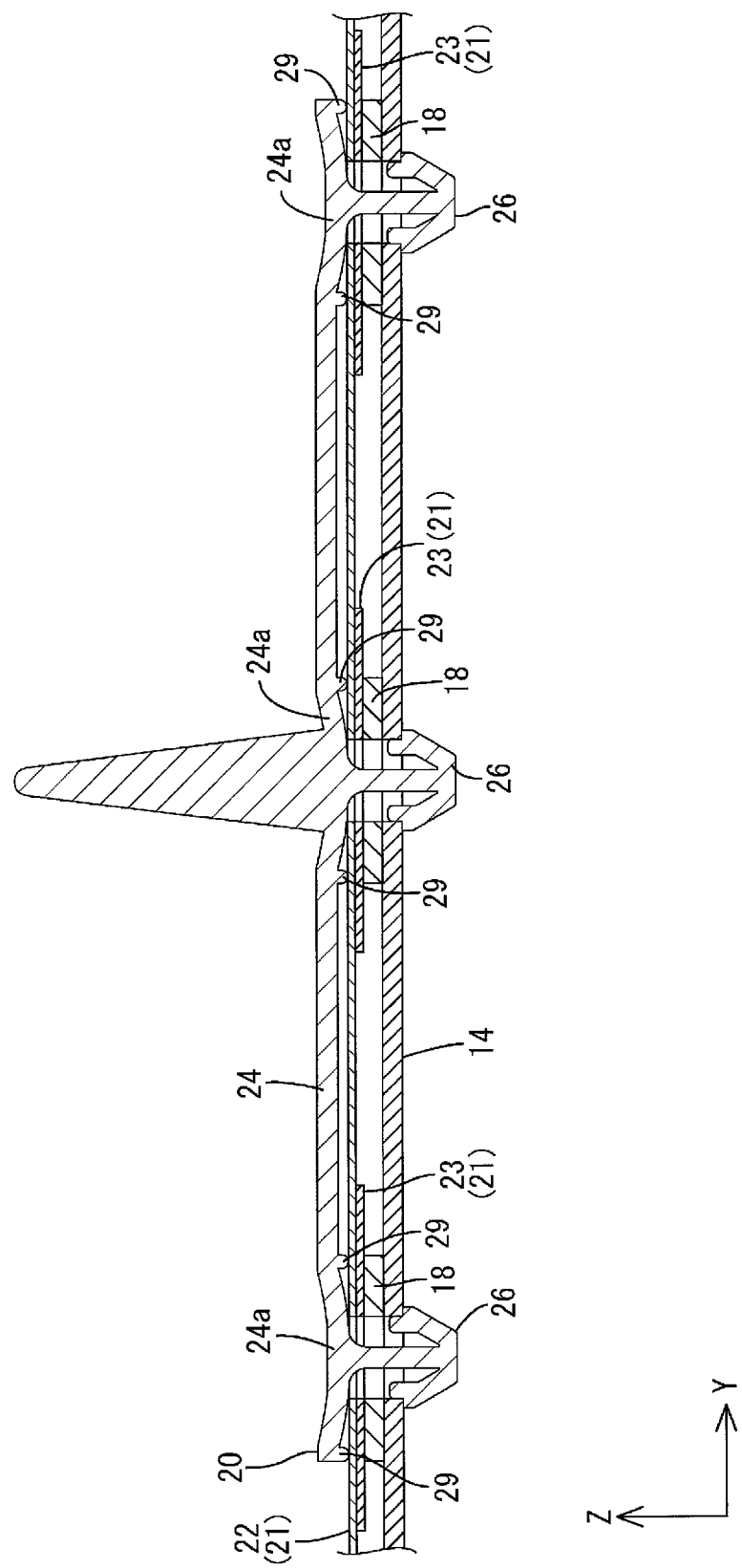
FIG. 19 is a sectional view showing the state where the supporting member is attached to the chassis.

When the supporting member 20 is attached to the chassis 14, as shown in FIG. 19, each contact portion 29 is in indirect contact with both ends of the LED board 18 in the short-side direction through the both reflection sheets 22 and 23 and then, each fixed portion 26 is engaged with the chassis 14. For this reason, each sandwiching portion 24a of the body portion 24 is elastically deformed so as to warp toward the LED board 18 using the both contact portions 29 in contact with the LED board 18 as fulcrums. Accordingly, the LED board 18 can be brought into intimate contact with the chassis 14 by the elastic force of the warped sandwiching portion 24a. As a result, the LED board 18 can be fixed to the chassis 14 in the intimate contact state more stably. For the sandwiching portions 24a at both ends of the body portion 24 in the long-side direction, in attachment to the chassis 14, it is preferred to push the part between the both contact portions 29 toward the chassis 14.

As described above, in this modification example, the contact portion 29 that protrudes toward the LED board 18 and is in indirect contact with the LED board 18 are located away from the fixed portion 26. With this configuration, when the fixed portion 26 is fixed to the chassis 14 while bringing the contact portions 29 into indirect contact with the LED board 18, the part between the fixed portion 26 and the contact portion 29 in the body portion 24 can be elastically deformed to warp toward the LED board 18 using the contact portion 29 as the fulcrum. Accordingly, LED board 18 can be brought into intimate contact with the chassis 14 by the elastic force of the warped body portion 24. As a result, since the LED board 18 can be stably fixed, optical characteristics of light which is emitted from the LEDs 17 on the LED board 18 and passes through the optical member 15 can be stabilized, and heat radiation performance from the LED board 18 to the chassis 14 can be stabilized.

Fourth Modification Example of First Embodiment

A fourth modification example of the first embodiment will be described with reference to FIG. 20 or FIG. 21. Here, configuration of the supporting member 20 is modified.

Figure 20:
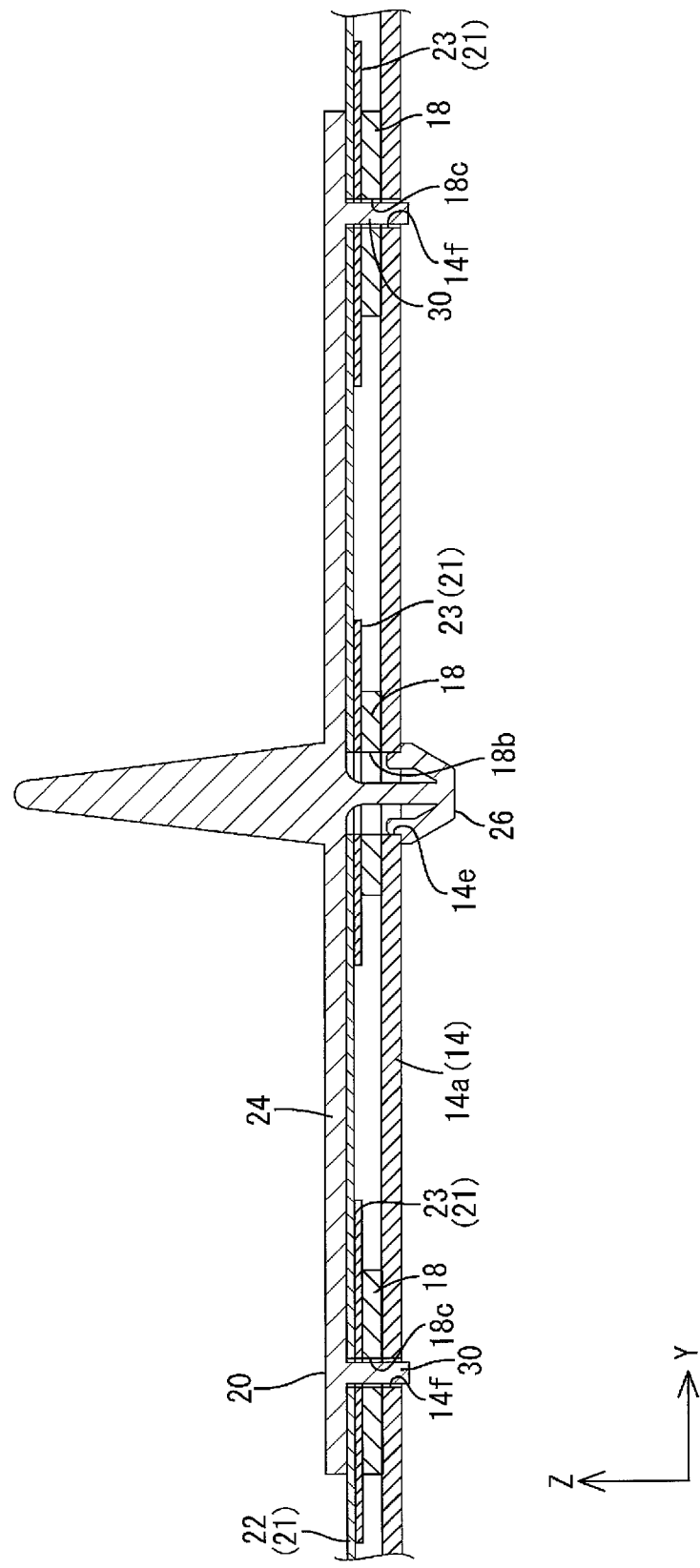
FIG. 20 is a sectional view showing the state where the supporting member according to a fourth modification example of the first embodiment is attached to the chassis.

As shown in FIGS. 20 and 21, on the back side surface of the body portion 24 of the supporting member 20, the fixed portion 26 is provided at the center in the long-side direction and a pair of positioning portion 30 is provided at both ends in the long-side direction. The positioning portions 30 each are shaped like a block protruding from the body portion 24 toward the back side, and each are an oblong rectangle extending in the short-side direction of the body portion 24 in a plan view. That is, the positioning portion 30 has the similar shape to that of the bottom portion 26a in the first embodiment. The LED board 18 includes opened positioning holes 18c configured to pass the positioning portions 30 therethrough so as to overlap with the pair of positioning portions 30. Further, an opened communicating hole 14f communicating with each positioning hole 18c is provided in the bottom plate 14a of the chassis 14 so as to overlap with each positioning hole 18c in a plan view. As described above, in this modification example, the pair of fixed portions 26 is arranged at both ends of the supporting member 20 in the long-side direction in the first embodiment are changed to the positioning portions 30 and accordingly, the through hole 18b and the attachment hole 14e in the first embodiment are changed to the positioning hole 18c and the communicating hole 14f, respectively.

When the supporting member 20 is attached to the chassis 14, the central fixed portion 26 is engaged with the attachment hole 14e of the chassis 14 while passing through the through hole 18b of the LED board 18, while the both positioning portions 30 at both ends are inserted into the positioning holes 18c of the LED board 18 and the communicating holes 14f of the chassis 14. The supporting member 20 can be positioned with respect to the LED board 18 and the chassis 14 in the X-axis direction and the Y-axis direction by the fixed portion 26 and the positioning portions 30. Here, the both reflection sheets 22 and 23 are sandwiched between the body portion 24 and the LED board 18, and with engagement, stress can be applied. However, in the supporting member 20 in this modification example, since one fixed portion 26 having the engagement structure is arranged at the center and the positioning portions 30 having no engagement structure is arranged at both ends, stress applied to the both reflection sheets 22 and 23 can be mitigated. As a result, wrinkle or flexure of the both reflection sheets 22 and 23 is hard to occur and thus, unevenness in reflected light is also hard to occur.

As described above, in this modification example, the LED board 18 includes the positioning hole 18c, while the body portion 24 has the positioning portion 30 that protrudes toward the chassis 14 and is inserted into the positioning hole 18c. With this configuration, by inserting the positioning portion 30 into the positioning hole 18c, the supporting member 20 can be positioned with respect to the LED board 18.

The chassis 14 includes the communicating hole 14f that is configured to communicate with the positioning hole 18c and pass the positioning portion 30 thereinto. With this configuration, by inserting the positioning portion 30 into the positioning hole 18c and the communicating hole 14f, the supporting member 20 can be positioned with respect to both the LED board 18 and the chassis 14.

Fifth Modification Example of First Embodiment

A fifth modification example of the first embodiment will be described with reference to FIG. 22. Here, configuration of the supporting member 20 in the fourth modification example is modified. Configuration, actions and effects of a positioning portion 30-5 are the same as those in the fourth modification example, overlapping description is omitted.

Figure 22:
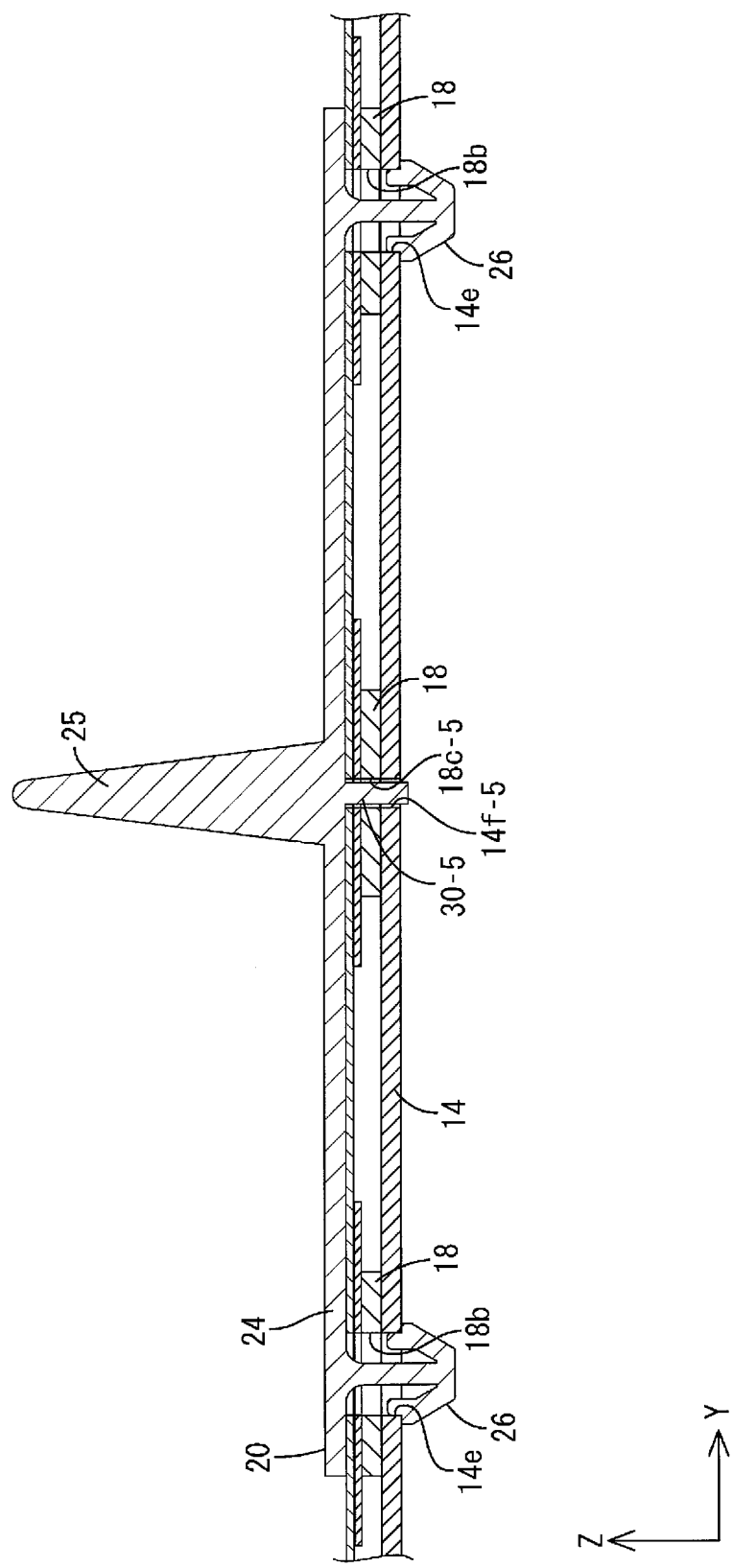
FIG. 22 is a sectional view showing the state where the supporting member according to a fifth modification example of the first embodiment is attached to the chassis.

As shown in FIG. 22, the positioning portion 30-5 is arranged at the center of the body portion 24 in the long-side direction. The positioning portion 30-5 is arranged so as to overlap with the supporting portion 25 on the front side in a plan view. The body portion 24 has a pair of fixed portions 26 at both ends in the long-side direction. Arrangement of the through hole 18b and the positioning hole 18c-5 in the LED board 18 and the attachment hole 14e and the communicating hole 14f-5 in the chassis 14 may be changed according to arrangement of the positioning portion 30-5 and the fixed portions 26.

As described above, in this modification example, the positioning portion 30-5 and the supporting portion 25 are arranged so as to overlap with each other in a plan view. With this configuration, when the supporting member 20 is attached while gripping the supporting portion 25, the positioning portion 30 can easily be inserted into the positioning hole 18c-5, which is excellent in workability.

Sixth Modification Example of First Embodiment

A sixth modification example of the first embodiment will be described with reference to FIG. 23. Here, arrangement of the supporting portion 25 is modified.

Figure 23:
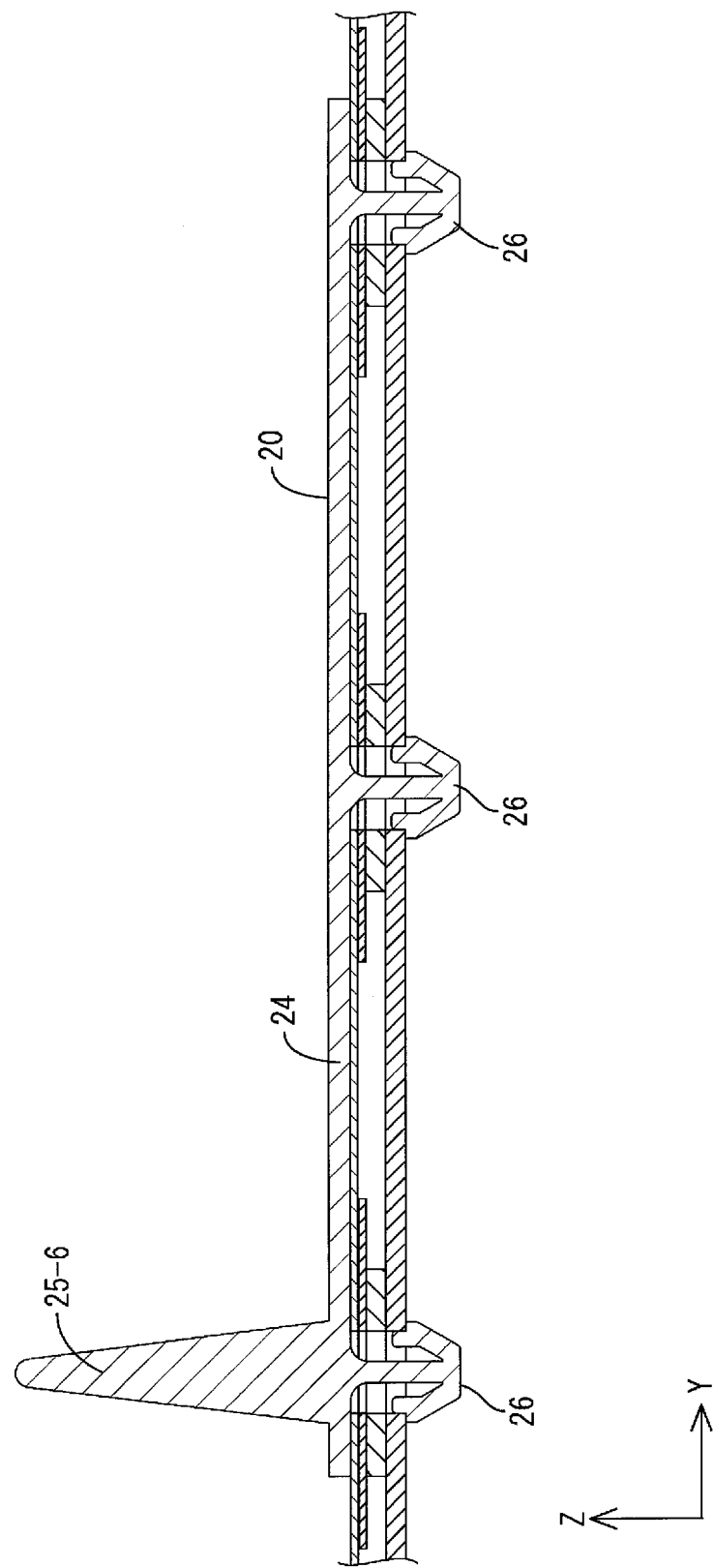
FIG. 23 is a sectional view showing the state where the supporting member according to a sixth modification example of the first embodiment is attached to the chassis.

As shown in FIG. 23, a supporting portion 25-6 is eccentrically located at an end of the body portion 24 in the long-side direction. The supporting portion 25-6 is shifted from the center of the body portion 24 in the long-side direction to the left side in FIG. 22. Describing in detail, the supporting portion 25-6 overlaps with the fixed portion 26 at the left end in this figure in a plan view. Although detailed illustration is omitted, the supporting portion 25 may overlap with the fixed portion 26 at the right end in FIG. 22 in a plan view, or may not overlap with the fixed portion 26 in a plan view and further may be arranged between the adjacent fixed portion 26. As described above, by appropriately changing arrangement of the supporting portion 25 in the body portion 24, the support position of the optical member 15 can be changed appropriately. Therefore, the optical member 15 can be supported more properly. The supporting portion 25 is not concentric with the fixed portion 26 and may partially overlap with the fixed portion 26 in a plan view.

Seventh Modification Example of First Embodiment

A seventh modification example of the first embodiment will be described with reference to FIG. 24. Here, a body portion 24-7 having modified configuration is shown.

Figure 24:
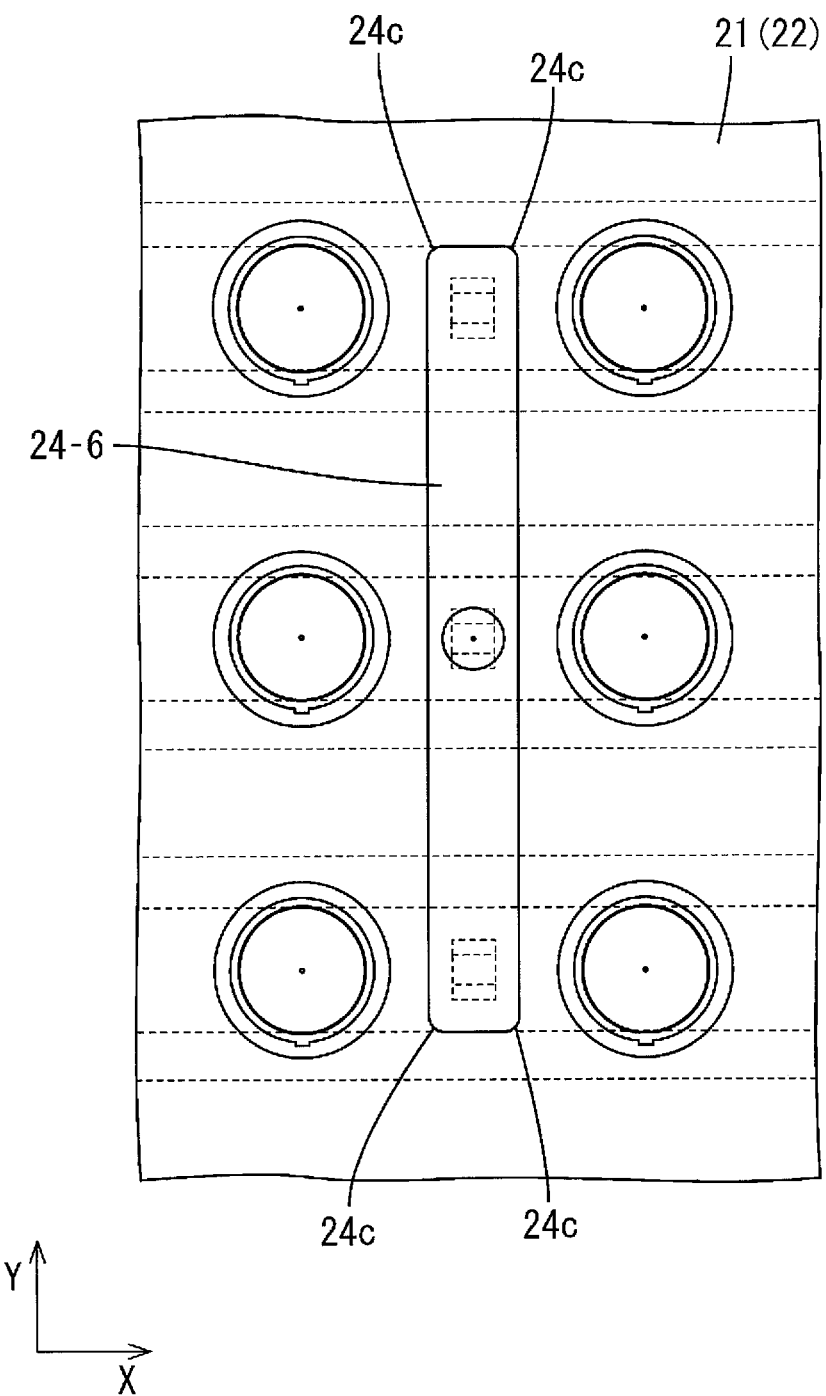
FIG. 24 is a plan view showing the state where the supporting member according to a seventh modification example of the first embodiment is attached to the chassis.

As shown in FIG. 24, each of four corners of the body portion 24-7 has a curved surface 24c. The curved surface 24 is substantially arcuate in a plan view, thereby rounding each corner of the body portion 24-7. With this configuration, even when a step exists between the body portion 24-7 and the reflection sheet 21 (the first reflection sheet 22), each corner of the body portion 24-7 will hardly be recognized visually as uneven brightness through the optical member 15.

Eighth Modification Example of First Embodiment

An eighth modification example of the first embodiment will be described with reference to FIG. 25. Here, a body portion 24-8 having modified configuration is shown.

Figure 25:
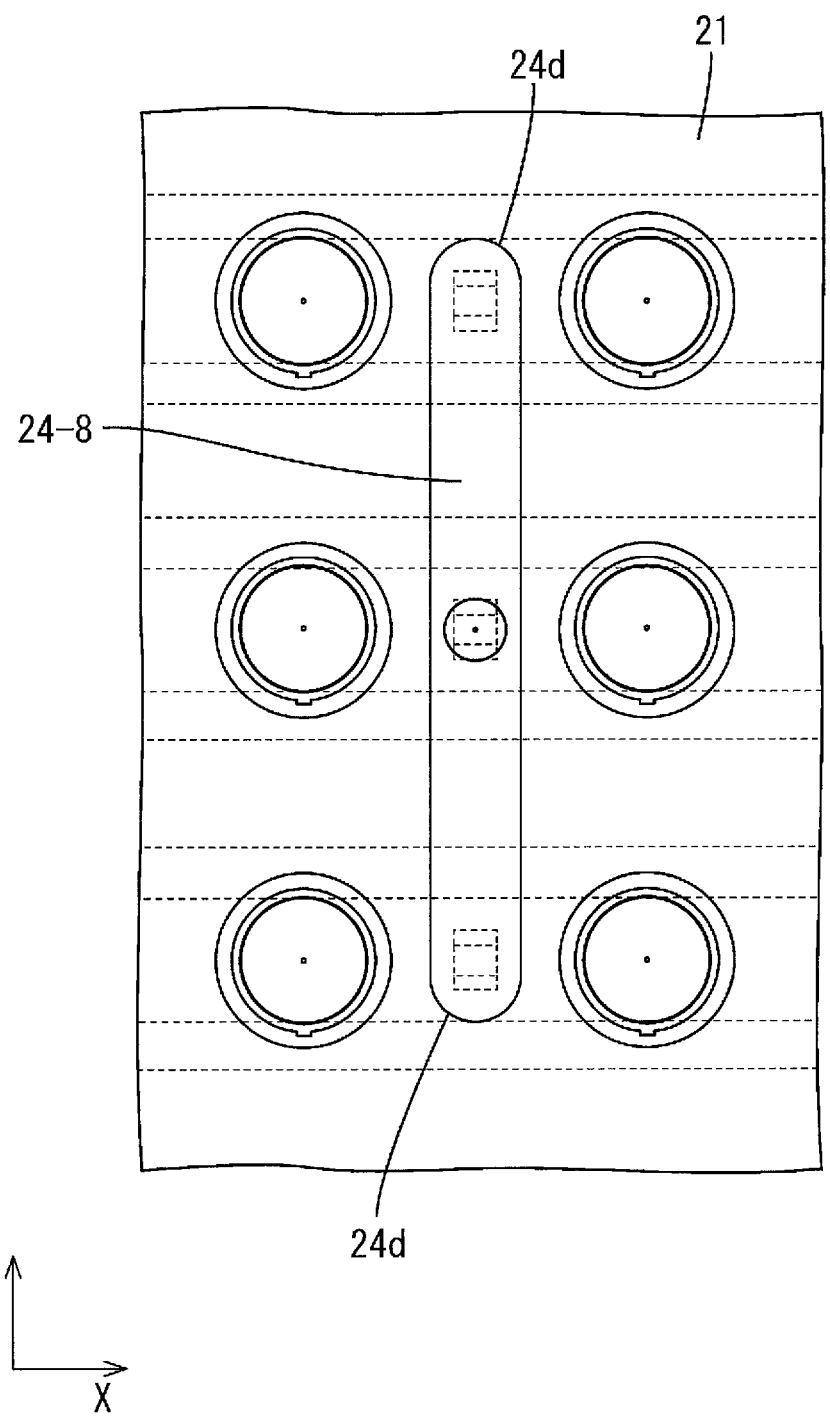
FIG. 25 is a plan view showing the state where the supporting member according to an eighth fourth modification example of the first embodiment is attached to the chassis.

As shown in FIG. 25, a curved surface 24d is formed at each end of the body portion 24-8 in the long-side direction. The curved surfaces 24d are substantially arcuate in a plan view such that both ends of the body portion 24-8 in the long-side direction are substantially semicircular in a plan view. With this configuration, even when a step exists between the body portion 24-8 and the reflection sheet 21, the both ends of the body portion 24-8 in the long-side direction will hardly be recognized visually as uneven brightness through the optical member 15.

Ninth Modification Example of First Embodiment

A ninth modification example of the first embodiment will be described with reference to FIG. 26. Here, a body portion 24-9 having modified configuration is shown.

Figure 26:
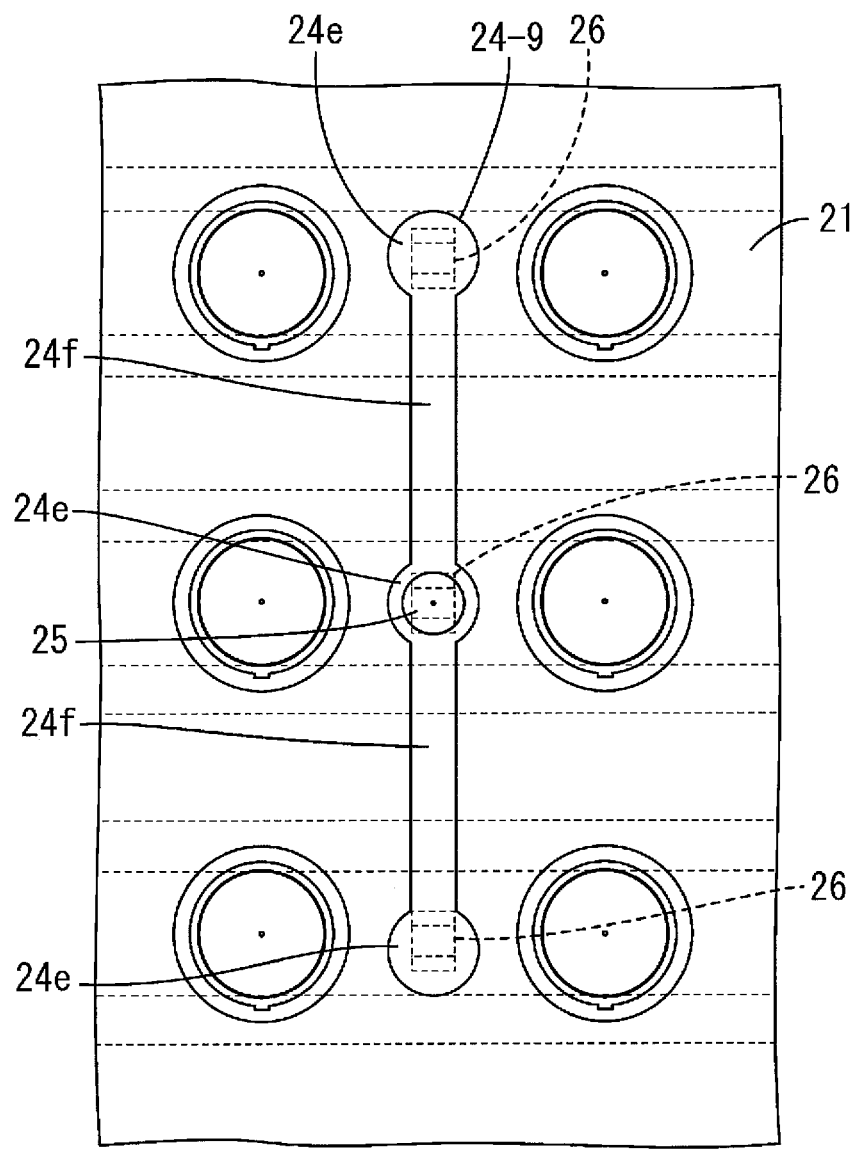
FIG. 26 is a plan view showing the state where the supporting member according to a ninth modification example of the first embodiment is attached to the chassis.

As shown in FIG. 26, a short-side dimension (dimension in the X-axis direction) of the body portion 24-9 is partially reduced. Describing in detail, in the body portion 24-9, the short-side dimension of a fixed portion arranged portion 24e where each fixed portion 26 (supporting portion 25) is arranged is equal to that in the first embodiment (minimum dimension required to arrange the fixed portion 26), while the short-side dimension of a coupling portion 24f coupling the fixed portions 26 to each other is smaller than that of the fixed portion arranged portions 24e. Each fixed portion arranged portion 24e has an outer circumferential surface which is substantially arcuate in a plan view. With this configuration, since the outer shape of the body portion 24-9 is nonlinear in a plan view, even when a step exists between the body portion 24-9 and the reflection sheet 21, the outer edge of the body portion 24-9 will hardly be recognized visually as uneven brightness through the optical member 15.

Tenth Modification Example of First Embodiment

A tenth modification example of the first embodiment will be described with reference to FIG. 27 or FIG. 28. Here, a body portion 24-10 having modified configuration in another modification example of the first modification example (having the reflection sheet contact portion 27) is shown.

Figure 27:
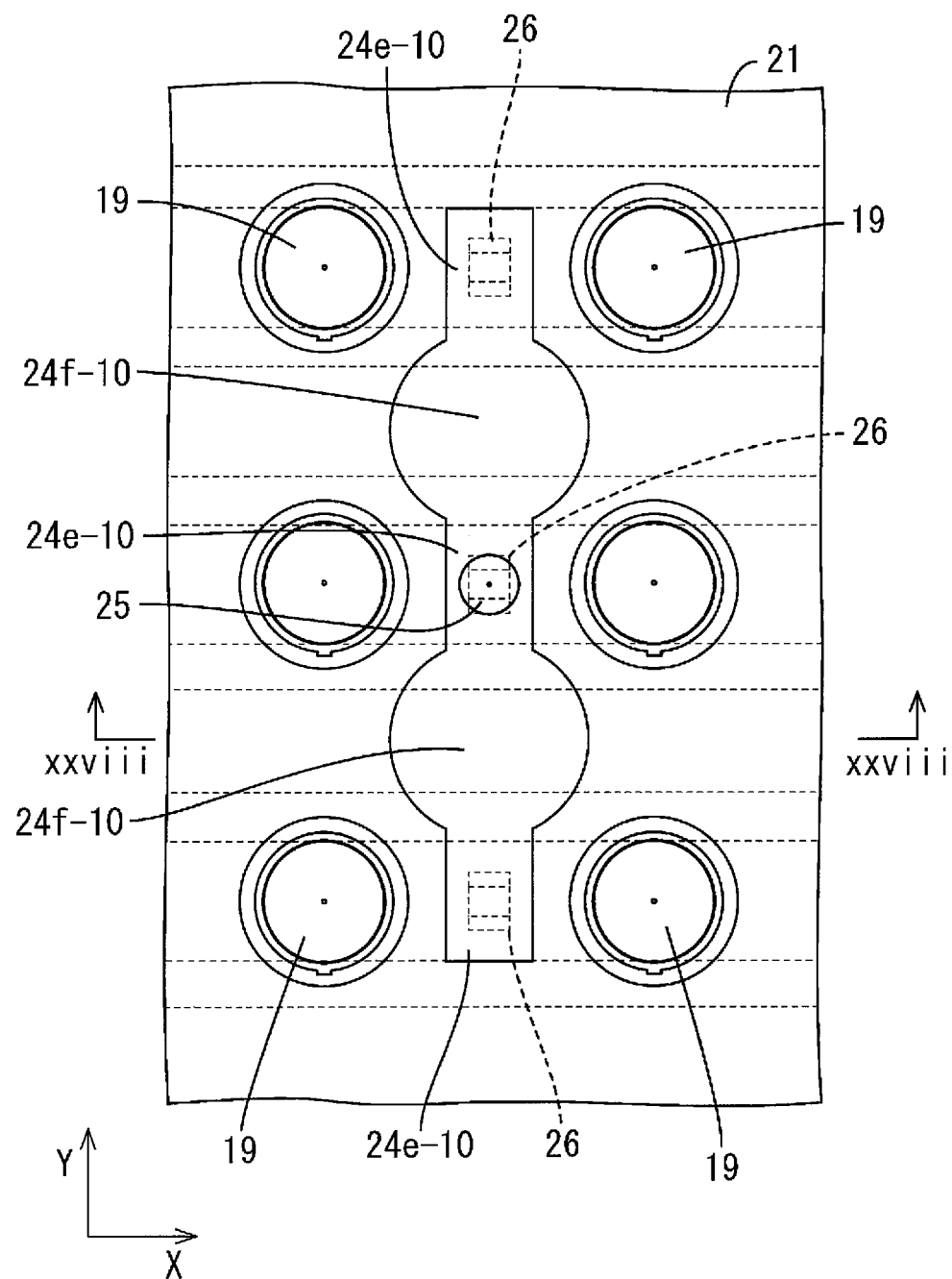
FIG. 27 is a plan view showing the state where the supporting member according to a tenth modification example of the first embodiment is attached to the chassis.

As shown in FIG. 27, a short-side dimension (dimension of the X-axis direction) of the body portion 24-10 is partially extended. Describing in detail, in the body portion 24-10, a short-side dimension of the fixed portion arranged portions 24e-10 where each fixed portion 26 (supporting portion 25) is arranged is equal to that in the first embodiment (minimum dimension required to arrange the fixed portion 26), while a short-side dimension of a coupling portion 24f-10 coupling the fixed portions 26 to each other is larger than that of the fixed portion arranged portions 24e-10. The short-side dimension of the coupling portion 24f-10 is set to be larger than the interval between the adjacent diffuser lenses 19. The coupling portion 24f-10 has an outer circumferential surface, which is substantially arcuate in a plan view.

Figure 28:
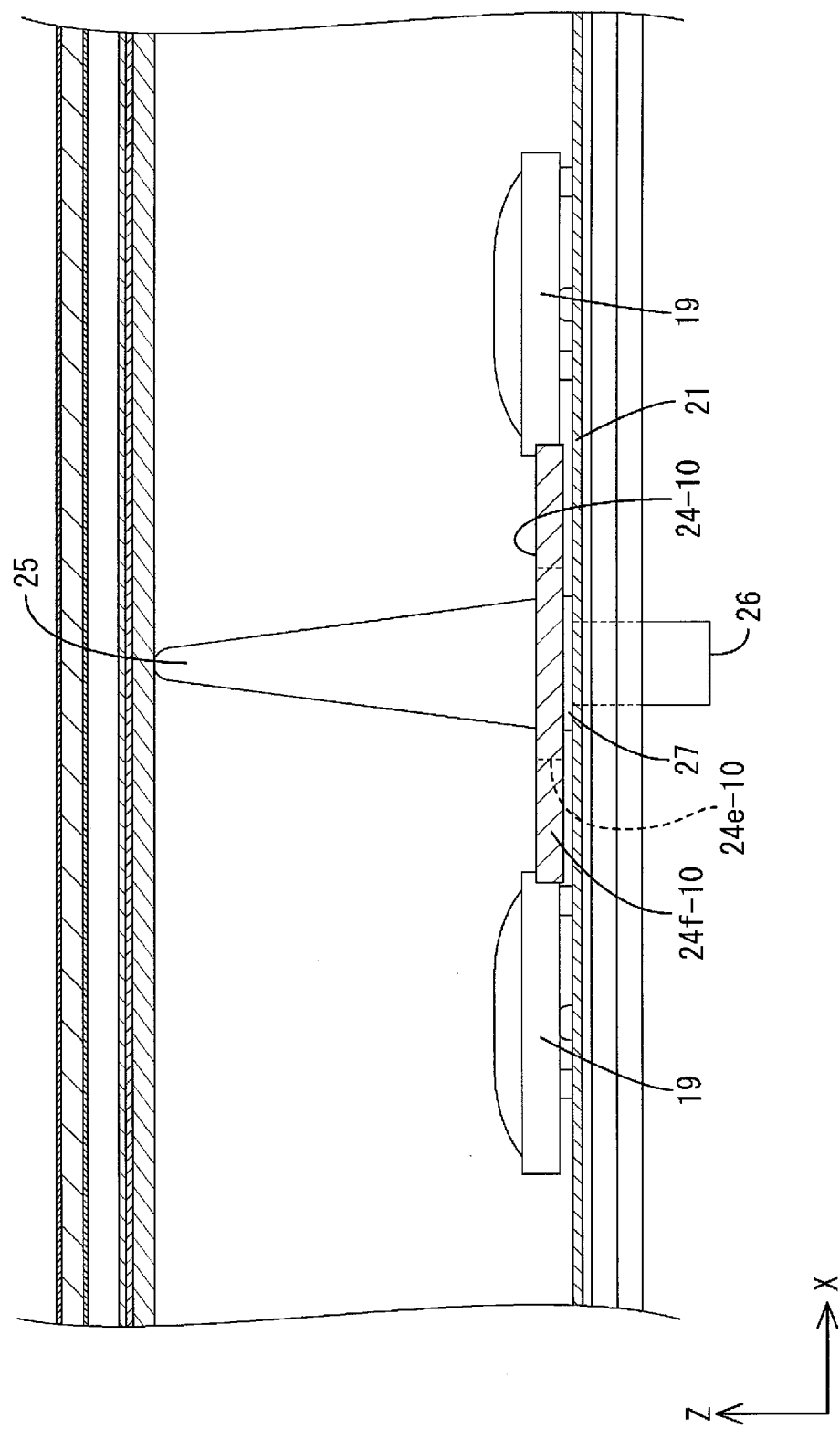
FIG. 28 is a sectional view taken along line xxviii-xxviii in FIG. 6.

As shown in FIG. 28, since the reflection sheet contact portion 27 is in contact with the reflection sheet 21, the body portion 24-10 floats from the reflection sheet 21 on the front side and thus, a predetermined gap is generated between the body portion 24-10 and the reflection sheet 21. Wrinkle or flexure may occur at a part of the reflection sheet 21, which is not in contact with the body portion 24-10, due to thermal expansion or thermal contraction. Here, the area of a part of the reflection sheet 21, which is covered with the body portion 24-10, increases by the partially widened part (extended part of the coupling portion 24f-10). Accordingly, even when wrinkle or flexure occurs in the reflection sheet 21 due to thermal expansion or thermal contraction, there is a high possibility that the body portion 24-10 prevents the wrinkle or flexure from being exposed on the front side. Thereby, uneven brightness can be prevented. Since the outer shape of the body portion 24-10 is nonlinear in a plan view, even when a step exists between the body portion 24-10 and the reflection sheet 21, the outer edge of the body portion 24-10 will hardly be recognized visually as uneven brightness through the optical member 15.

As a matter of course, this modification example can also be applied to the second modification example including the board contact portion 28.

Eleventh Modification Example of First Embodiment

An eleventh modification example of the first embodiment will be described with reference to FIG. 29 or FIG. 30. Here, a body portion 24-11 having modified configuration is shown.

Figure 29:
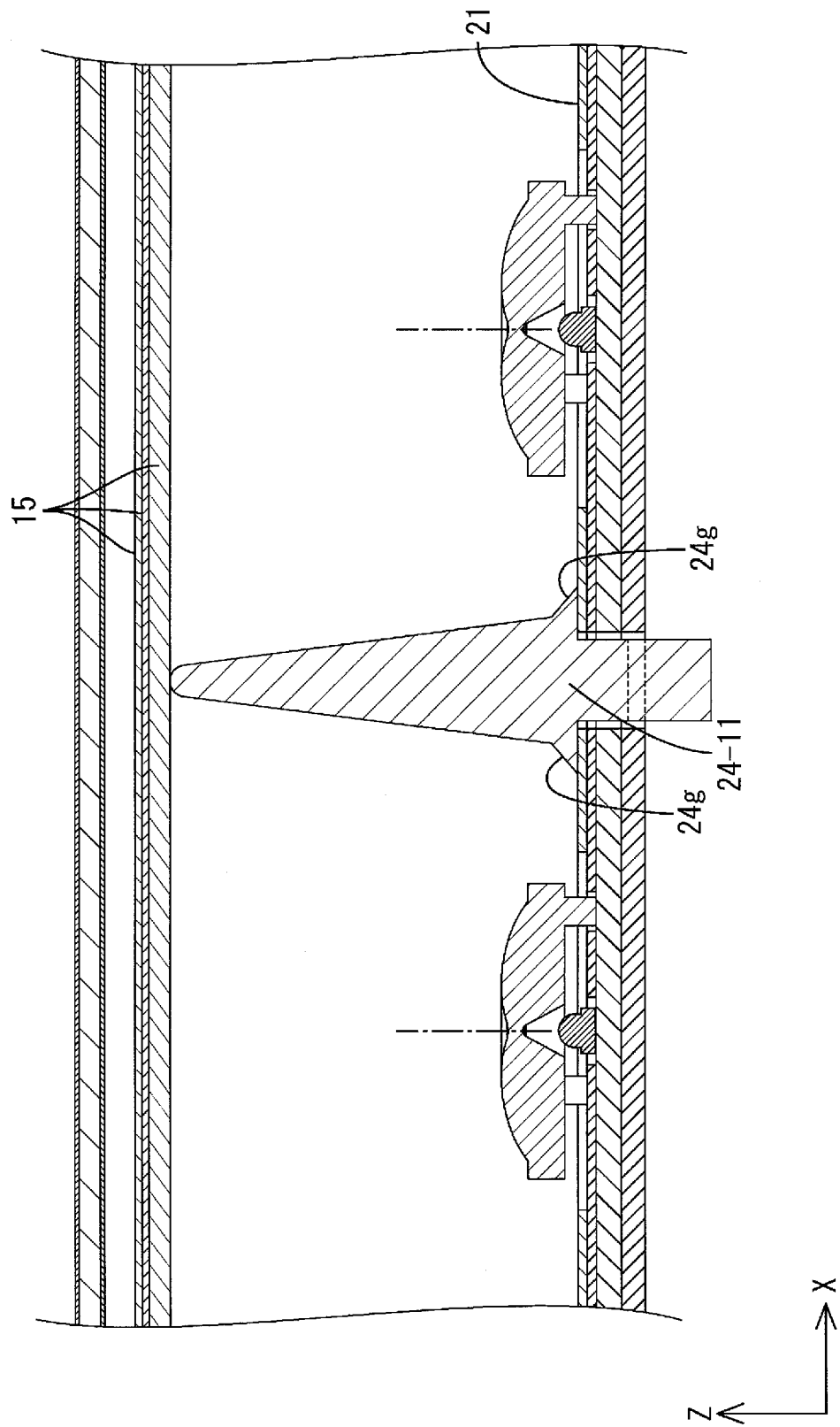
FIG. 29 is a sectional view obtained by cutting the chassis with the supporting member according to an eleventh modification example of the first embodiment attached along an X-axis direction.
Figure 30:
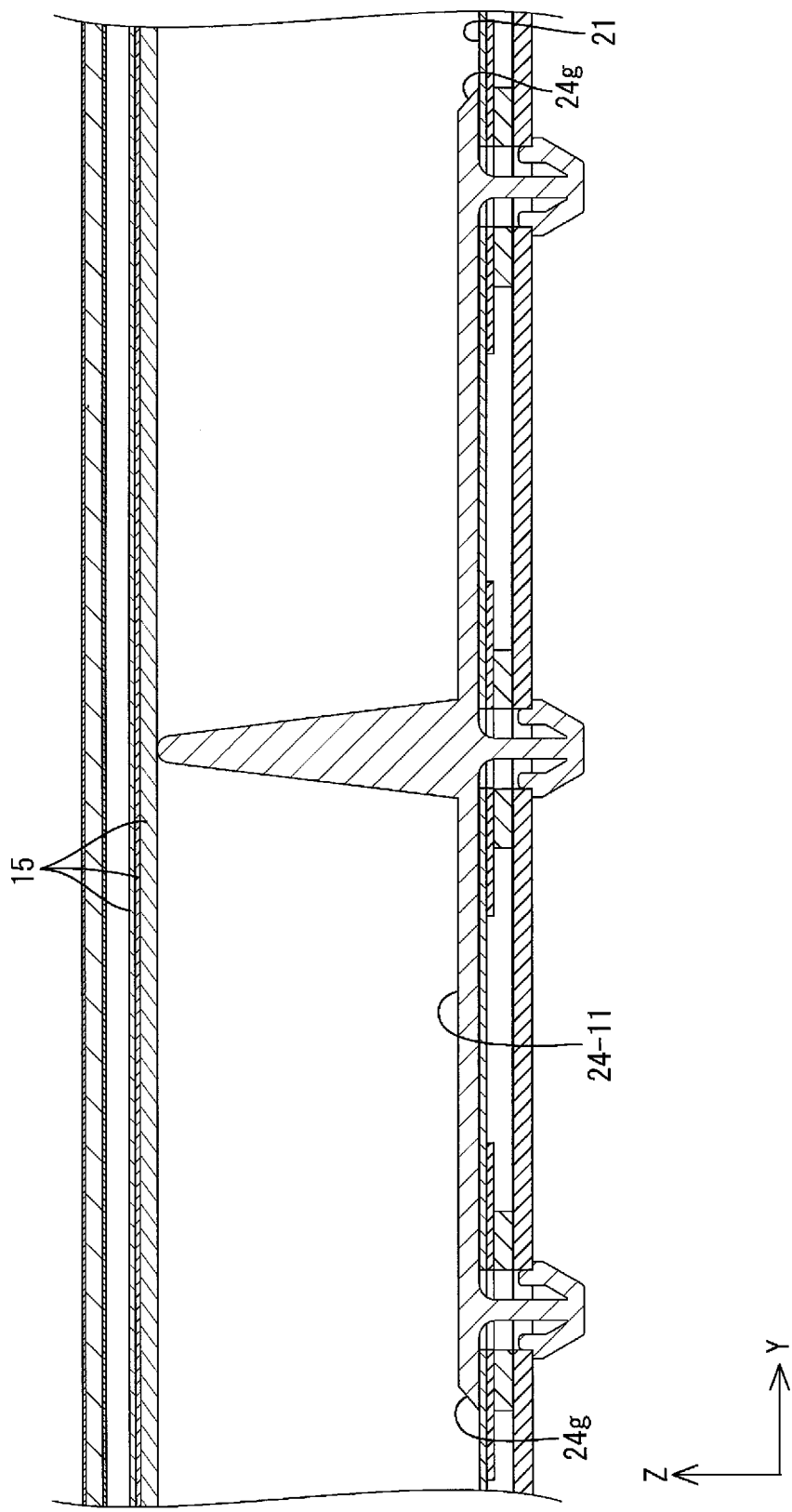
FIG. 30 is a sectional view obtained by cutting the chassis with the supporting member attached along a Y-axis direction.

As shown in FIGS. 29 and 30, an inclined surface 24g is provided on an outer edge of the body portion 24-11. The inclined surface 24g is formed on the entire outer edge of the body portion 24-11. The inclined surface 24g is inclined downward from the center of the body portion 24-11 toward outer ends. The thickness of the outer edge of the body portion 24-11, on which the inclined surface 24g is formed, becomes smaller (thinner) gradually and continuously from the center toward the outer ends. With this configuration, since a step generated between the body portion 24-11 and the reflection sheet 21 can be substantially eliminated, the outer edge of the body portion 24-11 (boundary part with the reflection sheet 21) will hardly be recognized visually as uneven brightness through the optical member 15.

Second Embodiment

A second embodiment of the present invention will be described with reference to FIG. 31. In the second embodiment, arrangement and configuration of a modified first reflection sheet 122 are described. Overlapping description of the same configuration, functions and effects as those in the first embodiment is omitted.

Figure 31:
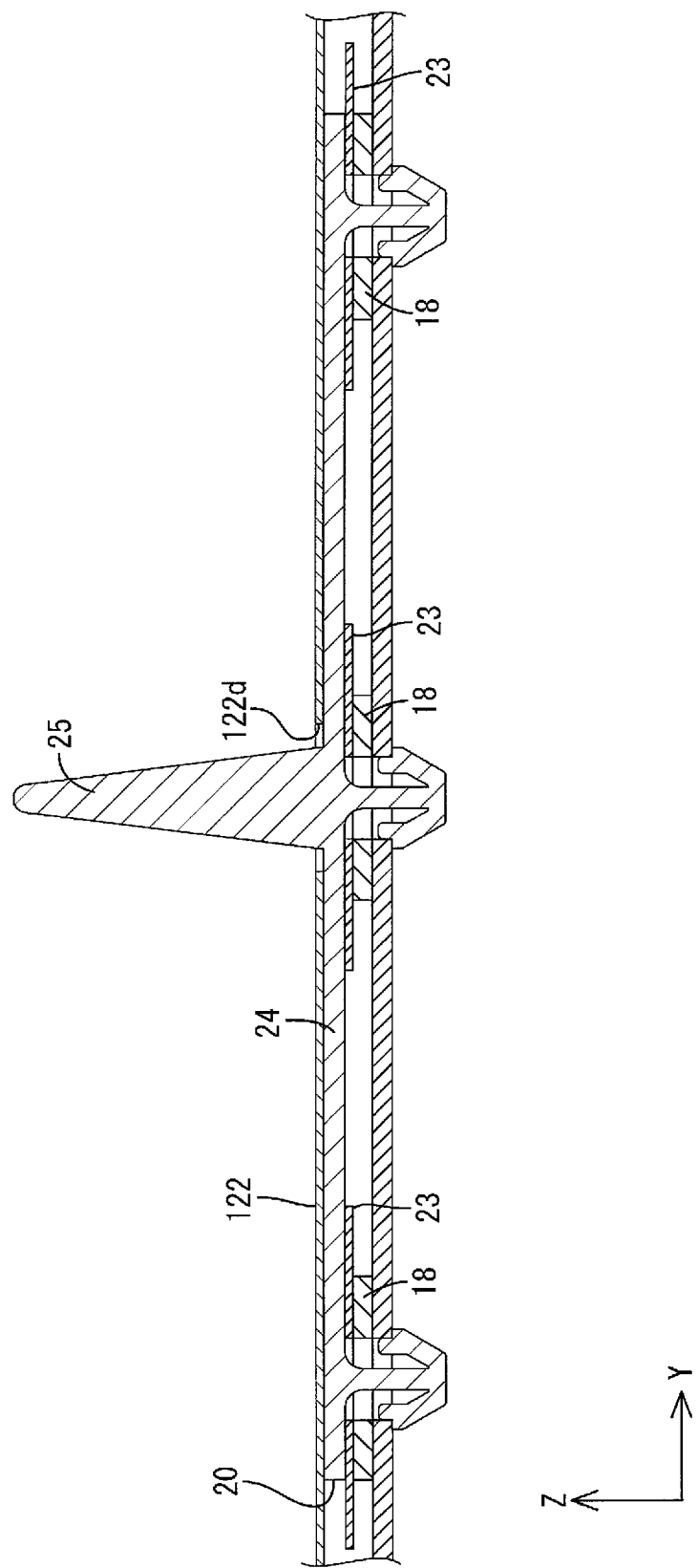
FIG. 31 is a sectional view showing the state where the supporting member is attached to the chassis according to a second embodiment of the present invention.

As shown in FIG. 31, the first reflection sheet 122 is arranged so as to cover the supporting member 20 from the front side. The first reflection sheet 122 has opened supporting portion insertion holes 122d configured to pass each supporting portion 25 therethrough at an overlapping position with the supporting portion 25 of each supporting member 20 in a plan view. Accordingly, a part of the supporting member 20 on the front side other than the supporting portion 25, that is, an almost entirety of the body portion 24 is covered with the first reflection sheet 122 from the front side. In other words, in the supporting member 20, only the supporting portion 25 is exposed to the optical member 15, and the area of the part exposed to the optical member 15 is significantly smaller than that in the first embodiment. Accordingly, even when light reflectance of the surface of the supporting member 20 is largely different from that of the surface of the first reflection sheet 122, since only a small part (supporting portion 25) of the supporting member 20 is exposed to the optical member 15 and a large part (body portion 24) is covered with the first reflection sheet 122, unevenness of light reflectance inside of the chassis 14 is hard to occur. Moreover, by adopting a material having a high surface light reflectance for the first reflection sheet 122, light in the chassis 14 can be reflected toward the optical member 15 more efficiently. In the first reflection sheet 122 according to this embodiment, the communicating hole 22c in the first embodiment is unnecessary and thus, is omitted. Only the second reflection sheet 23 is sandwiched between the body portion 24 of the supporting member 20 and the LED board 18.

As described above, in this embodiment, the first reflection sheet 122 is placed on the body portion 24 on the optical member 15 side, and has the supporting portion insertion hole 122d that is configured to pass each supporting portion 25 therethrough at the overlapping position with the supporting portion 25 in a plan view. With this configuration, since only the supporting portion 25 in the supporting member 20 is exposed to the optical member 15, light reflectance of the inside of the chassis 14 is substantially dominated by the first reflection sheet 122. Thereby, the light reflectance of the inside of the chassis 14 can be made uniform.

Third Embodiment

A third embodiment of the present invention will be described with reference to FIG. 32. In the third embodiment, arrangement of a supporting member 220 in the chassis 14 will be described. Overlapping description of the same configuration, functions and effects as those in the first embodiment is omitted.

Figure 32:
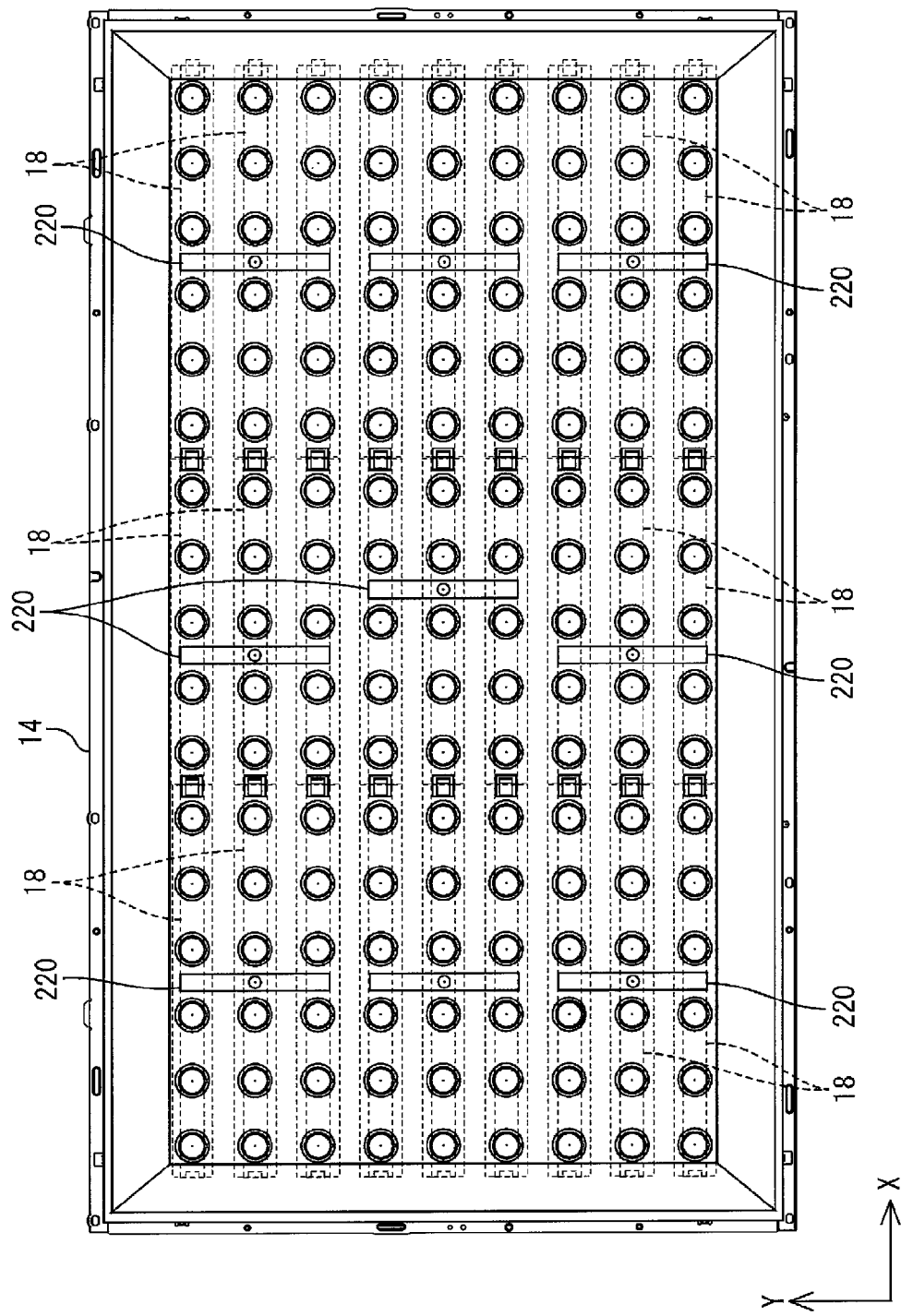
FIG. 32 is a plan view showing an arrangement of the LED board and the supporting member in the chassis according to a third embodiment of the present invention.

As shown in FIG. 32, the position of the supporting member 220 in the chassis 14 in the X-axis direction substantially corresponds to the center of each LED board 18 in the long-side direction. That is, the LED board 18 is fixed to the chassis 14 at one central position in the long-side direction by the supporting member 20. With this configuration, the number of the supporting members 220 can be reduced to half from that in the first embodiment, thereby reducing costs and improving working efficiency. In adopting configuration according to this embodiment, it is preferable to provide a positioning structure (not shown) between both ends of the LED board 18 in the long-side direction and the chassis 14 to position the LED board 18 at least in the Y-axis direction.

Fourth Embodiment

A fourth embodiment of the present invention will be described with reference to FIG. 33. In the fourth embodiment, a supporting member 320 having modified configuration is shown. Overlapping description of the same configuration, functions and effects as those in the first embodiment is omitted.

Figure 33:
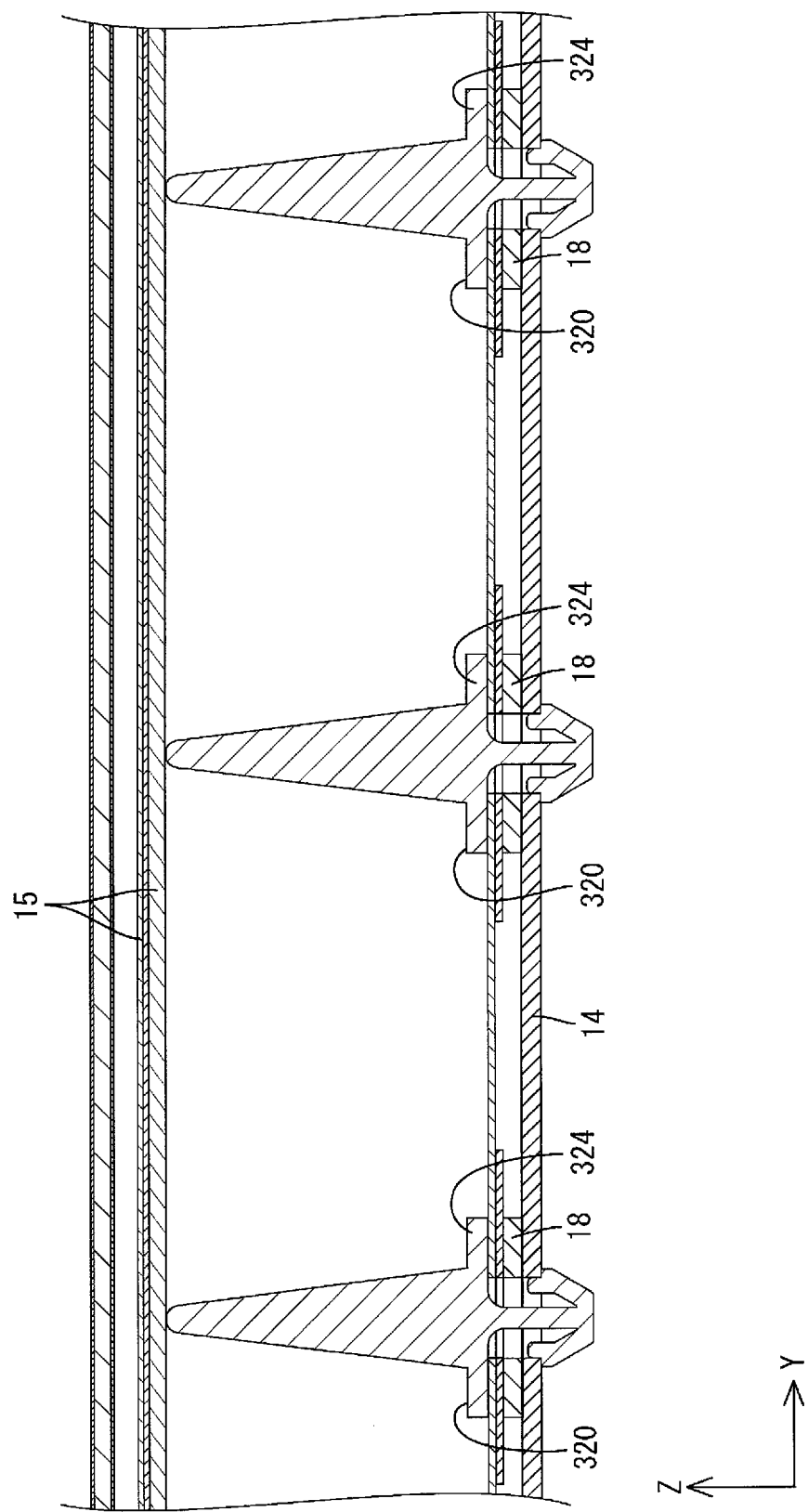
FIG. 33 is a sectional view showing the state where the supporting member according to a fourth embodiment of the present invention is attached to the chassis.

As shown in FIG. 33, length of a body portion 324 of the supporting member 320 in the Y-axis direction is set to be almost equal to short-side dimension of the LED board 18. That is, the supporting member 320 according to this embodiment does not cross over the plurality of LED boards 18 arranged in parallel in the Y-axis direction, and independently fixes each LED board 18 between the supporting member 320 and the chassis 14. With this configuration, the degree of freedom in the attachment position of each supporting member 320 to the chassis 14 is improved and thus, the optical member 15 can be supported more properly.

Fifth Embodiment

A fifth embodiment of the present invention will be described below with reference to FIG. 34 or FIG. 35. In the fifth embodiment, the second reflection sheet 23 in the first embodiment is omitted. Overlapping description of the same configuration, actions and effects as those in the first embodiment is omitted.

Figure 34:
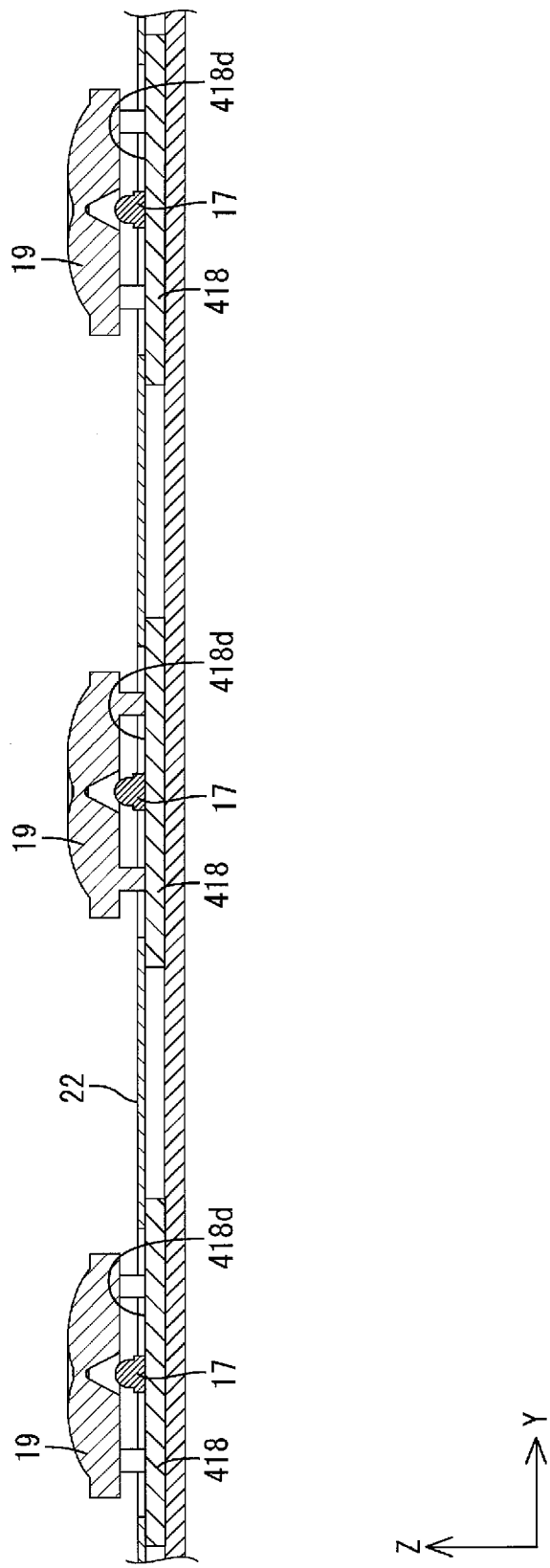
FIG. 34 is a sectional view showing a backlight unit according to a fifth embodiment of the present invention.
Figure 35:
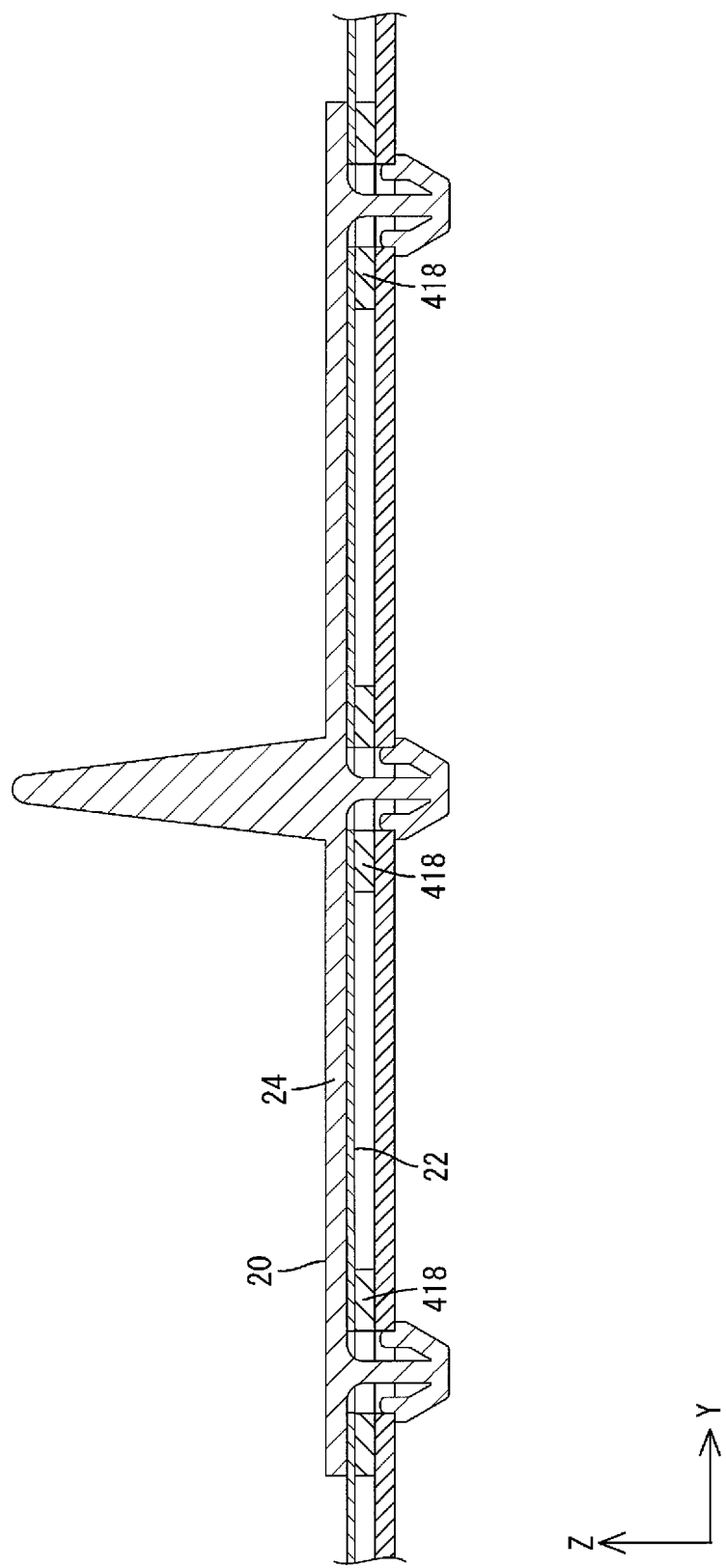
FIG. 35 is a sectional view showing the state where the supporting member is attached to the chassis.

In this embodiment, the second reflection sheet 23 according to the first embodiment is omitted, and as shown in FIG. 34, a reflecting layer 418d in place of the second reflection sheet 23 is formed on the front side surface of an LED board 418. The reflecting layer 418d assumes a white color having excellent light reflectivity, and is formed, for example, by printing paste containing a metal oxide on the surface of the LED board 418. Screen printing and ink jet printing are preferable as printing means. Although the reflecting layer 418*d* can be formed on the almost all of the front side surface of the LED board 418, the reflecting layer 418*d* may be formed on a part opposite to the diffuser lenses 19 on the LED board 418. The reflecting layer 418*d* can reflect light returned from the diffuser lenses 19 toward the diffuser lenses 19 again. As shown in FIG. 35, only the first reflection sheet 22 is sandwiched between the body portion 24 of the supporting member 20 and the LED board 418.

Sixth Embodiment

A sixth embodiment of the present invention will be described below with reference to FIG. 36. In the sixth embodiment, the diffuser lenses 19 and the second reflection sheet 23 in the first embodiment are omitted. Overlapping description of the same configuration, actions and effects as those in the first embodiment is omitted.

Figure 36:
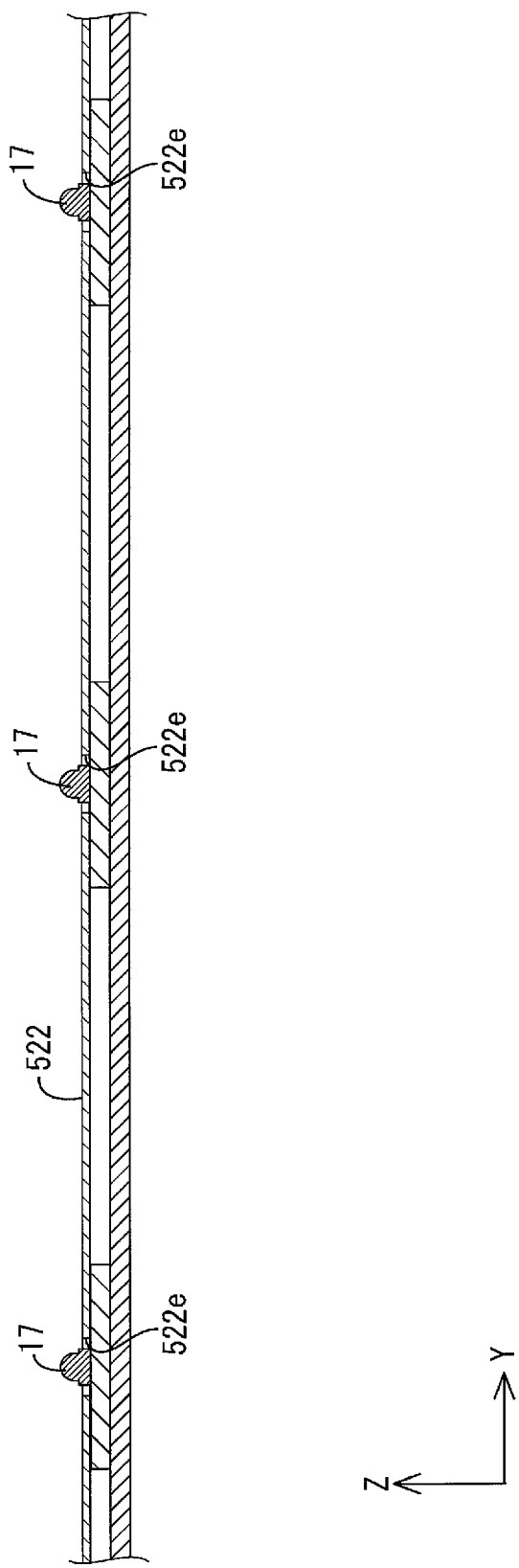
FIG. 36 is a sectional view showing a backlight unit according to a sixth embodiment of the present invention.

In this embodiment, since the diffuser lenses 19 and the second reflection sheet 23 in the first embodiment are omitted, light emitted from each of the LEDs 17, as shown in FIG. 36, directly reaches the optical member 15. A first reflection sheet 522 includes an opened LED insertion hole 522*e* that is configured to pass each of the LEDs 17 therethrough (is smaller than the lens insertion hole 22*b* in the first embodiment) and can be placed directly on the LED board 18. In adopting this embodiment, since the region between the LEDs 17 is easy to be visually recognized as a dark place, in order to prevent uneven brightness, it is preferred that the alignment pitch of the LEDs 17 in the X-axis direction and the Y-axis direction is smaller than that in the first embodiment.

Other Embodiments

The present invention is not limited to the embodiments described in the above description and figures, and for example, following embodiments fall within the technical scope of the present invention.

(1) Although the body portion of the supporting member presses the LED board over the entire length in the short-side direction in each of the above-mentioned embodiments, the body portion may partially press the LED board in the short-side direction.

(2) The shape of the body portion of the supporting member in each of the above-mentioned embodiments can be appropriately changed. Specifically, the body portion shaped like circle, ellipse or square in a plan view also falls within the scope of the present invention. Especially in the case where the supporting member does not cross over the plurality of LED boards but independently fixes each LED board as in the fourth embodiment, since the degree of freedom in setting the shape of the body portion, various shapes as described above can be freely selected.

(3) Although the supporting member passes between the adjacent LEDs on the LED board in each of the above-mentioned embodiments, the supporting member passing an overlapping region with the LED on the LED board in a plan view also falls within the scope of the present invention. In this case, it is preferable to provide an insertion hole in the overlapping region of supporting member with the LED.

(4) Although the long-side direction of the supporting member matches the short-side direction of the LED board in each of the above-mentioned embodiments, configuration in which the long-side direction of the supporting member matches the long-side direction of the LED board also falls within the scope of the present invention. In this case, the shape of the supporting member may be appropriately changed according to configuration of the LED board, and specifically, it is preferable to provide an insertion hole in the overlapping region with the LED (diffuser lens).

(5) Although the long-side direction of the LED board matches the long-side direction of the chassis in each of the above-mentioned embodiments, configuration in which the long-side direction of the LED board matches the short-side direction of the chassis also falls within the scope of the present invention.

(6) Although one supporting member fixes the three LED boards together to the chassis in the first to third, fifth and sixth embodiments, one supporting member fixing two or four or more LED boards together to the chassis also falls within the scope of the present invention.

(7) Although one LED board is fixed at one or two positions by the supporting member in the first and third embodiments, the LED board fixed at three or more positions by the supporting members also falls within the scope of the present invention.

(8) The number and arrangement of the supporting members with respect to the chassis in each of the embodiments can be appropriately changed.

(9) Although the plug-in type fixed portion is adopted as the attachment structure of the supporting member to the chassis in each of the above-mentioned embodiments, slide type fixed portion may be adopted as the attachment structure. In such slide-type attachment structure, by adopting a hook-type fixed portion, pushing the body portion toward the bottom plate of the chassis and then, sliding the body portion along the bottom plate, the hooked part of the fixed portion is engaged with the edge of the attachment hole.

(10) Although the fixed portion of the supporting member is engaged with the chassis through the insertion hole in each of the above-mentioned embodiments, the specific method of fixing the fixed portion to the chassis can be appropriately changed. For example, configuration in which the attachment hole and the elastic engaged portion are omitted and a bottom part passing through the through hole of the LED board is fixedly attached to the inner wall surface of the chassis with the adhesive or the like falls within the scope of the present invention. In this case, means such as deposition and welding other than the adhesive can be adopted.

(11) Although the reflection sheet contact portion surrounds the entire circumference of the bottom part of the fixed portion in the first modification example of the first embodiment, the reflection sheet contact portion coupled to only a part of the bottom part also falls within the scope of the present invention. The reflection sheet contact portion arranged separately/independently from the fixed portion also falls within the scope of the present invention.

(12) Although the board contact portion surrounds the entire circumference of the bottom part of the fixed portion in the second modification example of the first embodiment, the board contact portion coupled to only a part of the bottom part also falls within the scope of the present invention. The board contact portion may be arranged separately or independently from the fixed portion, and in this case, an insertion hole for only the board contact portion, which is independent from the communicating hole, may be formed in each reflection sheet.

(13) Although the contact portion is in indirect contact with the LED board through each reflection sheet in the third modification example of the first embodiment, an insertion hole that passes the contact portion therethrough may be provided in each reflection sheet to bring the contact portion into direct contact with the LED board.

(14) Although the pair of contact portions is arranged so as to sandwich the fixed portion in the third modification example of the first embodiment, one or three or more contact portions arranged with respect to one fixed portion also fall within the scope of the present invention.

(15) Although the positioning portion protrudes to the back side of the chassis in the fourth and fifth modification examples of the first embodiment, configuration in which the protruding front end surface of the positioning portion is in flush with the back side surface of the chassis or the protruding end surface is recessed from the back side surface of the chassis toward the front side also falls within the scope of the present invention. Further, configuration in which the positioning portion protruding from the body portion is inserted into the positioning hole of the LED board, but is contained in the chassis, and the communicating hole of the chassis is omitted also falls within the scope of the present invention.

(16) Although the center of the LED board in the long-side direction is fixed by the supporting member in the third embodiment, the fixing position to the LED board can be appropriately changed.

(17) Although in the supporting member independently fixing the LED board, the body portion presses the LED board over the entire length in the short-side direction in the fourth embodiment, configuration in which the body portion partially covers the LED board also falls within the scope of the present invention. In this case, the body portion may be set to have the almost same dimension as the supporting portion in a plan view. Conversely, in the supporting member independently fixing the LED board, the body portion formed to be wider than the LED board also falls within the scope of the present invention.

(18) Although the supporting portion is in contact with the diffuser plate extending straight in the X-axis direction and the Y-axis direction in each of the above-mentioned embodiments, configuration in which the supporting portion that is not in contact with the straight diffuser plate (specifically, the protruding front end of the supporting portion is located closer to the LED than the surface of the diffuser plate on the LED side) falls within the scope of the present invention. With this configuration, for example, even when the diffuser plate thermally expands due to change in the thermal environment in the backlight unit, the diffuser plate is allowed to be deformed so as to warp toward the LED in a clearance held between the diffuser plate and the supporting portion. Thereby, wrinkle or flexure is hard to occur in the diffuser plate and thus, uneven brightness is also hard to occur in illumination light emitted from the diffuser plate.

(19) Although the supporting portion is conical in each of the above-mentioned embodiments, for example, the pyramid-like supporting portion also falls within the scope of the present invention. The supporting portion is not necessarily tapered, and the cylindrical or prismatic supporting portion having uniform diameter also falls within the scope of the present invention.

(20) Although the supporting portion is point in the plane of the optical member in each of the above-mentioned embodiments, a linear or sheet-like supporting portion in the plane of the optical member also falls within the scope of the present invention.

(21) Although color of the surface of the supporting member is white in each of the above-mentioned embodiments, color of the surface of the supporting member may be creamy white or silver. Color of the surface can be set by applying paint of a desired color on the surface of the supporting member.

(22) Although the five-mounted type, the six-mounted type and the eight-mounted type of LED boards are combined as appropriate in each of the above-mentioned embodiments, an LED board that mounts the number of LEDs other than five, six and eight LEDs falls within the scope of the present invention.

(23) Although the LED that includes the LED chip emitting only blue light and emits white light by means of the phosphor is used in each of the above-mentioned embodiments, an LED that includes the LED chip emitting only ultraviolet light and emits white light by means of the phosphor falls within the scope of the present invention.

(24) Although the LED that includes the LED chip emitting only blue light and emits white light by means of the phosphor is used in each of the above-mentioned embodiments, an LED that has three types of LED chips emitting R, G, B, respectively, falls within the scope of the present invention. Moreover, an LED that has three types of LED chips emitting C (cyan), M (magenta), Y (yellow), respectively, also falls within the scope of the present invention.

(25) Although the LED that emits white light in each of the above-mentioned embodiments, an LED that emits red light, an LED that emits blue light and an LED that emits green light may be combined as appropriate.

(26) Although the LED is used as the light source in each of the above-mentioned embodiments, a point light source other than the LED also falls within the scope of the present invention. A planar light source such as an organic EL may be adopted.

(27) Although the diffuser lens diffusing light from the LED is used in the first to fifth embodiments, an optical lens other than the diffuser lens (for example, a collective lens) falls within the scope of the present invention.

(28) Also in embodiments other than each of the above-mentioned embodiments, screen size and aspect ratio of the liquid crystal display device can be changed as appropriate.

(29) Although the liquid crystal panel and the chassis are arranged in the longitudinally mounted state so that the short-side direction matches the vertical direction in each of the above-mentioned embodiments, configuration in which the liquid crystal panel and the chassis are arranged in the longitudinally mounted state so that the long-side direction matches the vertical direction also falls within the scope of the present invention.

(30) Although the TFT is used as the switching component of the liquid crystal display device in each of the above-mentioned embodiments, the present invention can also be applied to a liquid crystal display device using a switching component (for example, a thin film diode (TFD)) other than TFT and the monochrome liquid crystal display device other than the color liquid crystal display device.

(31) Although the liquid crystal display device using the liquid crystal panel as the display panel is illustrated in each of the above-mentioned embodiments, the present invention can be applied to a display device using the other type of display panel.

(32) Although the television receiver provided with a tuner is illustrated in each of the above-mentioned embodiments, the present invention can be applied to a display device having no tuner.

The invention claimed is:
1. A lighting device comprising:
a light source board including a light source;
a chassis storing the light source board;
an optical member facing the light source board; and
a supporting member supporting the optical member from the light source board side, and fixed to the chassis in the state where the light source board is sandwiched between the supporting member and the chassis; wherein
the supporting member has a body portion that holds the light source board together with the chassis between the body portion and the chassis, a supporting portion that protrudes from the body portion toward the optical member and is configured to contact with the optical member, and a fixed portion that protrudes from the body portion toward the chassis and is fixed to the chassis;
the body portion is larger than the supporting portion in a plan view;
the body portion extends in at least one direction along the plate surface of the light source board;
the light source board is rectangular in a plan view; and
the body portion extends in a short-side direction of the light source board.

2. The lighting device according to claim 1, wherein the body portion crosses over the light source board.

3. The lighting device according to claim 1, wherein
the light source board includes a plurality of light source boards arranged parallel to one another inside the chassis; and
the body portion extends over the plurality of light source boards.

4. The lighting device according to claim 3, wherein the body portion crosses over the plurality of the light source boards.

5. The lighting device according to claim 3, wherein
the body portion includes a plurality of fixed portions, each of which is passed through the corresponding light source board and fixed to the chassis.

6. The lighting device according to claim 1, wherein the plurality of light sources are arranged parallel to one another along a long-side direction on the light source board.

7. The lighting device according to claim 6, wherein the body portion is arranged between the adjacent light sources.

8. The lighting device according to claim 1, wherein the supporting members are arranged at two positions separated from each other on the light source board in the long-side direction.

9. The lighting device according to claim 1, wherein:
the chassis is rectangular in a plan view; and
the plurality of light source boards are arranged parallel to one another with the long-side direction thereof aligned with a long-side direction of the chassis.

10. The lighting device according to claim 1, wherein the light source is an LED.

11. A display device comprising:
the lighting device according to claim 1; and
a display panel configured to provide display using light from the lighting device.

12. A television receiver comprising the display device according to claim 11.

13. A lighting device comprising:
a light source board including a light source;
a chassis storing the light source board;
an optical member facing the light source board;
a supporting member supporting the optical member from the light source board side, and fixed to the chassis in the state where the light source board is sandwiched between the supporting member and the chassis;
a reflection member arranged inside the chassis and reflecting light toward the optical member, the reflection member being arranged closer to the optical member than the light source board, and having a light source insertion hole in an area overlapping the light source in a plan view and through which the light source is passed; and
a diffuser lens arranged in an area overlapping the light source in a plan view on the optical member side, the diffuser lens diffusing light from the light source; wherein
the supporting member has a body portion that holds the light source board together with the chassis between the body portion and the chassis, a supporting portion that protrudes from the body portion toward the optical member and is configured to contact with the optical member, and a fixed portion that protrudes from the body portion toward the chassis and is fixed to the chassis; and
the reflection member includes a first reflection member having the light source insertion hole in a size that allows the diffuser lens to pass through, and a second reflection member arranged between the light source board and the diffuser lens, arranged in an area overlapping the light source insertion hole of the first reflection member in a plan view, and reflecting light toward the diffuser lens.

14. The lighting device according to claim 13, wherein an edge of the light source insertion hole of the first reflection member overlaps the second reflection member in a plan view.

15. The lighting device according to claim 13, wherein the light source is an LED.

16. A display device comprising:
the lighting device according to claim 13; and
a display panel configured to provide display using light from the lighting device.

17. A television receiver comprising the display device according to claim 16.

18. A lighting device comprising:
a light source board including a light source;
a chassis storing the light source board;
an optical member facing the light source board;
a supporting member supporting the optical member from the light source board side, and fixed to the chassis in the state where the light source board is sandwiched between the supporting member and the chassis; and
a reflection member arranged inside the chassis and reflecting light toward the optical member, the reflection member being arranged closer to the optical member than the light source board, and having a light source insertion hole in an area overlapping the light source in a plan view and through which the light source is passed; wherein
the supporting member has a body portion that holds the light source board together with the chassis between the body portion and the chassis, a supporting portion that protrudes from the body portion toward the optical member and is configured to contact with the optical member, and a fixed portion that protrudes from the body portion toward the chassis and is fixed to the chassis; and
the reflection member is sandwiched between the body portion and the light source board.

19. The lighting device according to claim 18, wherein the body portion has a reflection member contact portion that protrudes toward the reflection member and is in contact with the reflection member.

20. The lighting device according to claim 19, wherein the reflection member contact portion is connected to the fixed portion.

21. The lighting device according to claim 20, wherein the reflection member contact portion surrounds the fixed portion.

22. The lighting device according to claim 18, wherein:
the body portion has a board contact portion that protrudes toward the light source board; and
the reflection member has a board contact portion insertion hole that allows the board contact portion to be in contact with the light source board.

23. The lighting device according to claim 22, wherein a protrusion dimension of the board contact portion from the body portion is set to be larger than thickness of the reflection member.

24. The lighting device according to claim 22, wherein the board contact portion is connected to the fixed portion.

25. The lighting device according to claim 24, wherein the board contact portion surrounds the fixed portion.

26. The lighting device according to claim 18, wherein the light source is an LED.

27. A display device comprising:
the lighting device according to claim 18; and
a display panel configured to provide display using light from the lighting device.

28. A television receiver comprising the display device according to claim 27.

29. A lighting device comprising:
a light source board including a light source;
a chassis storing the light source board;
an optical member facing the light source board;
a supporting member supporting the optical member from the light source board side, and fixed to the chassis in the state where the light source board is sandwiched between the supporting member and the chassis; and
a reflection member arranged inside the chassis and reflecting light toward the optical member, the reflection member being arranged closer to the optical member than the light source board, and having a light source insertion hole in an area overlapping the light source in a plan view and through which the light source is passed; wherein
the supporting member has a body portion that holds the light source board together with the chassis between the body portion and the chassis, a supporting portion that protrudes from the body portion toward the optical member and is configured to contact with the optical member, and a fixed portion that protrudes from the body portion toward the chassis and is fixed to the chassis; and
the reflection member is arranged at the body portion on the side of the optical member, and has a supporting portion insertion hole through which the supporting portion is passed in an area that overlap the supporting portion in a plan view.

30. The lighting device according to claim 29, wherein the light source is an LED.

31. A display device comprising:
the lighting device according to claim 29; and
a display panel configured to provide display using light from the lighting device.

32. A television receiver comprising the display device according to claim 31.

33. A lighting device comprising:
a light source board including a light source;
a chassis storing the light source board;
an optical member facing the light source board; and
a supporting member supporting the optical member from the light source board side, and fixed to the chassis in the state where the light source board is sandwiched between the supporting member and the chassis; wherein
the supporting member has a body portion that holds the light source board together with the chassis between the body portion and the chassis, a supporting portion that protrudes from the body portion toward the optical member and is configured to contact with the optical member, and a fixed portion that protrudes from the body portion toward the chassis and is fixed to the chassis; and
the body portion has a contact portion that protrudes toward the light source board and is in direct or indirect contact with the light source board at a position away from the fixed portion.

34. The lighting device according to claim 33, wherein the light source is an LED.

35. A display device comprising:
the lighting device according to claim 33; and
a display panel configured to provide display using light from the lighting device.

36. A television receiver comprising the display device according to claim 35.

* * * * *